(12) United States Patent
Motlagh

(10) Patent No.: US 12,248,918 B2
(45) Date of Patent: Mar. 11, 2025

(54) EXTENSIBLE, LOW-CODE INTEGRATION PLATFORM

(71) Applicant: United Effects, Inc., Lewes, DE (US)

(72) Inventor: Borzou Motlagh, Fort Washington, PA (US)

(73) Assignee: United Effects, Inc., Lewes, DE (US)

(*) Notice: Subject to any disclaimer, the term of this patent is extended or adjusted under 35 U.S.C. 154(b) by 96 days.

(21) Appl. No.: 18/059,559

(22) Filed: Nov. 29, 2022

(65) Prior Publication Data

US 2023/0177481 A1 Jun. 8, 2023

Related U.S. Application Data

(60) Provisional application No. 63/287,123, filed on Dec. 8, 2021.

(51) Int. Cl.
*G06Q 20/12* (2012.01)
*H04L 9/40* (2022.01)

(52) U.S. Cl.
CPC ......... *G06Q 20/1235* (2013.01); *H04L 63/08* (2013.01); *H04L 2463/082* (2013.01)

(58) Field of Classification Search
CPC ........... G06Q 20/1235; G06Q 2220/18; G06Q 30/06; G06Q 30/0645; H04L 63/08; H04L 2463/082; H04L 63/102; H04L 63/104

See application file for complete search history.

(56) References Cited

U.S. PATENT DOCUMENTS

| 9,947,033 | B1 | | 4/2018 | Stickle et al. |
| 10,157,275 | B1 | * | 12/2018 | Venkatasamy ...... H04L 63/0428 |
| 10,387,980 | B1 | * | 8/2019 | Shahidzadeh ........ G06Q 40/123 |

(Continued)

FOREIGN PATENT DOCUMENTS

| CN | 107408042 B | * | 9/2021 | .......... G06F 11/2071 |
| GB | 2550473 A | * | 11/2017 | ........... G06F 21/105 |
| WO | WO-2016049626 A1 | * | 3/2016 | .......... G06F 11/2071 |

*Primary Examiner* — Neha Patel
*Assistant Examiner* — Chunling Ding
(74) *Attorney, Agent, or Firm* — Mendelsohn Dunleavy, P.C.; Steve Mendelsohn

(57) ABSTRACT

Integrated system enables implementors to integrate functionality into software systems to enable user identity and access management across customers/products. Management platform enables a pool of accounts/technical components representing users/machines to be authenticated against systems/products, authenticated accounts/technical components to perform functions within systems/products, representations of external software systems as products to be mapped to identities, accesses, organizations, and permissions, and representation of groups of accounts organized by a common aspect where the groups can request access to products licensed by the groups. Multi-factor authentication module enables various third-party technologies to lend MFA functionality to the management platform and the users. Product license purchase module enables an entity external to the implementor and represented by an organization to request and gain access to products in a formalized manner. Data stream ecosystem enables the implementor to define data streams and connect systems to the data streams to move data packets between the systems.

3 Claims, 66 Drawing Sheets

(56) References Cited

U.S. PATENT DOCUMENTS

| | | | |
|---|---|---|---|
| 2009/0037287 A1* | 2/2009 | Baitalmal | G06F 21/128 |
| | | | 705/27.1 |
| 2009/0037492 A1* | 2/2009 | Baitalmal | G06F 16/27 |
| 2011/0126168 A1* | 5/2011 | Ilyayev | G06F 9/5072 |
| | | | 717/103 |
| 2011/0289322 A1* | 11/2011 | Rasti | H04L 63/0421 |
| | | | 713/182 |
| 2015/0310188 A1* | 10/2015 | Ford | H04L 63/101 |
| | | | 726/28 |
| 2016/0005016 A1* | 1/2016 | Eliahu | G06Q 20/1235 |
| | | | 705/44 |
| 2016/0026813 A1* | 1/2016 | Neitzel | G06F 21/6218 |
| | | | 726/17 |
| 2017/0034152 A1* | 2/2017 | Subramanya | H04L 63/101 |
| 2018/0167435 A1* | 6/2018 | Kinarti | H04L 65/762 |
| 2019/0014102 A1* | 1/2019 | Mathew | G06F 21/41 |
| 2021/0136083 A1* | 5/2021 | Gordon | H04L 63/104 |
| 2021/0160231 A1* | 5/2021 | Kumar | H04L 63/0815 |
| 2021/0200596 A1* | 7/2021 | Sanchez | G06F 9/5038 |

\* cited by examiner

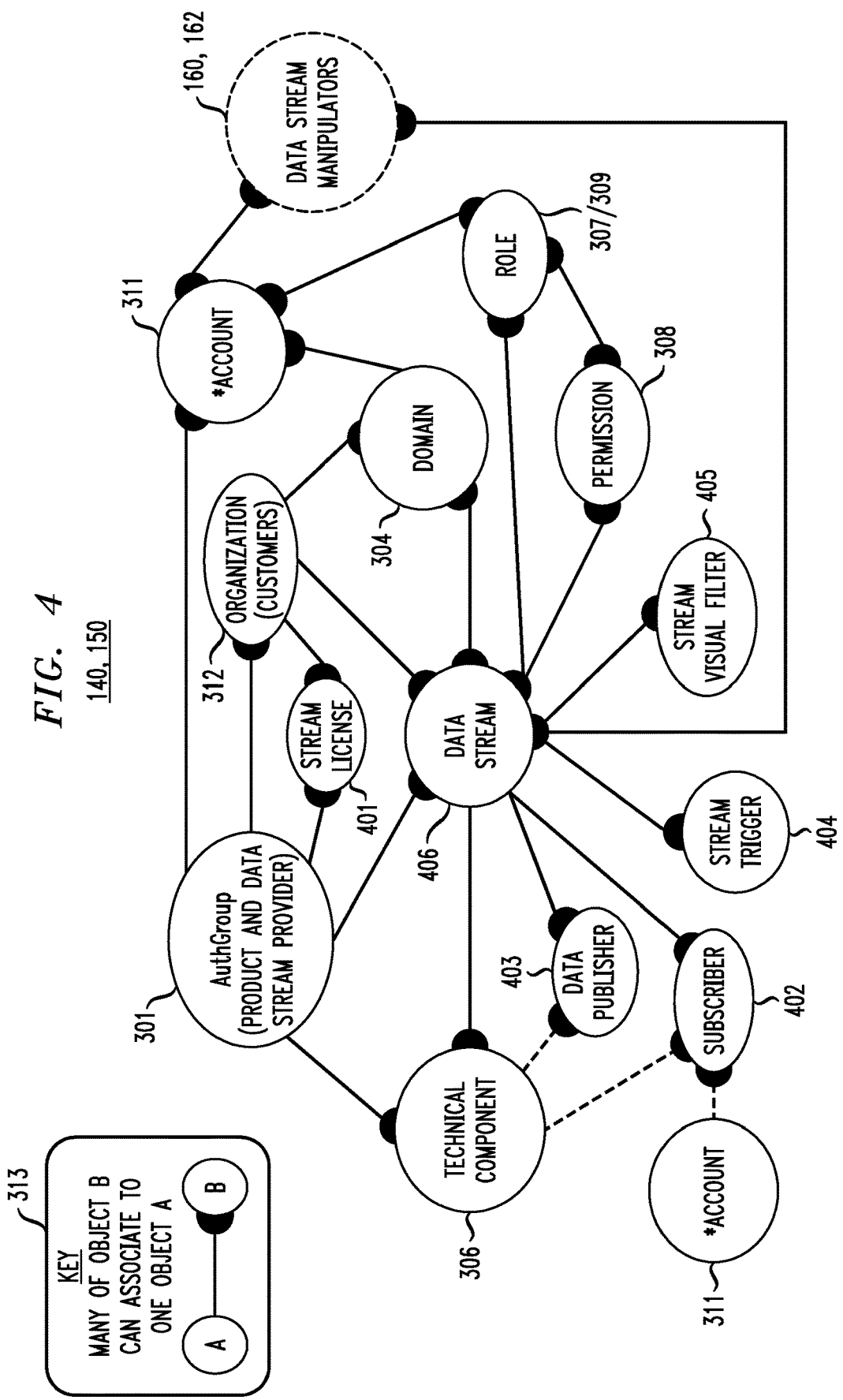

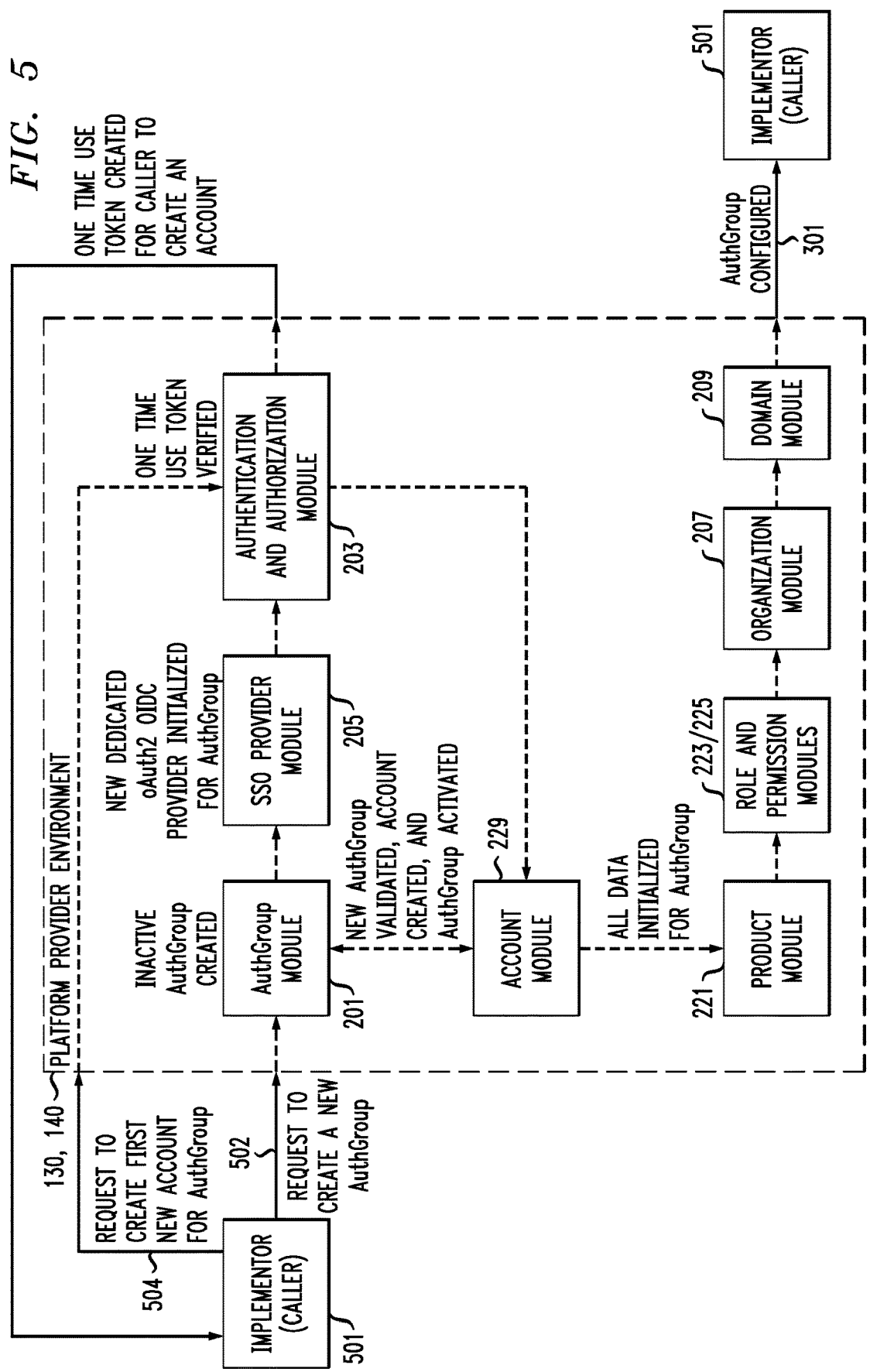

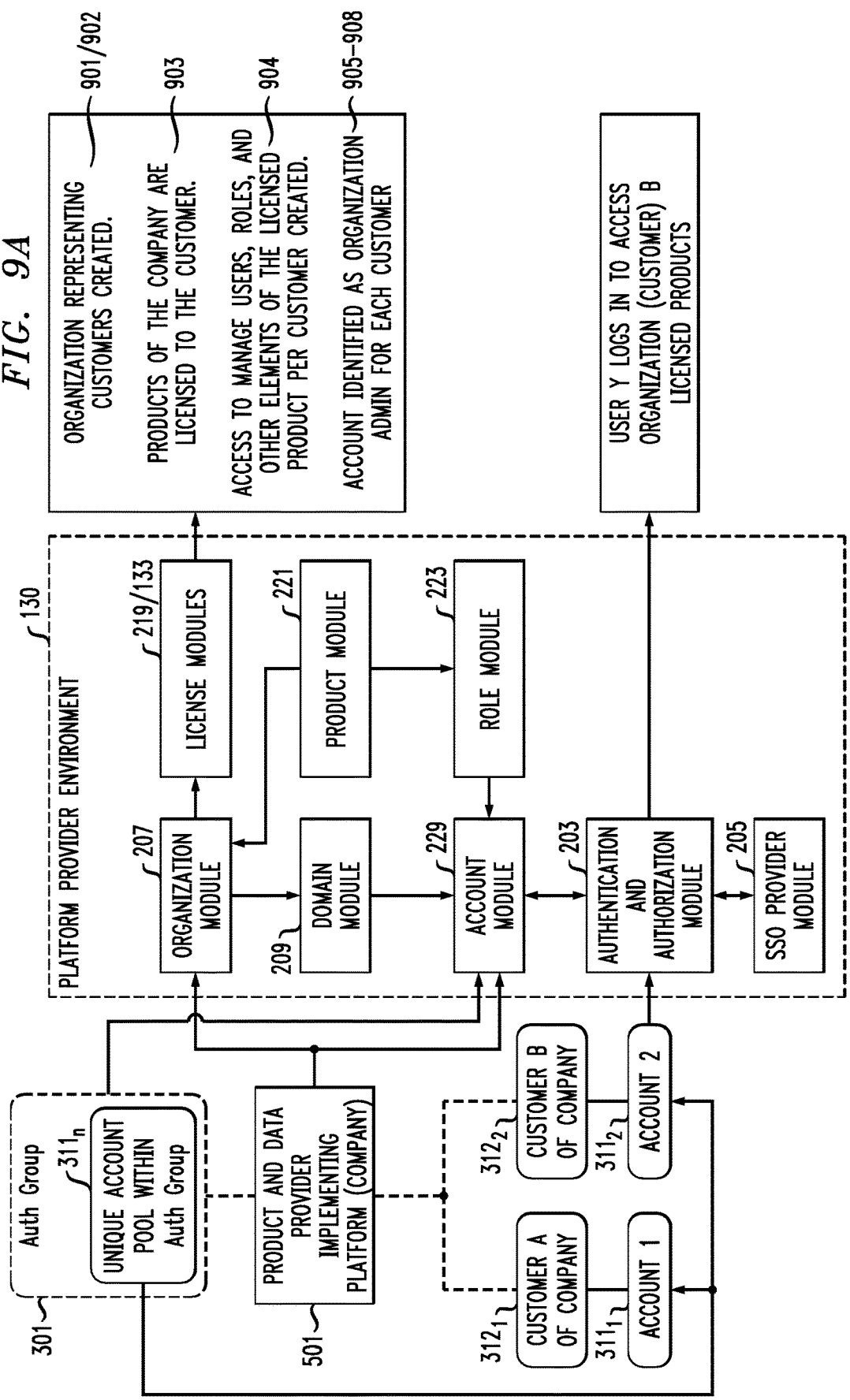

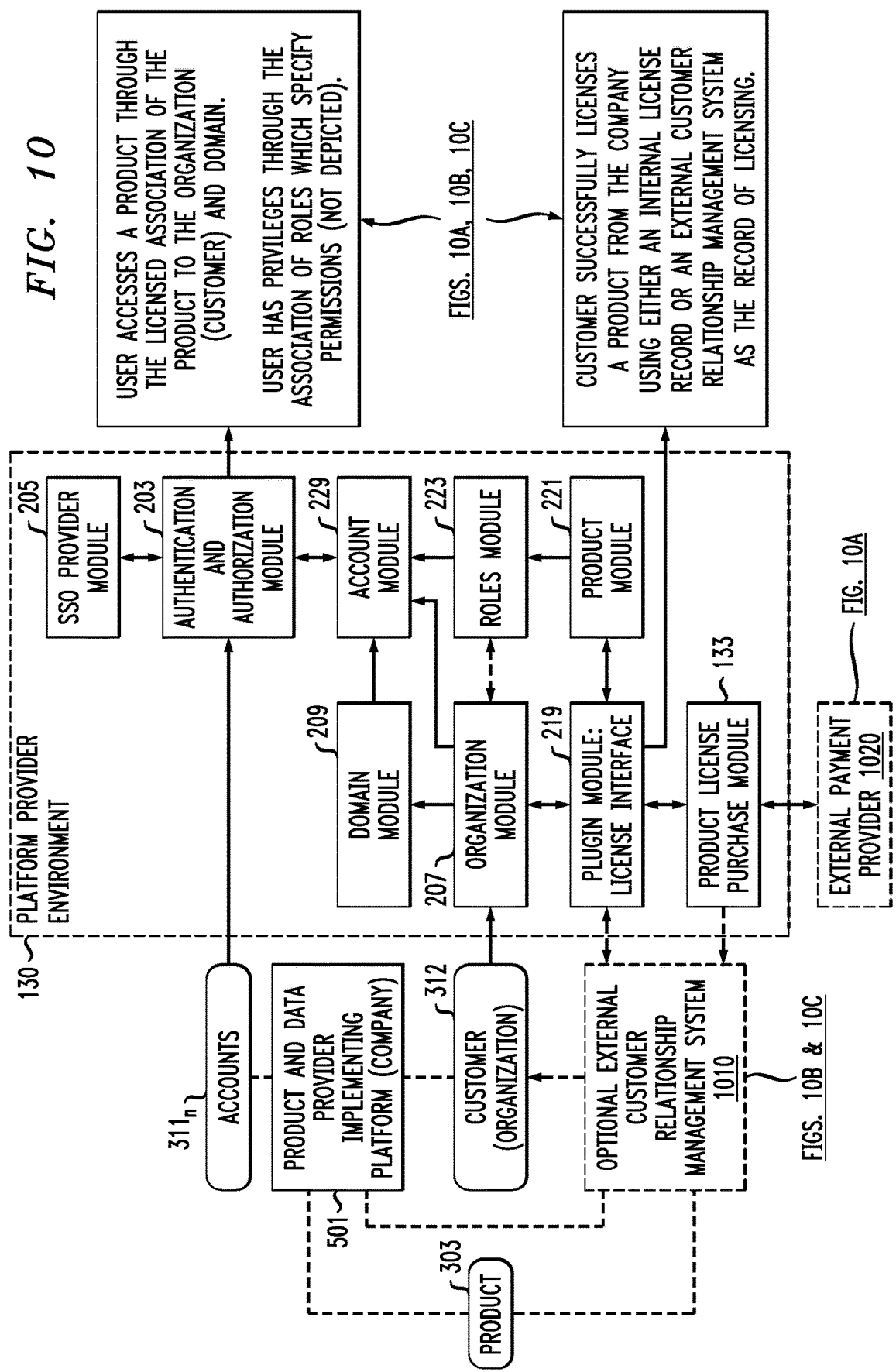

FIG. 13A
1307

```
...
"sub": "8d2c8a2b-c91d-475b-af2e-5b840a6d1464",  ——1311
"group": "n1xPSSWG1obH0sQ9JUsQ9",  ——1312
"x-access-group": "owner member",  ——1313
"x-access-organizations": "afc54d0d-66a6-4f10-b9de-5b38742f1a43 fd3fc346-0158-4922-bc12-072da6e9d09e",  ——1314
"x-access-domains":  ——1315
    "afc54d0d-66a6-4f10-b9de-5b38742f1a43": "e146abc2-10bc-4716-9065-b1a6ac8cfde5"
},
"x-access-products":  ——1316
    "afc54d0d-66a6-4f10-b9de-5b38742f1a43": "c5f21be6-040f-4e55-87c8-1328b9f6de67, WGNGV9HIDD 869de383-a50a-4ec0-a5fb-4cab5510bfa6 706620fb-3aaf-47a0-937e-903c9535ad6e, 9mMRpPmzDy eaec3a62-a6ac-4196-8111-05a7886dcb49, uKGfSdpQpT"
},
"x-access-roles": {  ——1317
    "afc54d0d-66a6-4f10-b9de-5b38742f1a43": "uKGfSdpQpT:mrZa7FTnp2 9mMRpPmzDy : 5g2VGjxpNm WGNGV9HIDD: :688rl9Thx9"
},
"x-access-permissions": {  ——1318
"member": "n1xPSSWG1obH0sQ9JUsQ9-member:::accounts::update:own n1xPSSWG1obH0sQ9JUsQ9-member:::accounts::read:own
n1xPSSWG1obH0sQ9JUsQ9-member:::accounts::delete:own n1xPSSWG1obH0sQ9JUsQ9-member:::accounts::delete:own
n1xPSSWG1obH0sQ9JUsQ9-member:::useraccess::read:own n1xPSSWG1obH0sQ9JUsQ9-member:::useraccess::delete:own
n1xPSSWG1obH0sQ9JUsQ9-member:::operations-user::create:own n1xPSSWG1obH0sQ9JUsQ9-member:::operations-reset-user-password::create
n1xPSSWG1obH0sQ9JUsQ9-member:::accounts-notification::read:own n1xPSSWG1obH0sQ9JUsQ9-member:::operations-invite::create:own",
```

1318 {
"afc54d8a-66a6-4f10-b9de-5b38742f1a43": "uKGfSdpQpT:::subject::read uKGfSdpQpT:::subject::update uKGfSdpQpT:::subject::delete uKGfSdpQpT:::subject::create uKGfSdpQpT:::subject-operation::request uKGfSdpQpT:::stream::read uKGfSdpQpT:::stream::create uKGfSdpQpT:::stream::delete uKGfSdpQpT:::stream-operation::update uKGfSdpQpT:::stream-operation::request uKGfSdpQpT:::access::read:own uKGfSdpQpT:::access::update:own uKGfSdpQpT:::access::delete:own uKGfSdpQpT:::access::create uKGfSdpQpT:::access::read uKGfSdpQpT:::access::update uKGfSdpQpT:::access::delete uKGfSdpQpT:::access-operations::request:own uKGfSdpQpT:::access-operations::request uKGfSdpQpT:::stream-consumer::read uKGfSdpQpT:::stream-consumer::delete uKGfSdpQpT:::destructive-operation::request uKGfSdpQpT:::config::update 9mMRpPmzDy:::subject::read 9mMRpPmzDy:::subject::update 9mMRpPmzDy:::subject::delete 9mMRpPmzDy:::subject::create 9mMRpPmzDy:::subject-operation::request 9mMRpPmzDy:::stream::read 9mMRpPmzDy:::stream::create 9mMRpPmzDy:::stream::delete 9mMRpPmzDy:::stream::update 9mMRpPmzDy:::stream-operation::request 9mMRpPmzDy:::access::read:own 9mMRpPmzDy:::access::update:own 9mMRpPmzDy:::access::delete:own 9mMRpPmzDy:::access::create 9mMRpPmzDy:::access::read 9mMRpPmzDy:::access::update 9mMRpPmzDy:::access::delete 9mMRpPmzDy:::access-operations::request:own 9mMRpPmzDy:::access-operations::request 9mMRpPmzDy:::stream-consumer::read" ⎬ 1319
},
"jti": "hQZgSCgYzu6yNxXGWce-4",
"iat": 1638224020,
"exp": 1638227620,
"scope": "openid email access",
"client_id": "4Sa37a5f-a295-4705-9b7f-3efda55c5bf3",
"iss": "https://auth.unitedeffects.com/n1xPSSWG1obH0sO9JUsQ9",
"aud": "https://exampleproduct.com/api"
}

*FIG. 13A cont.*

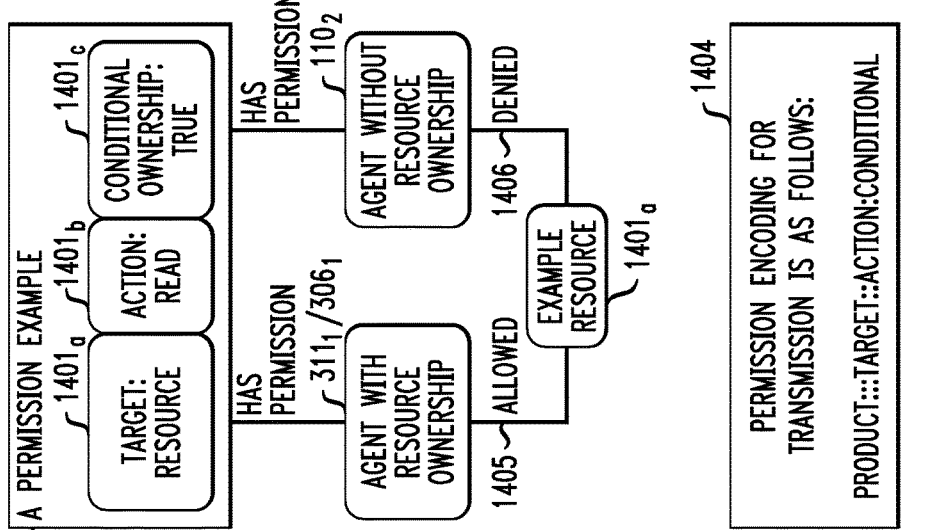
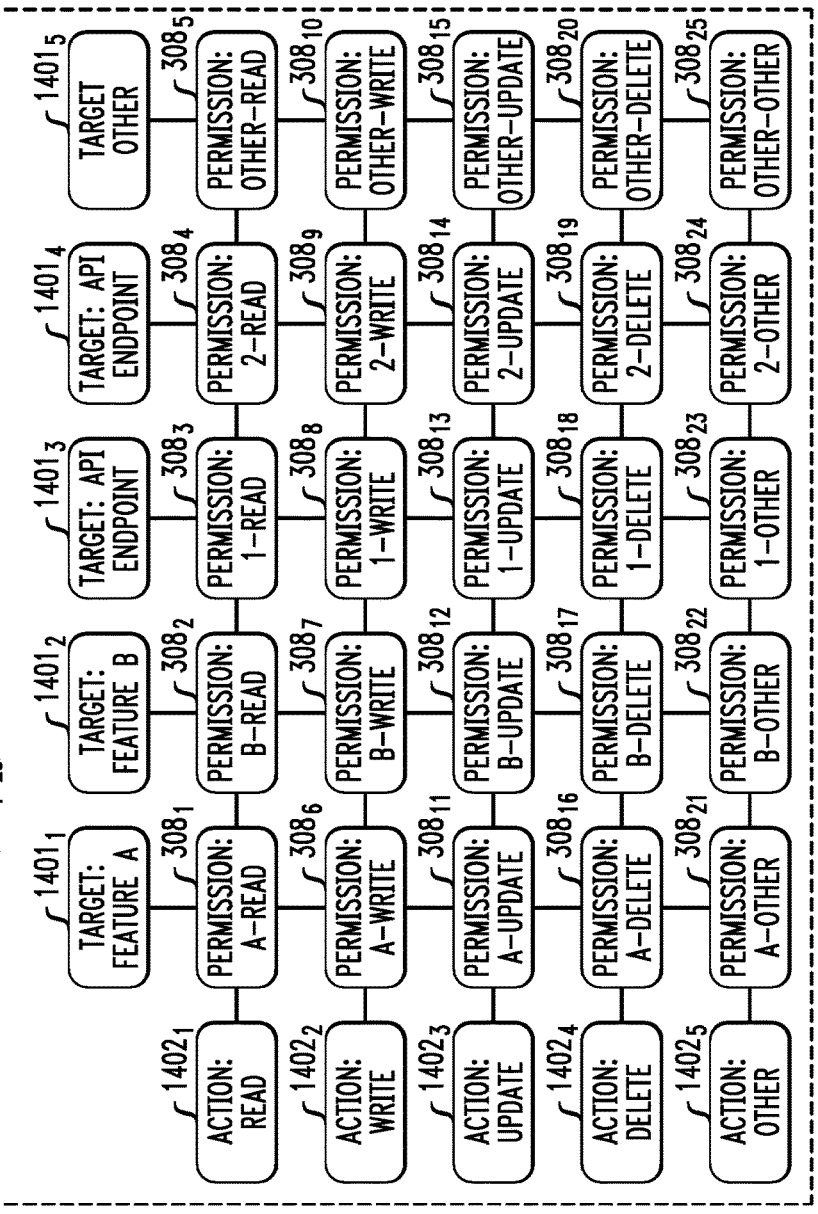
FIG. 14

COMPUTING SERVICE 3300

EXTENSIBLE, LOW-CODE INTEGRATION PLATFORM

CROSS-REFERENCE TO RELATED APPLICATIONS

This application claims the benefit of the filing date of U.S. provisional application No. 63/287,123, filed on Dec. 8, 2021, the teachings of which are incorporated herein by reference in their entirety.

BACKGROUND

Field of the Disclosure

The present disclosure relates to technologies for enabling implementors to integrate their software systems.

Description of the Related Art

This section introduces aspects that may help facilitate a better understanding of the disclosure. Accordingly, the statements of this section are to be read in this light and are not to be understood as admissions about what is prior art or what is not prior art.

With the proliferation of managed "as-a-service" cloud infrastructure and technologies has come a reliance on specific standardized technologies to be incorporated into most software offerings to remain secure and market relevant. Generally, these core technologies provide standardized and secure sign-on, management of users, access to features, and access to data. Currently, these technologies are provided as disparate and disjointed solutions that involve significant effort to integrate for use by software providers. As an example, a software provider may need three or more separate managed software subscriptions or leases to achieve an ability to manage single sign-on (SSO), users, permissions, and data streams within their enterprise solution, incurring the cost of full integration between these managed services. That software provider would further need additional vendors to connect their software and data to customers in a monetized format through lease or subscription.

SUMMARY

Problems in the prior art are addressed in accordance with the principles of the present disclosure by a technology that successfully integrates the standard technologies described in the Description of the Related Art along with a mechanism to account for paid-for licensing of both software products and data streams, provided as a single Platform for one-time integration, thereby creating a significant financial advantage to any software, data, or content provider. Allowing this Platform to be extensible, so that new features can be added and quickly made available to software providers in a fully integrated and consistent manner, further allows innovation and new advances to easily be introduced and integrated into the Platform without reverting to piecemeal licensing.

An overall single-integration Platform solution may then allow developers, data scientists, business analysts, product managers, and others involved in software, data, and content development, to quickly utilize common identity, common permissions, data streams from multiple sources, and other integrated features to rapidly develop new and innovate products at a significantly lower cost of ownership and time to market. Additionally, providers may be able to easily monetize data streams themselves, licensing externally to customers both the providers' complete products and the streaming data that enables their products. In effect, new companies may more easily be established since access to data and integrated Platform-level functionality is effectively commoditized at lower cost, allowing more competition and an overall healthier software market ecosystem.

In one embodiment, the present disclosure is an integrated system that enables an implementor to integrate functionality into the implementor's (e.g., 501) one or more software systems to enable user identity and access management across the implementor's customers and/or products. The system comprises a management platform (e.g., 140), a multi-factor authentication (MFA) module (e.g., 132), a product license purchase module (e.g., 133), and a data stream ecosystem (e.g., 150, FIG. 21). The management platform is configured to (i) enable a unique pool of accounts (e.g., 311) and/or technical components (e.g., 306) which represent users (e.g., 110) and/or machines (e.g., 801) to be authenticated against various systems and/or products (e.g., 303, FIGS. 7, 8), (ii) enable authenticated accounts and/or technical components to be authorized to perform particular functions within various systems and/or products (e.g., FIGS. 7, 8), (iii) enable a representation of external software systems as products to be mapped to identities, accesses, organizations (e.g., 312), and permissions (e.g., 308, FIG. 7C), and (iv) enable a representation of groups of accounts organized by a common aspect where the groups are able to request access to products licensed by the groups (e.g., FIGS. 7C, 8A, 9A). The MFA module is configured to enable various third-party MFA technologies to lend MFA functionality to the management platform and subsequently to the users (e.g., FIG. 13). The product license purchase module (e.g., 133) configured to enable an entity external to the implementor and represented by an organization to request and gain access to a product in a formalized manner (e.g., 302, FIG. 10). The data stream ecosystem is configured to enable the implementor to define data streams (e.g., 406) and connect systems to the data streams to move data packets between the systems (e.g., FIG. 22).

BRIEF DESCRIPTION OF THE DRAWINGS

Embodiments of the disclosure will become more fully apparent from the following detailed description, the appended claims, and the accompanying drawings in which like reference numerals identify similar or identical elements.

FIGS. 3-4 show object-entity relationships within the Platform of FIGS. 1-2.

FIGS. 5-5A are a block diagram and related flow diagram, respectively, depicting one example of how modules within UE Auth 140 as shown in FIGS. 1-2 can work together to allow an Auth Group to be created upon request.

FIG. 9A builds on FIG. 9 and is a block diagram showing an example of how software companies (or similar business entities) implementing an instance of the Platform of FIGS. 1-2 can represent their customers as Organizations within the Platform Auth Group context, represent Products licensed to that Organization, and further associate users as unique Accounts within the Auth Group to those customer Organizations with appropriate access to the licensed Products.

FIG. 10 is a block diagram and FIGS. 10A-10D are example flow diagrams showing an example of how the License module may directly, or through external interface, manage Product licensing to an Organization automatically or manually, and how the various paths of licensing may be requested.

FIGS. 13-13A are a block diagram and pseudo code listing, respectively, that show an example of how the Platform of FIGS. 1-2 may interface with and use multiple, established SSO Authentication and Authorization technologies to secure Account access to systems and an example access token representing all Organizations, Domains, Products, Roles, and Permissions allowed for an example Account authenticating.

DETAILED DESCRIPTION

Figure 1:
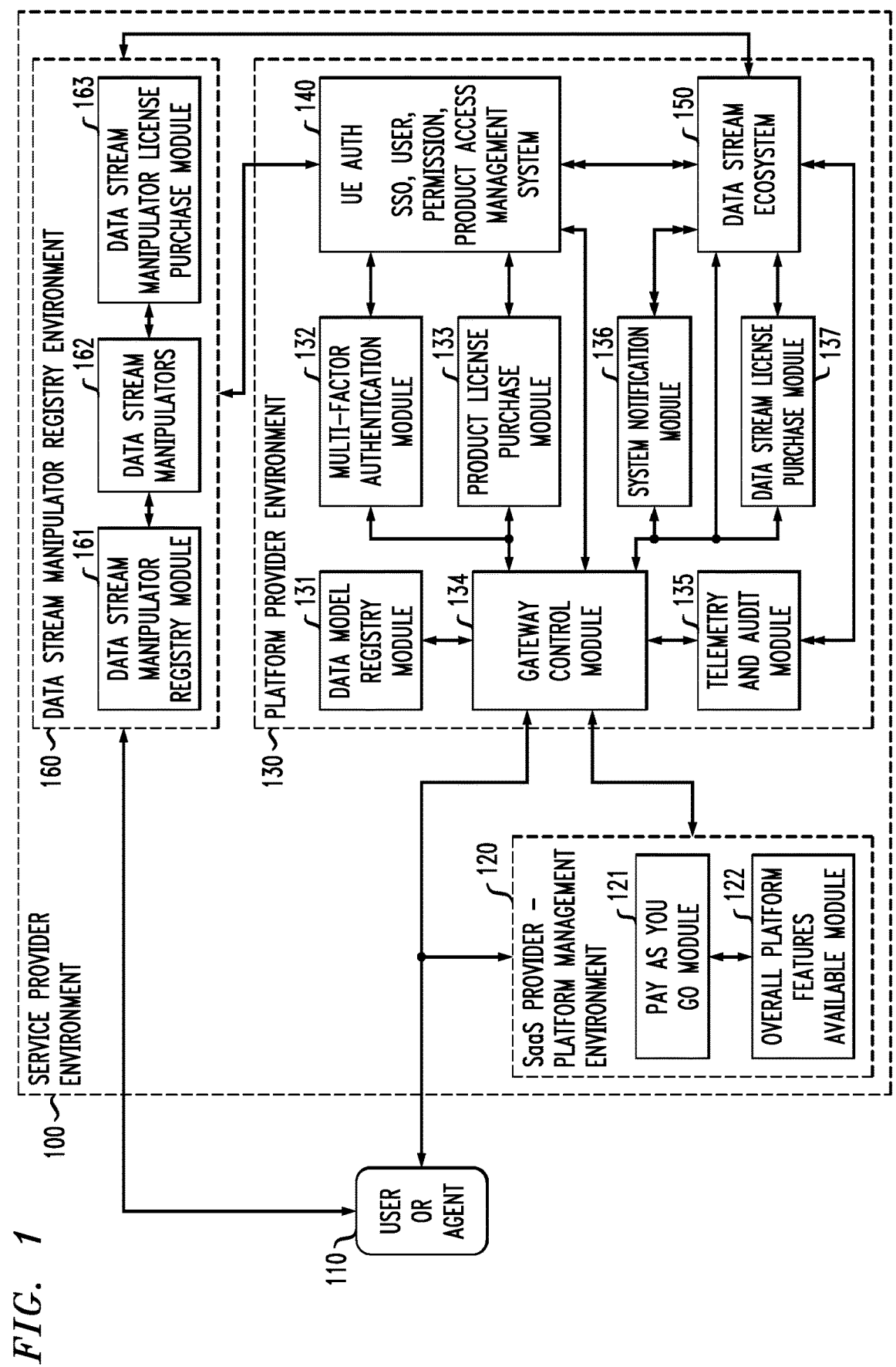
FIGS. 1-2 are block diagrams depicting the high-level components of a Platform and how the relate to each other, according to one embodiment of the disclosure.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Glossary

This section provides a glossary of terms used in this specification:

Platform—A traditional platform is a set of technologies that act as common components and services across multiple integrated solutions, commercial or otherwise. Traditional platforms allow solutions to be built faster because users do not need to invest in building common components when they have access to a platform that makes those components immediately available. As used here, the term "Platform" refers to an extensible, low-code integration platform for identity management, authentication, authorization, data streaming, and data observability according to certain embodiments of this disclosure that expands upon the definition of conventional platforms in various novel ways. References to "Platform" indicate an instance of the overall technology solution described herein and made available to persons or entities desiring its implementation.

Auth Group—Where a traditional tenant is an entire group of many individually unique users who share common access to an environment and partitioned data, an Auth Group is such a tenant enhanced to also represent isolation of data, object entities, and configurations, either physically or virtually, for an instance of the Platform. Data isolation, in this context, means that someone or something from one Auth Group cannot access data from another Auth Group. Like a traditional tenant, an Auth Group also represents a pool of uniquely identifiable users (Accounts). Auth Groups are typically mapped to a licensee of the Platform, and all entities operating an instance of the Platform are assigned to an Auth Group.

Root Auth Group—A Root Auth Group is a special tenant belonging to the overall provider of Platform instances. A Root Auth Group can access and manage all other Auth Groups. In typical implementations, there is only ever one Root Auth Group.

Account—An Account is the mechanism by which a person accesses internal systems of a Platform. Accounts store credentials through which a person secures authorized access. Accounts are unique within an Auth Group.

Technical Component—A Technical Component is similar to an Account but, rather than being representative of a person, is representative of a machine counterpart outside of a Platform. Technical Components are an interface through which a machine may access a Platform or products without human interaction.

Secured Profile—A Secured Profile is encrypted or otherwise hidden information about an account holder such as name, email addresses, phone numbers, biographical data, images, etc., which the account holder may optionally choose to provide. No one other than the Account holder can access this data directly. Account holders can release Secured Profile data to requesting parties as desired. Only one Secured Profile exists for any given Account.

Organization—An Organization is a data abstraction that associates a subset of Accounts from within an Auth Group to a subset of Products or other Platform resources through various additional abstractions such as Domains, Roles, and Permissions, that further refine which Accounts access which Products and with what level of access. One example of an Organization that an Auth Group may want to utilize represents customers. Another example would represent internal departments.

Organization Account Profile—An Organization may need to manage additional descriptive profile information for Accounts which have been associated to it. This is a concept distinct from Secured Profile, though the structure or content of the data may be similar or the same. An Organization Account Profile is unique only to an Organization but reference a single unique Account in an Auth Group. One Account could have as many Organization Account Profiles as there are Organizations to which the Account has been associated.

Domain—Domains serve to further subset Accounts and Products within a parent Organization. One Organization may have one or more Domains. Domains are the mechanism by which an Account can be given access to a Product.

Example Domain Usage: Let's say Sage Industries (an entity managing a Platform instance through an Auth Group) sells two kinds of SaaS software as products, Software Product A and Software Product B, to Acme Rockets Inc. (the customer, a.k.a. Organization). Sage Industries has a large global pool of users, and some of those users need access to Acme Rockets Inc., which is represented as an Organization within Sage Industries. Acme Rockets has multiple departments that use the newly purchased software. Some of those departments should have access to Product B but not Product A, and vice versa. Each department could be represented as a Domain associated to one but not both of the Products within the Acme Rockets Organization. Acme Rockets can then assign Accounts (users) to the Domain representing the single Product they should be able to access.

Product—Products are named business representations of things sold by the entity managing a Platform instance through an Auth Group. A single Auth Group can have one or more associated Products. These Products may be provided or licensed to customers (Organizations) and/or users (Accounts) either directly through the Platform or through an integration to an external system.

Permission—Permissions are definitions of what is possible with regards to actions that may be taken against part or all of a Product by an agent of the system, where such an agent is a human person or machine. A Product may have one or more Permissions.

Role—Roles are groupings of Permissions within the context of a Product, which can be applied to Accounts (users) or Technical Components (machines), allowing for the inheritance of the associated permissions. One Product can have one or more Roles. There are two types of Roles: Global Roles and Custom Roles. A Global Role is visible across all Organizations for any given Product. A Custom Role is created by a User via an Account specific to an Organization for a specific Product. A Custom Role is accessible only through an Account which has been associated to the Organization to which the Custom Role was specified.

SSO—SSO stands for Single Sign-On, which, in the context of a Platform, is representative of a number of standardized technologies used to achieve authentication and authorization. A Platform utilizes established interfaces to these technologies to enable its novel functionality.

Plugins—Plugins are external interface connections which allow a Platform to adopt and expand functionality without significant modification to its technical implementation.

MFA—MFA stands for Multi-Factor Authentication, which is an electronic authentication method in which a user is granted access to a website or application only after successfully presenting two or more pieces of evidence to an authentication mechanism.

Manipulator—A Manipulator, in the context of a Platform, is a functional piece of code that takes as input one or more streams of data, processes that data to a coded and established purpose decided upon at the creation of the Manipulator, and either (i) outputs the resulting data as a new stream of data or (ii) alternatively transmits that data to an external system using one of many possible protocols such as HTTP.

Object Entity—Object Entities are instances of objects generated by modules.

Module—Modules represent logical groupings of functionality which can be implemented as physically distinct compute instances or all together within a single compute instance as virtually distinct functional components.

Data Stream—A Data Stream is created when complete or partial packets of data are logically grouped together and published into a system that allows them to be transmitted over a network or similar topography and concurrently received by one or more listening (subscribing) systems. Data Streams can carry any kind of data and can be populated by one or more publishing systems (i.e., those systems creating the data packets).

Data Model—A Data Model is a metadata representation of an object that is created, distributed, destroyed, or otherwise managed by a Platform. Data Models can be represented using a schema language such as (without limitation) JSON or XML.

Licensing—Licensing is the act of agreeing to grant an entity, such as a business or person, access to a product or data stream managed by a Platform. In this context, something is said to be licensed when there is an agreement to access, regardless of any value-based transactions (e.g., financial, etc.) that may or may not precede or follow the agreement. Despite not being a requirement for this definition, a financial cost is often associated to a License whereby a Platform receives a payment in exchange for the agreement to access.

Container—Containers are a form of operating-system virtualization. A single Container might be used to run anything from a small microservice or software process to a larger application. Inside a Container are all the necessary executables, binary code, libraries, and configuration.

REST—A REST API (also known as RESTful API) is an application programming interface (API or web API) that conforms to the constraints of REST architectural style and allows for interaction with RESTful web services. REST stands for "representational state transfer" and was created by computer scientist Roy Fielding. REST APIs typically operate across a network using an http request-and-response transmission scheme that utilizes http methods such as GET, POST, PUT, PATCH, DELETE, OPTIONS, and so on, that may carry data in the form of a "body" as requests.

OAuth (and OAuth 2.0)—OAuth (Open Authorization) is an open standard for access delegation, commonly used as a way for Internet users to grant websites or applications access to their information on other websites but without giving them the passwords. This mechanism is an industry standard used by Enterprises all over the world.

Enterprise—A generic term typically associated with large business entities with significant customer bases and high annual revenue.

Figure 2:
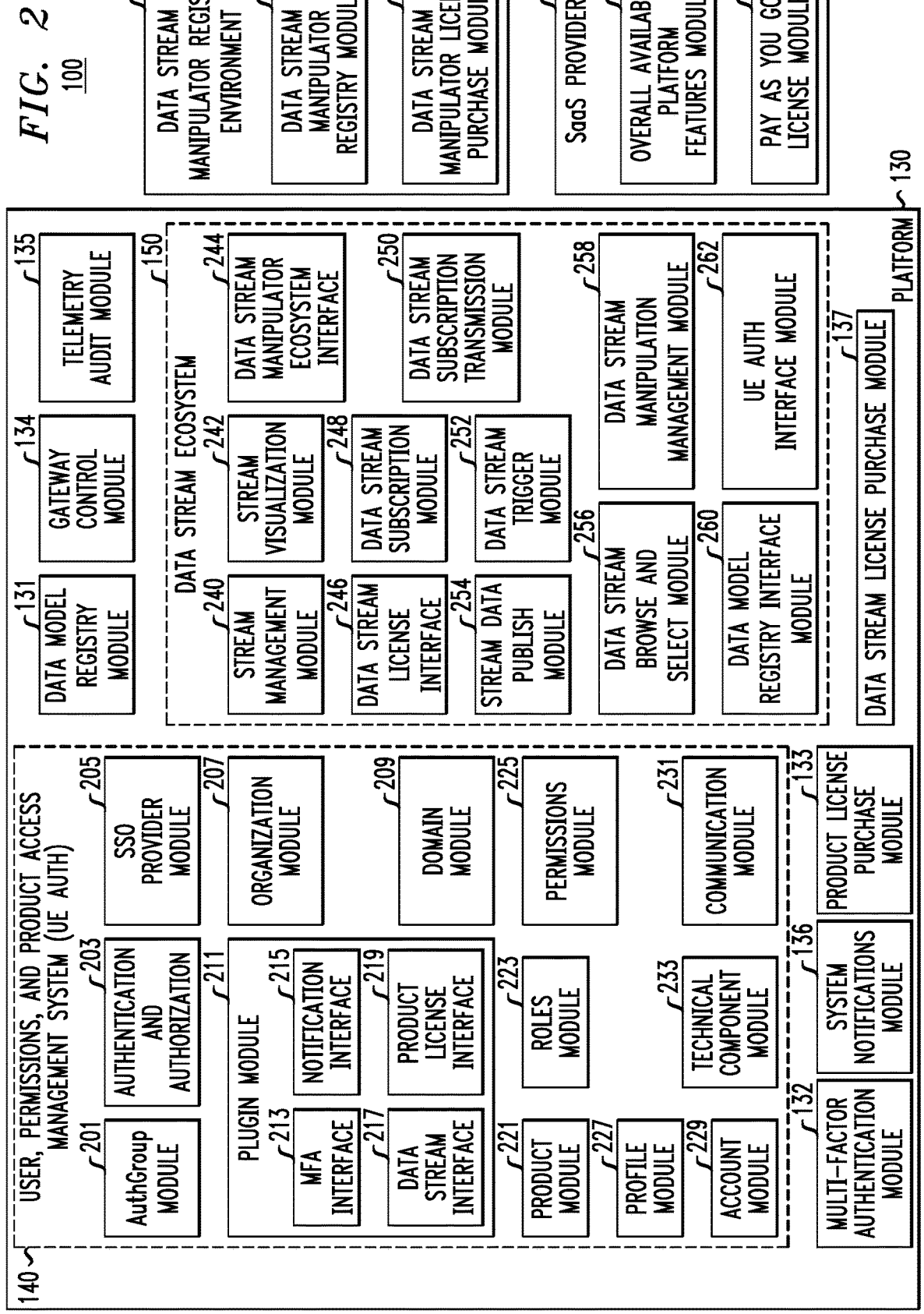

UE Auth—First depicted in FIG. 1 block 140, and then further detailed in FIG. 2 block 140, UE Auth is the name chosen to represent the combined functionality of authentication, authorization, user management, permissions, product access, etc., of which one possible implementation is described throughout this disclosure.

Plugin Module—First depicted in FIG. 2 block 211, the Plugin Module is a grouping of functional components that together allow the overall feature set of the Platform to be expanded.

Native Connection—A Native Connection is a general term used to indicate that a given technology has a preferred, direct, and possibly proprietary interface which can be used by a client to connect for the purposes of sending or receiving data and commands.

Stream Trigger—First depicted in FIG. 4 block 404, a Stream Trigger, sometimes referred to as Trigger, is a functional component of a Platform that allows some data sources to asynchronously cause blocks of functional instructions to execute when certain conditions are met. Triggers create functional reactions that can alter data states both within the Platform and within external systems.

Federated Credential—A token or similar data element, typically represented as readable text formatted as one of several possible data types such as string, JSON, or XML, where authorization to access a system and all access restrictions or allowances are encoded within the token. Federated Credentials might or might not be associated to a central record of a person, user, or machine. The bearer of such a token can access the system associated to the token with all privileges described through the associated restrictions and allowances. Such access is provided without any centralized validation, and as such, the access is said to be "federated".

Platform Embodiments

A technology for a low-code, extensible integration platform solution to manage authentication, distributed technology components, users, permissions, licensed products, product access, and enterprise-queued or streaming data (data streams) is provided. The technology is made available through a single logically integrated Platform. Businesses, entities, persons, or other agents can implement one or more instances of the Platform to leverage its capabilities to create, permute, license, and manage users, software products, and streaming data across customers or departments.

In one example, this technology can be used by a software development company to represent or manipulate products and data streams that they then license and make accessible to customers, and to users within those customers, with various levels of roles and permissions. In effect, the Platform allows the company to build products faster and not only monetize access to the product, but also access to the underlying data streams driving the product through a single integrated technology.

In another example, this technology can be used by a business to speed the integration of distinct and individual technology components, both within a shared network and across separate networks, to share application, user, or other system data between those technology components.

In yet another example, this technology can be used to manipulate data flowing within data streams to both create specific combinations of desired real-time data for internal feature development and provide more-nuanced and varied sources of streaming data for sale to customers. Data streams can be manipulated through a registry of available functions to alter, filter, or combine the data being transmitted. The registry for manipulation functions is presented as an integrated component that allows software developers to freely create, distribute, or license their manipulation functions to each other or Platform users.

In yet another example, this technology can be used by a software company to create an internal registry of all data available both through descriptions and through accessible real-time data streams. The technology empowers Product Managers, Business Analysts, and Engineers to more easily understand and utilize their existing technology and data to then create new and unexpected permutations of those resources to create new products that drive new market acquisition.

In all examples, the platform provides a graphical interface that significantly reduces the amount of code that would otherwise be required.

The provided figures detail how an example Platform accomplishes these and other examples of usage and functionality. The figures depict both logical component block diagrams and interaction flow diagrams. The logical component block diagrams can be interpreted as a distributed microservice-style architecture, where each block represents a distinct compute instance managing the representative module domain of the block and interacting with the other module domains as shown across a Network (e.g., 3201 of FIGS. 32-33). This interpretation is only one example and not representative of all possible implementation permutations. As another implementation example, all the blocks could be interpreted as distinct classes or functions within a single monolithic software architecture executable through a single, well-provisioned compute instance. It is also possible to adopt a hybrid implementation of the two examples: part microservice and part monolith. The intent of the figures is to showcase how these modules interact and that architecture implementation can and will be varied, but that this variability does not alter the nature and intent of the technology presented.

Flow diagrams are shown in many of the figures. For simplicity of explanation, the steps of these flow diagrams are depicted and described as a series of requests, responses, and internal methods; however, steps in accordance with this disclosure can occur in various orders and/or concurrently, and with other steps not presented and described herein. Furthermore, not all represented steps may be required to implement the requests, responses, and methods in accordance with the disclosed subject matter. Those skilled in the art will understand and appreciate that the requests, responses, and methods could alternatively be represented as a series of interrelated states via a state diagram or asynchronous events. It should also be noted that the methods and computational logic disclosed in flow diagrams are capable of being stored on a tangible, non-transitory article of manufacture to facilitate transporting and transferring such methods to computing devices. The term "article of manufacture," as used herein, is intended to encompass any suitable computer-readable device or storage media capable of storing a computer program. Various systems, devices, components, modules, and so forth for implementing the methods may also be used, as shown with the various block diagrams depicting examples of logical groupings of functionality in modules. This disclosure extends to all figures.

Block diagrams are used in many figures. For simplicity of explanation, block diagrams will often show one possible set of interacting modules where those interactions are sequenced one after another. Those skilled in the art will understand that the depicted sequence steps could occur concurrently or potentially in a different order from what is presented. Additionally, the blocks within a block diagram represent one possible grouping of functionality which are further explored through the flow diagrams. As such, all disclosures associated to flow diagrams also apply to the information depicted in a block diagram. Block diagrams make no assumptions regarding technical implementation in terms of specific technologies. Blocks are intended to illustrate one possible example of an abstract representation of an article of manufacture where many alternatives are possible though not explicitly stated. This disclosure extends to all block diagrams.

FIG. 1 represents a high-level component diagram of the Service Provider Environment 100, according to an embodiment of the disclosure. The remaining figures of this document will dive into significant detail of each section; however, FIG. 1 will serve as orientation to the overall sections. Within the Service Provider Environment 100, there are three distinct groupings of modules: The SaaS Provider Platform Management Environment 120, the Platform Provider Environment 130 (aka Platform 130), and the Data Stream Manipulator Registry Environment 160. It should be noted that the SaaS Provider Environment 120 is itself an instance of the same technologies represented in the Platform Provider Environment 130, but with the addition of a Pay-as-You-Go Module 121 and an Overall Platform Features Module 122, which together allow core functionality of the Platform 130 to be disseminated to other Platform instances 130n, where "n" represents a yet-unnamed instance.

The diagram depicts a User or Agent 110 making requests to any of these systems. A User or Agent 110 is representative of people, machines, or other devices capable of making networked requests to the application interfaces of the Platform. Those interfaces could, for example (without limitation), be REST, JSON, Protocol Buffers, XML, native programmatic, or any other protocol that standardizes network-based interaction with software.

The Pay-as-You-Go Module 121 maintains a list of all internal functionality of the Platform Provider Environment 130 and establishes configurable thresholds for usage. When a User or Agent 110 attempts to access a feature or functional element of the Platform Provider Environment 130 in a manner that exceeds the established threshold, the request is denied until the User or Agent 110 purchases additional licensing for the feature or functional element. Examples of this process and additional details are provided in FIGS. 19 and 19A.

The Overall Platform Features Available Module 122 maintains a list of all core functionality of the Platform Provider Environment 130. All the components of the Service Provider Environment 100 can be made available to implementers of the Platform Provider Environment 130 through direct software delivery or Software-as-a-Service subscriptions. In both cases, as implementors create instances of the Platform 130n, they will want to maintain, enhance, and add to the available features when those updates are available. The Overall Platform Features Available Module 122 provides a registry of these features so that they can augment their Platform instances 130, on demand. The Pay-as-You-Go Module 121 additionally acts as a configurable and optional payment gateway to the features represented in the Overall Platform Features Available Module 122.

Within the Platform Provider Environment 130, the Gateway Control Module 134 manages Application Program Interface (API) access to all internal modules and systems. The Data Model Registry Module 131 allows requests coming through the Gateway to be validated as representative of expected data types and models within the Platform Provider Environment 130. This is just one possible use of the Data Model Registry Module 131. It can also be used to validate incoming and outgoing data to Data Streams 406 (FIG. 4) within the Data Stream Ecosystem 150 or configured as a registry of all data definitions within an Implementor 501's overall technology environment.

The Telemetry & Audit Module 135 tracks all transaction data flowing through the Gateway Control Module 134 and publishes that data to the Data Stream Ecosystem 150, depicted by the double arrows.

The Data Stream Ecosystem 150 is a group of modules further detailed in FIG. 2, which allow Data Streams 406 to be defined, managed, visualized, and monetized within the context of the Platform Provider Environment 130 or beyond it as public data. Monetizing Data Streams 406 involves managing licensing and payments, which is the responsibility of the Data Stream License Purchase Module 137. The Data Stream Ecosystem 150 is an independent technology that can optionally operate outside of the Platform 130 and apart from UE Auth 140, or as a directly integrated component.

The block named UE Auth (United Effects Authentication) 140 is a group of modules further detailed in FIG. 2, which manage all elements of identity and access in direct-to-consumer and business enterprise solutions built on the Platform 130. UE Auth 140 defines a novel way to organize users, machines, customers, and products to define their relationships to each other and the Platform itself 130. UE Auth 140 serves as the backbone of the overall Platform 130. UE Auth 140 has a configurable interface to the Data Stream Ecosystem 150 for direct data transmission, depicted by the double arrows. Additionally, UE Auth 140 is an independent technology that can operate outside of the Platform 130. This modularity allows the functions defined by UE Auth 140 to be expanded and utilized beyond the specifications of this document. As an example, UE Auth 140 could be licensed and implemented as a singular solution to Identity and Access and interfaced directly into a different ecosystem of components from those described here.

As stated, UE Auth 140 allows for the management of products, which includes the licensing of products to customers to establish when customers, or when User or Agents 110 specific to the customer, are allowed to access said products. The Product License Purchase Module 133 is a component that allows for the direct management of product licensing by either integrating with a payment provider and managing the data directly, or by interfacing with an existing Customer Relationship Management solution that exists outside of the Platform 130 and syncing data appropriately.

UE Auth 140 may offer several security features to enhance the safety of authenticating Users or Agents 110. One of those features is a Multi-Factor Authentication (MFA) option which is managed through the Multi-Factor Authentication Module 132. This module 132 does not directly implement MFA, but rather serves as a technology-agnostic interface to several possible MFA solutions which can be utilized with UE Auth 140.

The Platform Provider Environment 130 relies on communication between the component of the system and Users or Agents 110. This communication is routed appropriately through the System Notification Module 136. Notification data is transmitted as one or more asynchronous streams of data flowing through the Data Stream Ecosystem 150, depicted by the double arrows. As systems make updates or automated monitors detect state changes, those updates are captured as data packets and transmitted through the Data Stream Ecosystem 150 to be consumed and appropriately categorized by the System Notification Module 136.

The Data Stream Manipulator Registry Environment 160 is a distinct technology, able to operate independently from all other peer components, and interfaced with the Platform Provider Environment 130. The Data Stream Manipulator Registry Environment 160 is a place where Users 110 may create and publish Data Stream Manipulators 162, which are encapsulated functions that take as input the data of one or more Data Streams 406, and then apply a manipulation via code to alter, filter, augment, merge, or otherwise modify the data before outputting that data into the same or possibly a new Data Stream 406. The manipulation code can be of any technology language such as C, C++, C#, Perl, Golang, Python, Java, JavaScript, etc., if the technology used can be encapsulated for and made available within the registry 160. The Data Stream Manipulator Registry Module 161 manages the uploaded manipulators and makes them searchable. The Data Stream Manipulator License Purchase Module 163 allows creators of the Data Stream Manipulators 162 to optionally sell and license their work. Although not necessarily required to do so, UE Auth 140 can manage access to the Data Stream Manipulator Registry Environment 160. The Data Stream Ecosystem 150 has a direct interface to the Data Stream Manipulator Registry Environment 160 to allow Data Stream Manipulators 162 to be utilized within the context of any Platform Provider Environment 130 implementing the Data Stream Ecosystem 150.

FIG. 2 lists all the modules of the overall Service Provider Environment 100. Modules 201-231 are the modules that make up UE Auth 140 and modules 240-262 are the modules that make up the Data Stream Ecosystem 150. In describing the data managed by each module, there will be references to FIGS. 3 and 4, where the data and object entity relationship are further defined. The subsequent figures of this document will provide detailed and isolated examples of how these modules interoperate to create the functionality of the Platform 130. FIG. 2 will primarily provide an overview of the specific modules presented.

Figure 3:
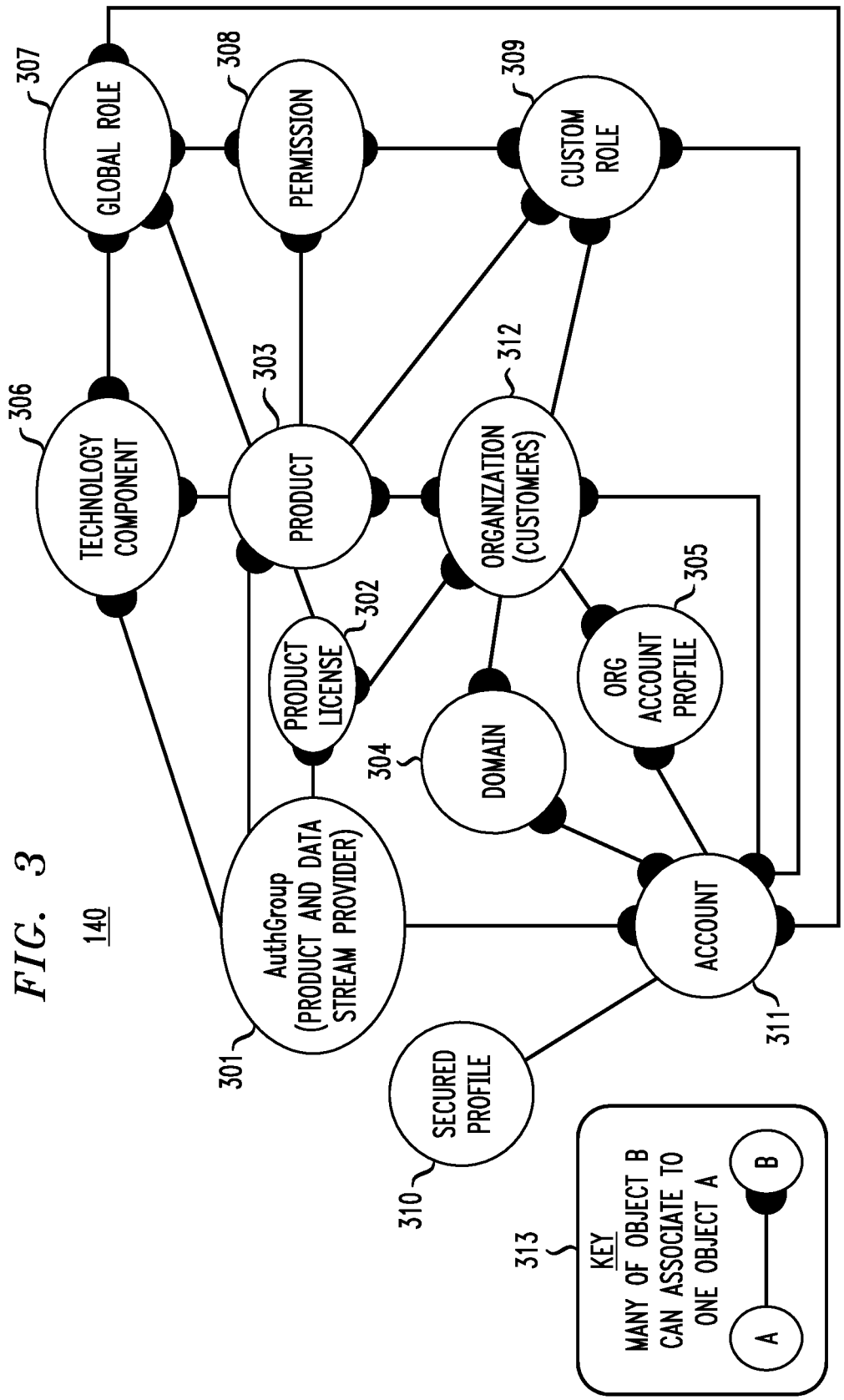

As business entities or individuals implement the Platform 130, they will employ a tenant representing their data in isolation from all other instances of the Platform 130. Additionally, this tenant will have an ability to manage a unique pool of potential Users 110, where unique means that, throughout the entirety of the Platform 130, each instance of a User 110 will be distinct and separate from other instances with no duplication. Users are not necessarily unique across these tenants. Fundamentally, this uniqueness is a function of identity and access, allowing certainty that, when a User 110 accesses the Platform 130, there is confidence in the User's identity. Because this grouping of unique users ultimately represents the Users and Agents 110 interacting with and managing the Platform 130 as a collective tenant, they and the associated tenant are called an Auth Group 301 (FIG. 3). The Auth Group Module 201 manages Auth Groups and all configurations associated to an Auth Group instance 301.

The Authentication & Authorization Module 203 manages the credential validation of a User 110 through an Account 311 (FIG. 3). The Authentication & Authorization Module 203 can do this by leveraging one or more standardized authentication technologies interfaced and made available to the Platform 130 through the SSO Provider Module 205.

The SSO Provider Module 205 will implement authorization protocols and specifications as they become available to the overall Service Provider Environment 100, the SaaS Provider Environment 120, and finally the Platform Provider Environment 130. Typically, it is expected that some variation of OAuth 2.0 will be utilized. An example specification utilizing OAuth 2.0 would be Open ID Connect. Other specifications beyond OAuth 2.0 are possible. The Platform 130 is designed to operate with these technologies but not as a fundamental extension of them.

The Product Module 221 manages Products 303 (FIG. 3), which are business representations of software that the platform implementor has created and wishes to interface with the Platform 130.

The Account Module 229 manages Accounts 311. Accounts 311 is the mechanism by which a User 110 is represented in the Platform 130 and afforded access and privileges to one or more modules or Products 303.

The Organization Module 207 manages Organizations 312 (FIG. 3), which allow subsets of Accounts 311 operated by Users 110, to be grouped together to represent a customer, entity, department, or other group relative to the platform implementor and associated to one or more Products 303. Product association happens through a real or virtual licensing of the Product 303 to the Organization 312.

The Domain Module 209 manages Domains 304 (FIG. 3). Domains allow an Organization 312 to define smaller groupings of User Accounts 311 within that organization context and then explicitly map these domains to Products 303, thereby allowing accounts attributed to the Domain to inherit access to the specified products.

The Permissions Module 225 manages Permissions 308 (FIG. 3), which are always specific to a Product 303, and serve to define actions that can be taken against an element of the Product 303.

The Roles Module 223 manages both Global Roles 307 and Custom Roles 309 (both FIG. 3). Roles are always specific to a Product 303 and define groupings of Permissions 308 that can then be applied to an Account 311. Global Roles 307 are those roles which are visible across all Organizations 312 for any given Product 303. Custom Roles 309 are roles created by Users 110 via Accounts 311 specific to an Organization 312 for a specific Product 303. Custom Roles 309 are accessible only through Accounts 311 which have been associated to the Organization 312 to which the Custom Role 309 was specified.

The Profile Module 227 manages both Secured Profiles 310 and Organization Account Profiles 305 (both FIG. 3). Profiles, whether of type Secure 310 or Organization 305, associate metadata to an Account 311. Metadata in this case could mean any data specific to the User 110 who owns and operates that Account 311. Examples could be, but are not limited to, first and last name, address, picture, and so on. The relationship of these profile types to Accounts 311 and their differences are further detailed in reference to FIG. 3.

The Technical Component Module 233 manages Technical Components 306 (FIG. 3), which are machine-based systems that involve automated access and privileges to the Platform 130 or Products 303. Examples of a Technical Components 306 might be a software application, a microservice, or a UI Application operating in a browser. Technical Components 306 are like Accounts 311, with the key difference being that they are associated to non-human Agents 110.

The Plugin Module 211 is a technical component that allows external technologies to be leveraged by the Platform Provider Environment 130 through specified interface modules 213-219 but is not limited to those specified interface modules 213-219. Future interface modules could be created and incorporated into the Plugin Module 211.

The Notification Interface 215 provides a connection to an external notification/communication system capable of sending content and messages to people.

The MFA Interface 213 provides a connection to the Multi-Factor Authentication Module 132, which manages MFA implementations that can be leveraged with the Platform 130.

The Product License Interface 219 provides a connection to the Product License Purchase Module 133, which allows implementors of the Platform 130 to license their Products 303 to Organizations 312, thereby allowing Organizations 312 to access those Products 303.

The Data Stream Interface 217 provides a connection to the Data Stream Ecosystem 150, allowing UE Auth 140 modules to publish telemetry, audit, and other data to Data Streams 406, as necessary.

The Communication Module 231 handles any messaging that is transmitted from the Platform 130 to a Person (User) 110. The Communication Module 231 can operate independently or through an interface to an external system to handle messaging via the Notification Interface Plugin 215.

Within the Data Stream Ecosystem 150, there are several modules specific to the operation of and interaction with Data Streams 406. Details and examples of what Data Streams 406 can do and be used for are provided in subsequent figures while a generic definition of a Data Stream is provided in the Glossary.

The Stream Management Module 240 provides management over creation, configuration, and destruction of Data Streams 406.

The Stream Visualization Module 242 is responsible for any additional processing or data routing to translate the data and metadata of a Data Stream 406 into information that can be interpreted and displayed by a client UI Application 2101 (FIG. 21) or other graphical rendering technology.

The Data Stream License Interface 246 allows the Data Stream Ecosystem 150 to utilize the Data Stream License Purchase Module 137 to make Data Streams 406 available for purchase or license to customers of the platform implementor.

The Data Stream Subscription Module 248 manages the creation, maintenance, identification, and configuration of all Subscribers 402 (FIG. 4) to one or more Data Streams 406. Subscribers 402 consume data from Data Streams 406.

The Stream Data Publish Module 254 manages the creation, maintenance, identification, and configuration of all Data Publishers 403 (FIG. 4) to one or more Data Streams 406. Data Publishers 403 add data to Data Streams 406.

The Data Stream Manipulator Ecosystem Interface 244 allows Users 110 of the Data Stream Ecosystem 150 to access features and data that are otherwise native to the Manipulator Registry 160 within the context of the Platform 130.

The Data Stream Trigger Module 252 manages all create, update, read, and destroy functionality associated with Stream Triggers 404 (FIG. 4).

The Data Stream Subscription Transmission Module 250 is responsible for interpreting and executing the transmission of data from a Data Stream 406 on behalf of a Subscriber 402, when that configuration of the Subscriber 402 involves data being transmitted via Network 3201 (FIG. 32) protocol to an external destination such as a URI web address, IP address, or other electronic destination that an automated process can access.

The Data Stream Browse and Select Module 256 allows for querying, filtering, and other advanced search operations across Data Streams 406. This module can return detailed information for an individual or multiple Data Streams 406.

The Data Stream Manipulation Management Module 258 manages the orchestration, execution, and general runtime of Data Stream Manipulator Instances 2402 (FIG. 24) which are derived from the Data Stream Manipulators 162 available through the Manipulator Registry 160 and the Manipulator Ecosystem Interface 244.

The UE Auth Interface Module 262 allows the Data Stream Ecosystem 150 to utilize the internal functionality and modules of UE Auth 140.

The Data Model Registry Interface Module 260 allows the Data Stream Ecosystem 150 to access the functionality of the Data Model Registry Module 131.

FIG. 3 illustrates the relationships of the various Object Entities specific to UE Auth 140. The diagram depicts the nature of the relationship of each object entity to all others. Specifically, the diagram shows how many instances of one object can be referenced by another, and vice versa. The Key 313 explains that, when a single line going from Example A meets the darkened circle connected to Example B, this indicates that many objects of type Example B can be associated to a single instance of Example A object at any one time, whereas only a single instance of Example A can ever be associated to any given instance of Example B at one time. Some of the Object Entities shown have already been referenced in previous figures, but a detailed definition for each object entity follows:

An Auth Group 301 represents a tenant within the Platform Provider Environment 130 and therefore all other object entities in the diagram exist within the context of a single instance of an Auth Group 301. There are many configurations for the tenant that are also managed by the Auth Group 301 object definition. For example (and not limited to), public and private keys for secure authorization; timeouts for tokens or other security features; business-specific links to websites, registration pages, or terms of service; branding colors and logos; and other such data may all be maintained as part of the Auth Group 301 definition.

Accounts 311 are operated by Users 110. One Auth Group 301 can have one or more Accounts 311, which in turn have relationships to other object entities. Accounts 311 are unique and include an alpha-numeric identifier. Accounts 311 may include some additional data of the User 110 or be implemented in such a way so as to be completely anonymous with regards to the User 110. In fact, the Secured Profile 310 object entity exists to allow for this latter implementation, isolating User 110 personal identification information away from the Account 311.

A Secured Profile 310 represents personal, private, or other metadata for an Account 311. The Secured Profile 310 entity exists in order to allow an isolation of all private, personal, or sensitive data possible from the Account 311 object, anonymizing the concept of an Account 311 as much as technically possible. As such, information like name, address, or other private data for an Account 311 is stored in the Secured Profile 310 at the discretion of the User 110. An Account 311 can have only one Secured Profile 310 which in turn can reference only one Account 311.

A single Auth Group 301 may have one or more Organizations 312. An Organization 312 may represent one or more different concepts within the Auth Group 301 such as but not limited to: customers of the business, internal departments, vendors requiring access, and more. Organizations 312 are the primary mechanism by which a Product 303 is associated to a group of Domains 304 and Accounts 311 through an associated Product License 302. As shown in the diagram, one or more Accounts 311 can be associated to one or more different Organizations 312, allowing a User 110 to have access across a variety of customers, departments, vendors, etc.

One or more Products 303 can exist within the context of a single Auth Group 301. The word "Product" is a business-centric concept and refers to a grouping of Technical Components 306, Global Roles 309, Permissions 308, and Users 110 that allow a business goal to come to fruition for the benefit of the business implementing an instance of the Platform 130. Examples of a Product 303 include: a website, a mobile application, a direct-to-consumer software solution, an enterprise software solution sold to business entities, etc.

A Product License 302 is a record of transactional exchange that entitles an Organization 312 to have access to a Product 303. The transaction in question may be financial, figurative, for data purposes only, or otherwise defined. A Product License 302 may include as much or as little information as the implementing business warrants to justify the transaction and association of Product 303 to Organization 312. A Product License 302 is not itself indicative of a specific business model such as SaaS subscriptions or direct software sales and can be used to represent either or none. Examples of information that may be represented by a Product License 302 include: purchase amount, subscription amount, date of transaction, terms of license, contact information of the licensee (Organization 312), etc.

An Organization Account Profile 305, allows an Organization 312 to maintain more-detailed information about a User 110 regarding an Account 311 said User may control, without directly accessing or interacting with the private data of a Secured Profile 310. An example of when this would be relevant is in the event of adding Accounts 311 to an Organization 312 to represent employees. In such a situation, the Organization 312 has a right to manage information about the associated employee Accounts 311 such as name, address, and so on; however, the User 110 represented by that employee Account 311 has a right to maintain control over what information is provided and how that information is shared beyond the context of the relationship between the Account 311 and the Organization 312. To facilitate controls for both Organization 312 and Account 311, the Organization 312 never accesses data from the Account Secured Profile 310 but can request that the User 110 release or provide data to populate an internally accessible copy of that data in the form of an Organization Account Profile 305. An Account 311 may have as many Organization Account Profiles 305 as Organizations 312 to which they have been associated; however, the Organization Account Profile 305 can only have one associated Account 311 and may exist within the context of only a single Organization 312.

Domains 304 allow an Organization 312 to create fine-grain distinctions between which Products 303 are accessible by which Accounts 311. An Organization 312 maintains a list of Products 303 which have been licensed to it through a Product License 302, and further associates those licensed Products 303 to Domains 304. When an Account 311 is subsequently associated to a Domain 304, that Account 311 inherits access to whichever Products 303 were associated to the Domain 304. Many Domains 304 can be created within the context of a single Organization 312. One or more Accounts 311 can be associated to one or more Domains 304.

Technical Components 306 represent the implemented technology of a Product 303. A single Product 303 may have one or more implemented Technology Components 306. As such, a single Auth Group 301 may have one or more Technology Components 306 across its one or more Products 303.

One or more Permissions 308 can be created for a single Product 303, but a single Permission 308 may reference only one Product 303. The components of a Permission 308 are described further below in the context of FIGS. 14-14B.

A Global Role 307 is a grouping of Permissions 308. Global Roles 307 and Permissions 308 have a one-or-more-to-one-or-more relationship, allowing for many permutations of the existing Permissions 308 to be described by any number of Global Roles 307. What makes Global Roles 307 "global" is that they exist outside of the context of any one Organization 312. Global Roles 307 exist within the context of a single Product 303 and therefore, every Organization 312 that licenses a Product 303 with a Global Role 307, can access and assign those Global Roles 307 to Accounts 311.

As with Global Roles 307, a Custom Role 309 is also a grouping of Permissions 308 having a one-or-more-to-one-or-more relationship between Permissions 308 and Custom Roles 309. What differentiates a Custom Role 309 from a Global Role 307 is that a Custom Role 309 is created in the context of both a Product 303 and an Organization 312. As such, a Custom Role 309 can be accessed and subsequently assigned only to Accounts 311 associated to the contextual Organization 312.

FIG. 4 builds on FIG. 3, showing how the object entities created within the Data Stream Ecosystem 150 map to those within UE Auth 140. In FIG. 4, Account 311 is marked with an asterisk (*) to show that it is duplicated in the diagram for convenience of readability only. All the diagramed relationships applying to one of the depicted Account 311 circles, apply equally to any other Account 311. As before, some of these object entities were referenced earlier; however, a detailed overview follows:

Data Streams 406 intersect and interact with the objects of UE Auth 140 much as a Product 303 would. One or more Data Streams 406 can exist within the context of a single Auth Group 301. Like Products 303, Data Streams 406 can be licensed to Organizations 312 and associated to Domains 304 to allow Account 311 access. Data Streams may have one or more Technical Components 306 associated to them.

A Stream License 401 is like a Product License 302 in that it is a record of transactional exchange that entitles an Organization 312 to have access to Data Stream 406. Like its product counterpart, a Stream License 401 may be financial, figurative, for data purposes only, or otherwise defined. A Stream License 401 is not itself indicative of a specific business model, such as SaaS subscriptions or direct software sales, and can be used to represent either or none. Examples of information that may be represented by a Stream License 401 include: Organization 312 information, Data Stream 406 access terms, payment schedule if subscription based, payment amount and date if one time, etc.

A Subscriber 402 is an object that represents a system that will receive and consume data in real time from a Data Stream 406. Such a system might be represented as a Technical Component 306 or Account 311, but these secondary associations to explicit Technical Components 306 and Accounts 311 are not mandatory for a Subscriber 402 to be defined. A Subscriber 402 ultimately defines which Data Stream 406 to isolate data from and a unique ID for the Subscriber 402 itself to be utilized as reference for data transmission. The medium of data transmission can be REST-based http web requests, native protocol interfaces to the underlying technology of the Data Stream Ecosystem 2103 (FIG. 21), or some other mechanism as defined by the configuration of the Subscriber 402 itself. A single Data Stream 406 may have one or more Subscribers 402, but a Subscriber 402 is defined for only a single Data Stream 406. As an example, assume a Data Stream 406 exists that has a continuous stream of notification data from various Products 303 within the context of a Platform 130. If a Technical Component 306 representing a "notifications microservice"

was built to manage those notifications, then it could become a Subscriber 402 to the notifications Data Stream 406 and receive/process every notification from every Product 303 in the Platform 130. This "notifications microservice" as represented by the Subscription 402 and Technical Component 306, could further involve that data being transmitted to it through an http URI REST POST method, a process which is technically depicted in FIG. 23.

A Data Publisher 403 is an object that represents a system pushing data into a Data Stream 406. Publishers 403 generate data within the Data Stream 406 to be consumed by Subscribers 402. A Data Publisher 403 may be represented by a Technical Component 306, but this secondary association is not mandatory. It is possible for one or more Data Publishers 403 to push data to a single Data Stream 406, though this may not always be encouraged. The Data Publishers object 403 also defines the medium of transmission to a Data Stream 406. Options include but are not limited to REST http POST methods, native client protocols interfacing the underlying technology of the Data Stream Ecosystem 2103 (FIG. 21), or some other Network 3201 (FIG. 32) approach.

A Stream Trigger 404 is an object that defines a condition upon which some action is taken as applied to a Data Stream 406. A Stream Trigger 404 can define the condition as a specific kind of data showing within the Data Stream 406 (otherwise referred to as filtered data), a recurring timeframe, or some other programmatic or complex logic definition. Regardless of the specific condition logic, when such logic is asserted to be true, an action of some sort is executed. The action in question could be to send an http request to a web URL, execute the logic of a Data Stream Manipulator 162, or any other programmatic or otherwise complex executable set of instructions. Stream Triggers 404 exist in a one-or-more-to-one-or-more relationship with Data Streams 406.

Figure 21:
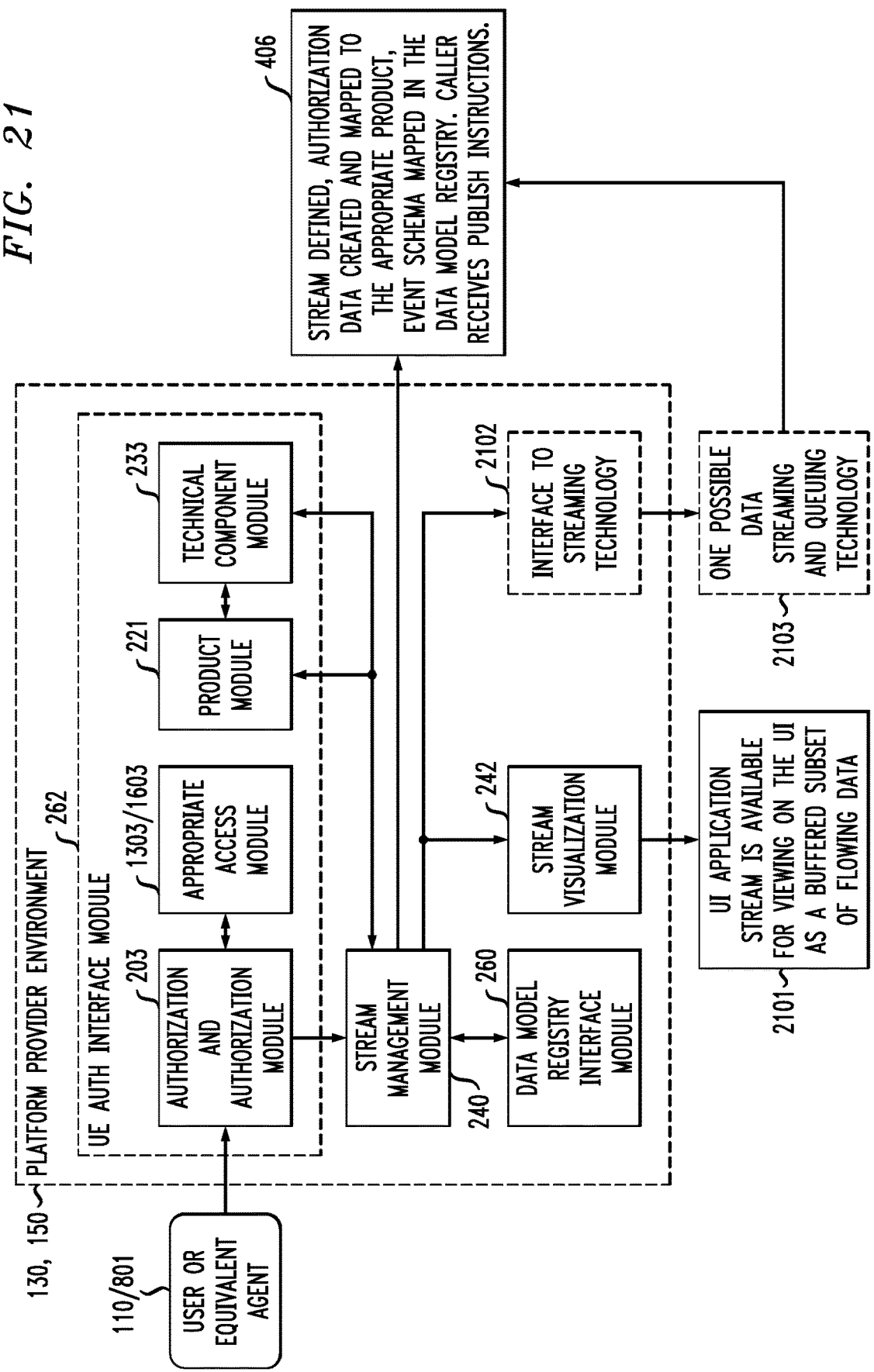
FIG. 21 is a block diagram explaining how the Platform of FIGS. 1-2 might utilize its modules to allow for the creation of Data Streams.

A Stream Visual Filter 405 represents instructions for how a Data Stream 406 should be represented and rendered on a UI Application 2101 (FIG. 21). Data Streams 406 are essentially an undefined number of data packets flowing through a data pipe which data packets are collectively called a Data Stream 406. The UI Application 2101 can visualize this flow and the Stream Visual Filter 405 can define characteristics of this visualization as colors, shapes, patterns, and connections that the UI Application 2101 will interpret and a User 110 will experience. This interaction is further defined in FIG. 28.

Data Stream Manipulators 162 are part of the Data Stream Manipulator Registry Environment 160 and depicted here to show that, through the interface provided by the Data Stream Manipulator Ecosystem Registry interface 244, Data Stream Manipulators 162 have a one-or-more-to-one-or-more relationship to Data Streams 406.

As with Products 303, Data Streams 306 also have associated Domains 304, Permissions 308, and Roles (Global 307 or Custom 309) which are used to define access to Data Streams 406 for Accounts 311 and Technical Components 306.

FIG. 5 illustrates an example of how the UE Auth 140 modules can be used to initialize the creation of an Auth Group 301 tenant according to the present technology. FIG. 5 shows a reference to how a software company or other product provider (Implementor 501) can request an instance of the Platform 130. Once requested, the depicted modules work in concert to initialize while the Account Module 229 creates an Account 311 for the person acting as Implementor 501. All configurations, the Account 311, and the platform, as isolated through an Auth Group 301, are then created and provided to the Implementor 501.

The FIG. 5 sequence shows that the Auth Group Module 201 operates with the SSO Provider Module 205 and Authentication & Authorization Module 203 to set up all the metadata and configurations to initialize a new Auth Group 301 tenant which is initially inactive. The Authentication & Authorization Module 203 works with the SSO Provider Module 205 to create a one-time token which can be used by the Person (User) 110 acting on behalf of the Implementor 501 as a mechanism to securely identify themself to activate the Auth Group 301 and create the first Account 311 within the context of the Auth Group 301, which will automatically be given administrative permissions over all elements of the Auth Group 301. This process is depicted as two serialized requests happening one after another for simplicity of explanation, but, as stated before, these could occur simultaneously.

For the Platform 130 to allow Accounts 311 to have administrative permissions against its resources, the Platform 130 represents itself as a Product 303 within the Auth Group 301 and defines an internal Organization 312 which is accessible only by administrators of the Auth Group 301. Accounts 311 attributed to this Organization 312 and its subsequent Domain 304 can then be given access to the Product 303 representing the Platform 130 itself along with all Roles 307 and Permissions 308 that act across this tenant Auth Group 301 of the Platform 130. This self-reference system is further detailed in FIG. 9. What is important in FIG. 5 is that this data is generated and configured as part of the Account 311 creation to enable management of the Auth Group 301 when created. FIG. 5 shows the Product Module 221, Roles and Permissions Modules 223 and 225 (combined), Organization Module 207, and Domain Module 209 engaged to generate the requested data as part of the Account 311 creation and Auth Group 301 initialization process.

Figure 5A:
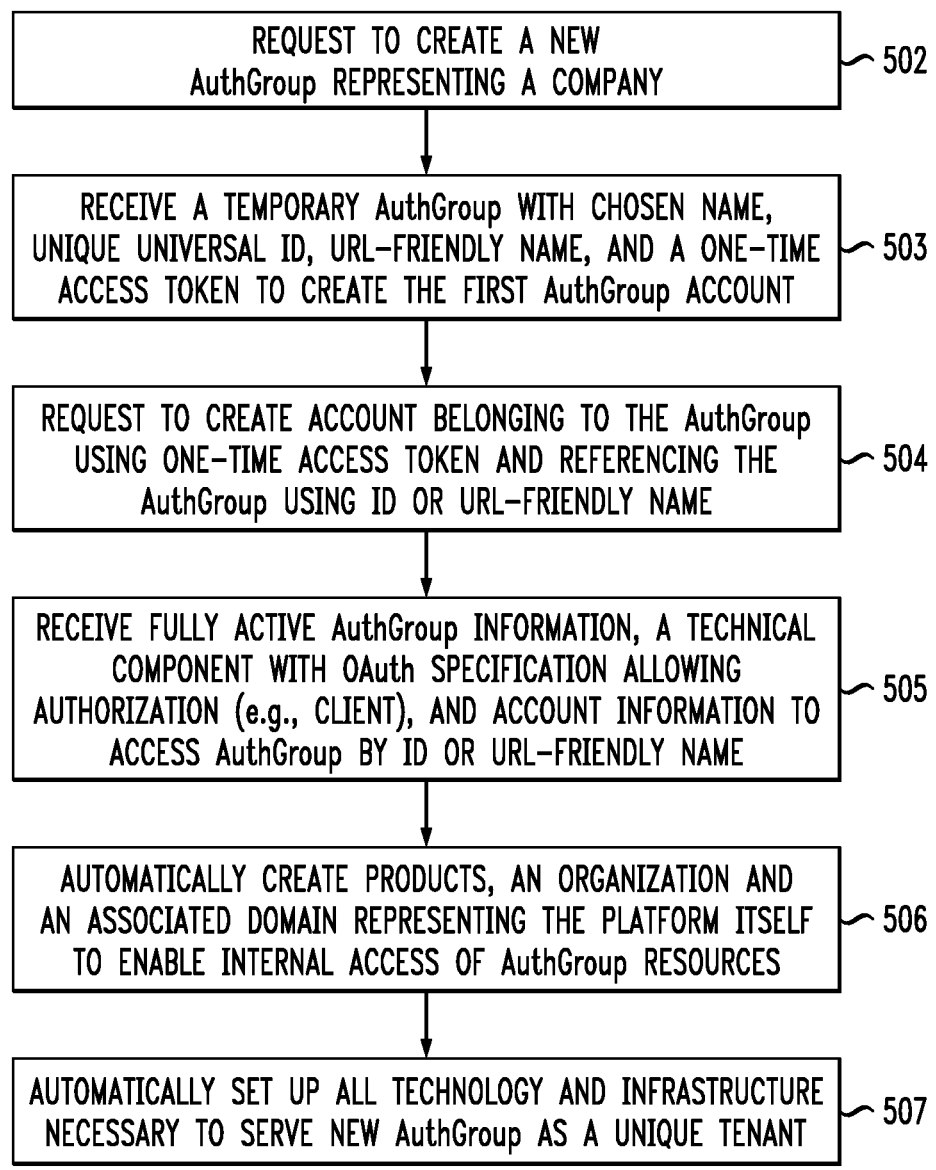

FIG. 5A serves to better illustrate the flow of requests and responses depicted in the block diagram of FIG. 5. In this example, steps 502-507 show one possible flow to achieve the desired result of creating and initializing an Auth Group 301.

As shown in FIG. 5, step 502 depicts a request by an Implementor 501 to create a new Auth Group 301 and an instance of the Platform 130. Also shown in FIG. 5, in step 503, several elements of an Auth Group 301 are created and returned in this possible implementation including a universal ID and a URL-friendly name, which can be used to reference the Auth Group 301 through additional requests. At this point, the Auth Group 301 is described as temporary because it is not yet activated. If, after a period of time, the second request, as depicted in step 504, is not made, then the Auth Group 301 will simply be deleted.

As shown in FIG. 5, in step 504, the one-time access token is used to make a secure request to both create an Account 311 within the context of the new Auth Group 301 and activate the Auth Group 301. This one-time access token is a security feature to ensure that only the person who initially acted on behalf of the Implementor 501 can activate and associate themself to the Auth Group 301. The one-time access token also allows the two requests (steps 502 and 504) to originate from two different devices or locations.

In step 505, the Auth Group 301 is active, and all associated data is created and communicated to the Implementor 501.

All subsequent data creation continues in steps 506 and 507.

Figure 6:
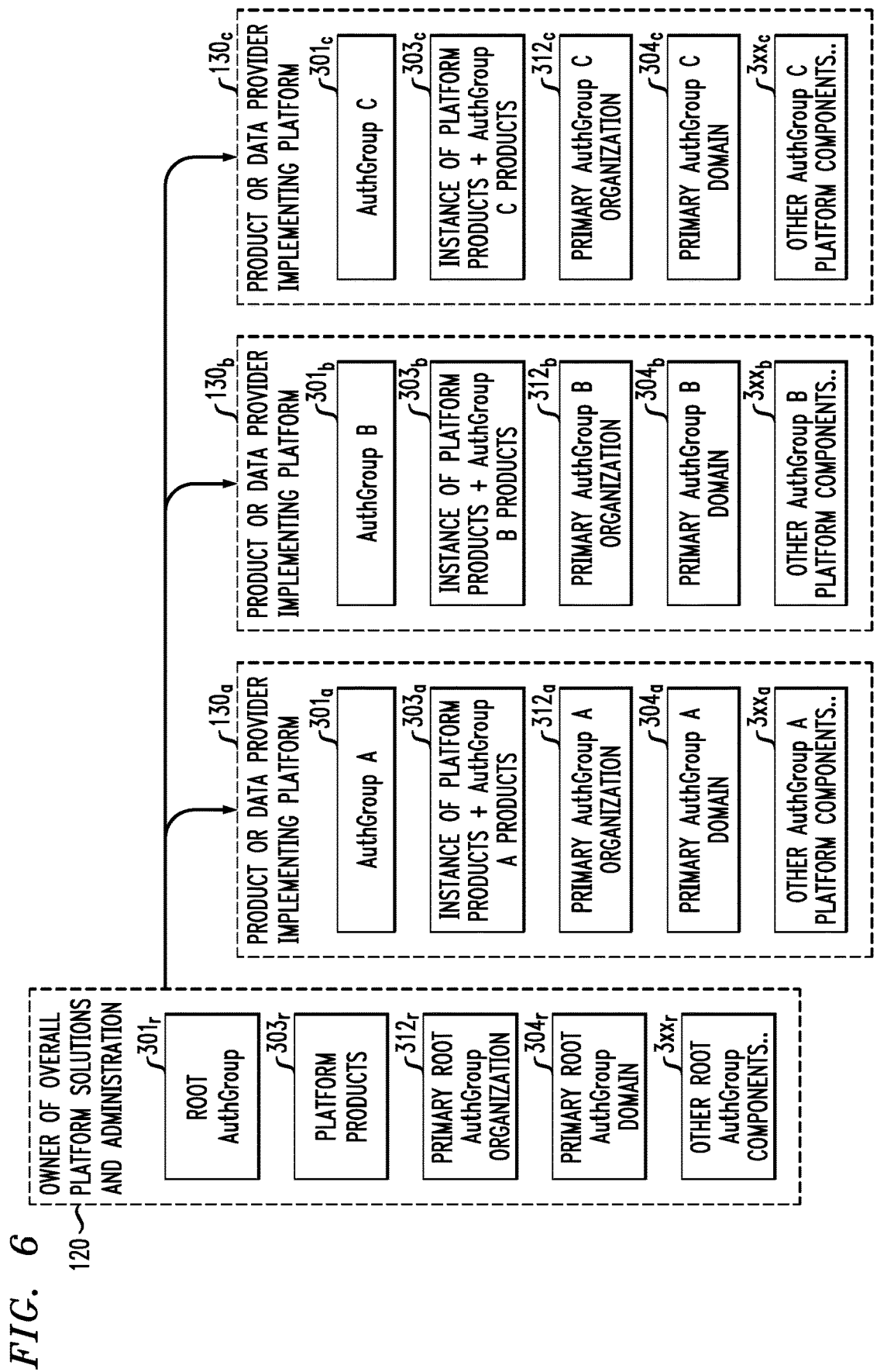
FIGS. 6-6A are a block diagram related flow diagram, respectively, depicting the relationships between individual Auth Groups and showing that all but one (Root) are entirely independent tenant contexts with their own isolated data. The Root Auth Group, being special, is designed to administrate the overall Platform across all other Auth Groups.
Figure 6A:
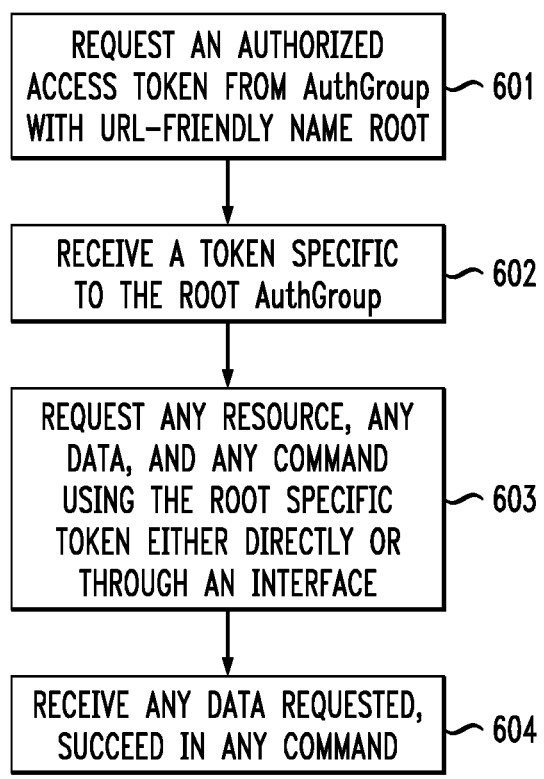

FIGS. 6-6A are a block diagram and flow diagram, respectively, that illustrate the multi-tenant nature of the Platform 130 as defined through the context of Auth Groups 301. FIG. 6 shows that the Root Auth Group 301, is unique among Auth Groups. The Provider Environment 120 has previously been defined as a unique instance of the Platform 130 itself, which is depicted here. FIG. 6 shows that the Provider Environment 120 exists alongside and administrates three instances of the Platform 130a, 1306, 130c. All these instances of the Platform 130, including the Provider Environment 120, have unique instances of UE Auth 140 object entities, beginning with Auth Groups $301_r$, $301_a$, $301_b$, $301_c$ and so on to all other potential component object entities found in FIG. 3 as depicted by the label $3xx_r$, $3xx_a$, $3xx_b$, and $3xx_c$. It should be noted that, while FIG. 6 shows these Auth Group 301 instances alongside each other, this does not imply that implementation of the associated data must be specific to a single data store. In particular, all the object entities described regardless of Auth Group 301 context might exist in a single database (DB) or in multiple databases, including each Auth Group 301 being representative of a distinct database: $DB_r$, $DB_a$, $DB_b$, $DB_c$, and so on.

Figure 7:
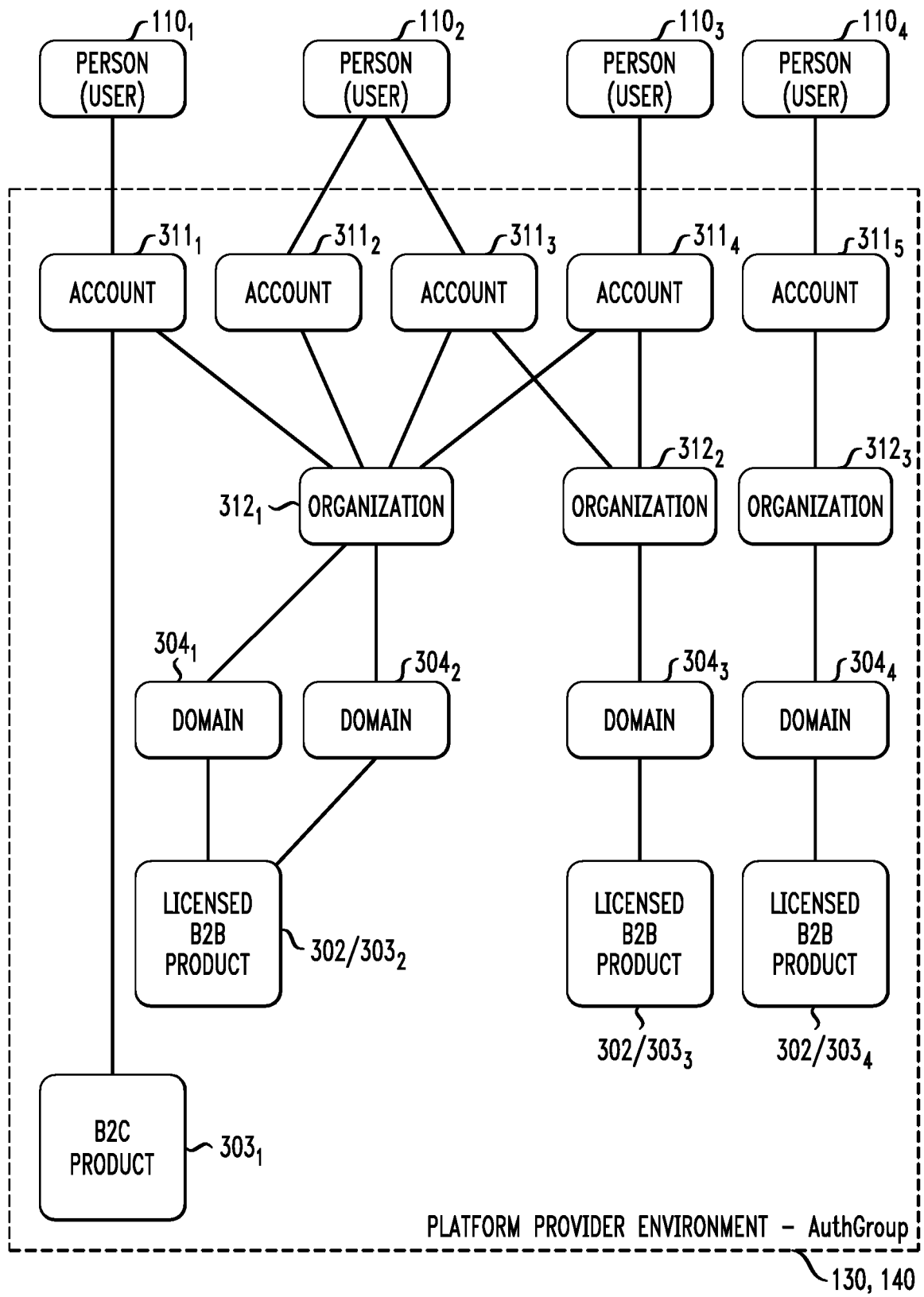
FIGS. 7-7D illustrate examples of how a person controls an Account to access both B2C self-service products and enterprise B2B products. With respect to enterprise B2B products, Accounts can be set to access one or more Organizations, which in turn then allow access to Domains and Roles within those Organizations, which then further allow access to B2B Products licensed to their parent Organizations.
Figure 7A:
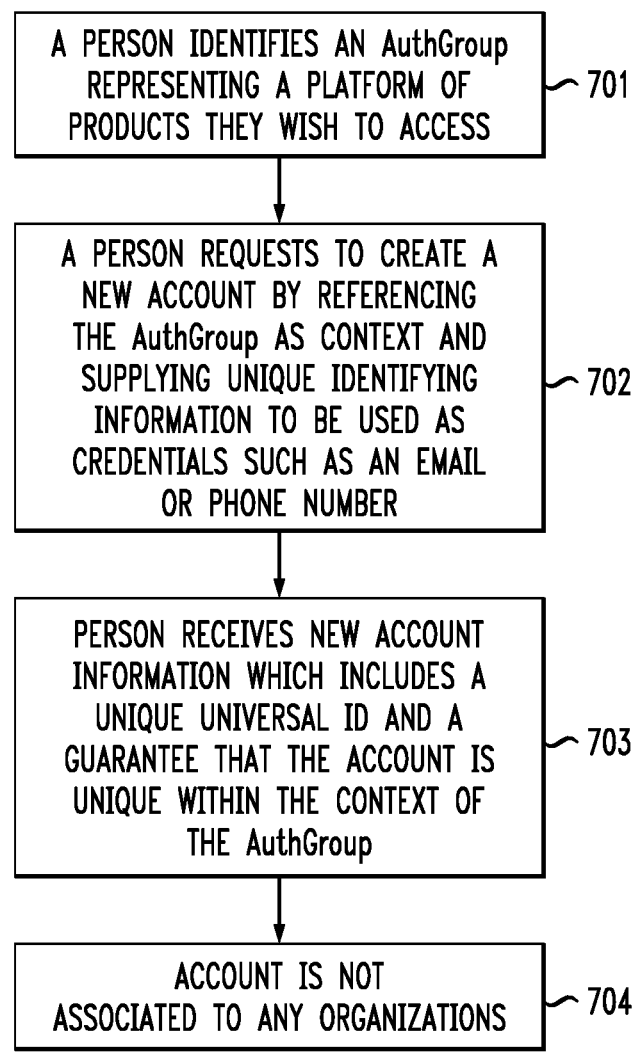
Figure 7B:
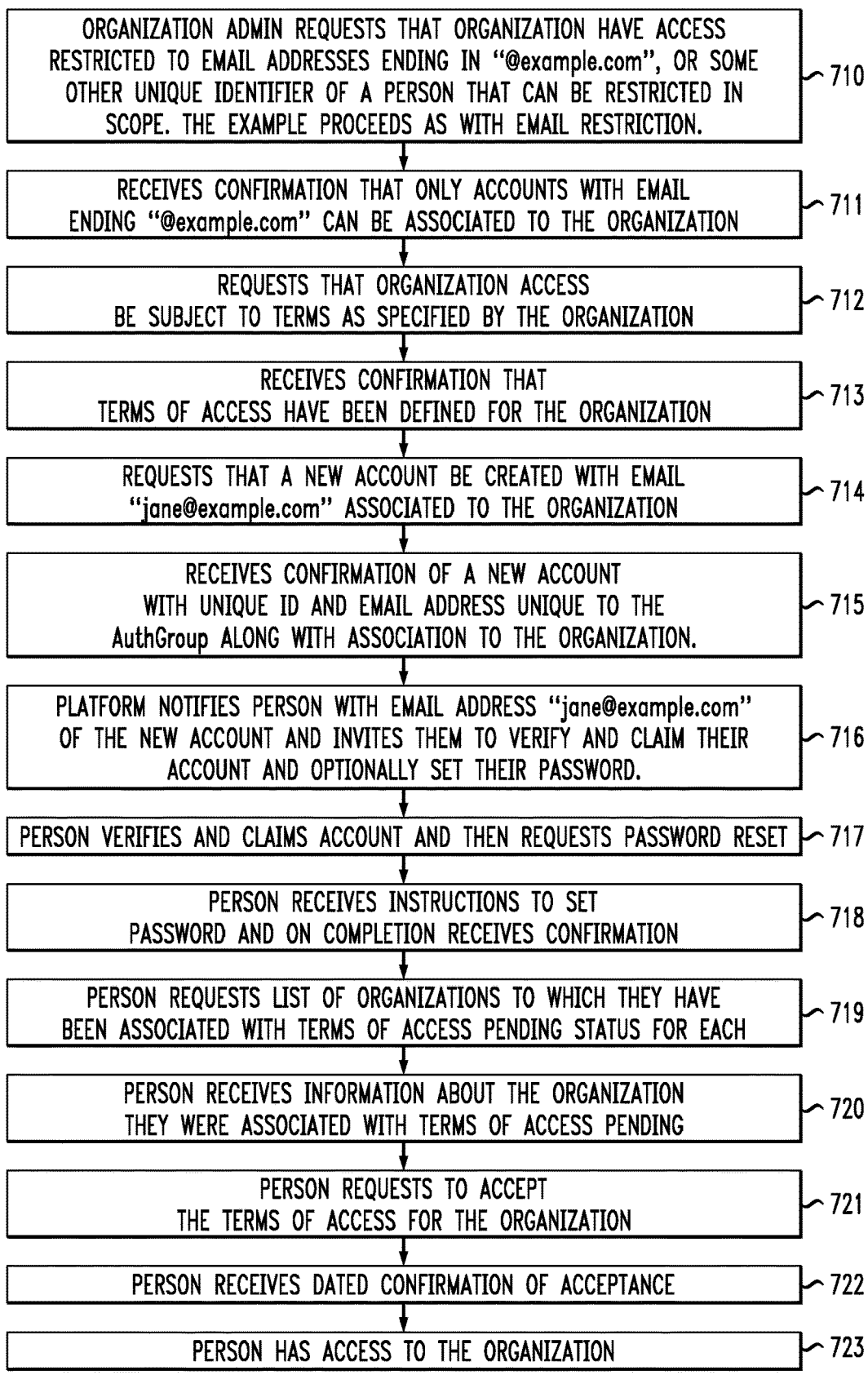
Figure 7C:
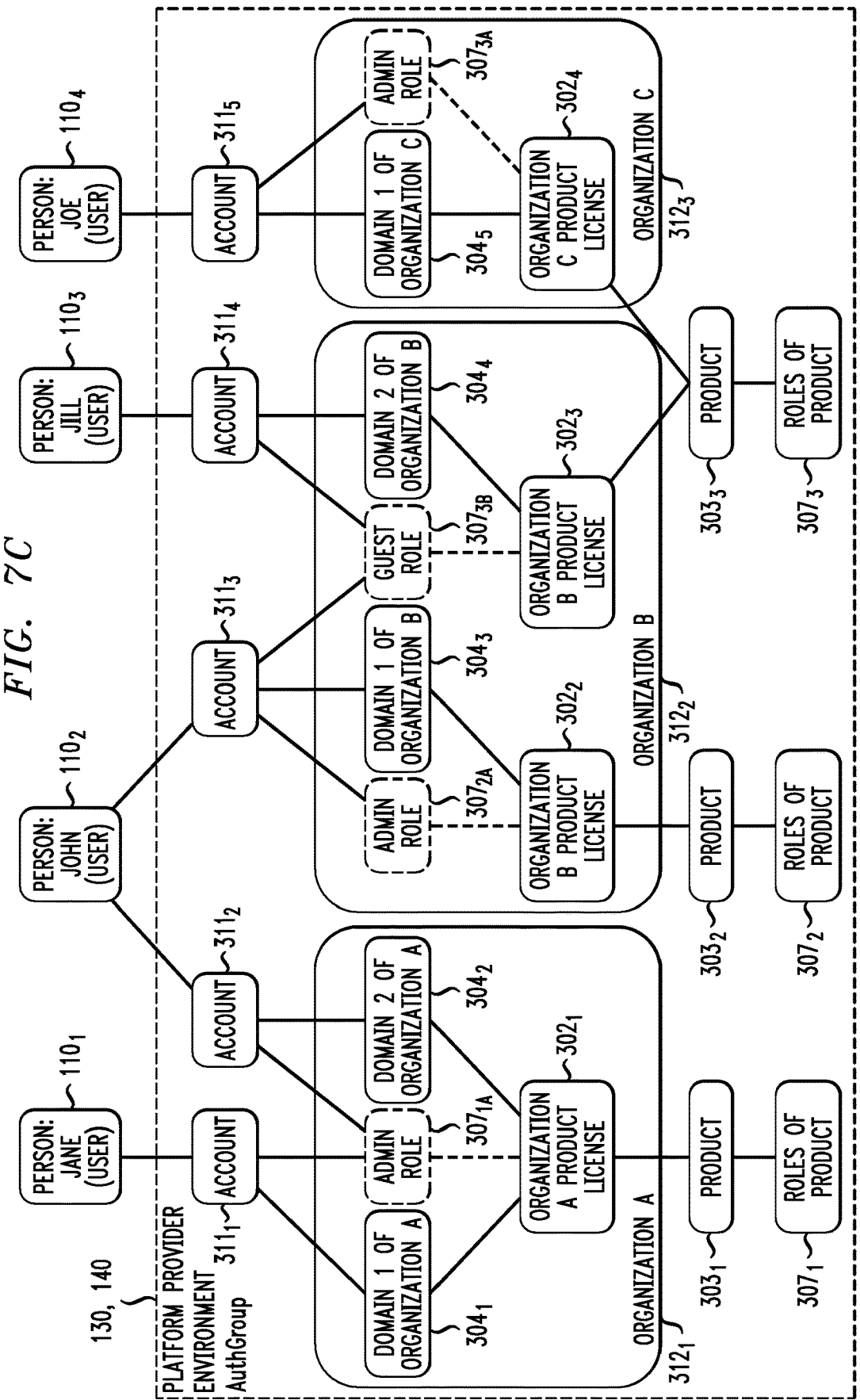
Figure 7D:
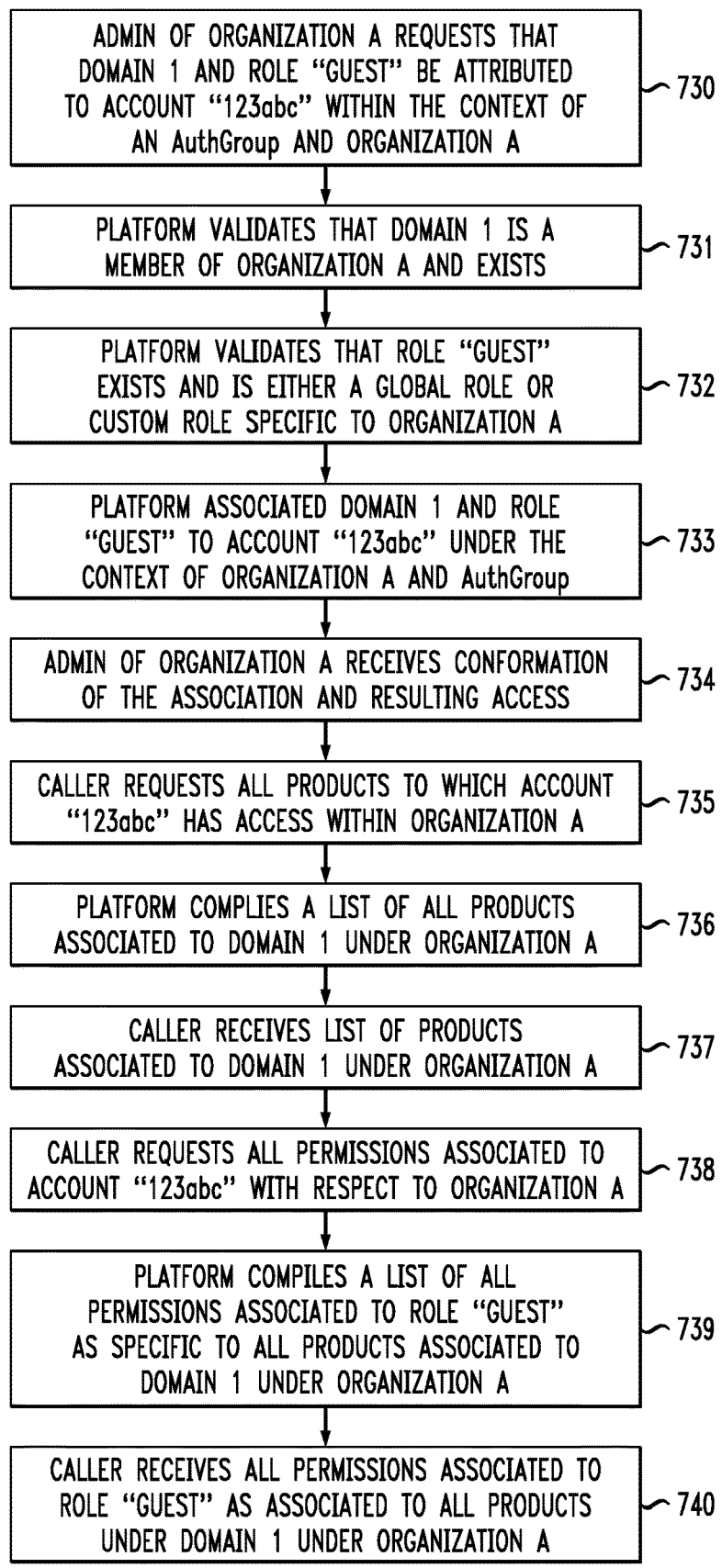

In the flow diagram in FIG. 6A, as shown in FIG. 6, steps 601-604 illustrate an example that, as a member of the Root Auth Group $301_r$, a User 110 would be able to access and administrate any other Platform $130_{a,\ b,\ c,\ etc.}$ FIGS. 7-7D illustrate the relationships between a Person (User) 110, an Account 311, an Organization 312, Domains 304, and Products 303. FIG. 7 shows an example of four users represented as Persons 1101 through 1104. The Platform 130 allows a hybrid direct-to-consumer and enterprise license-based model of access within the context of an Auth Group 301. Direct-to-consumer means that a Product 303 intended for Business-to-Consumer (B2C) usage as indicated by the example Product 3031, can be accessed directly by an Account 311 such as the example Account 3111. An example of a B2C product is a free-to-use mobile application or a web portal that Users 110 can self-register with to obtain an Account 311 independent of an Organization 312. Self-registration is the act of a Person or User 110 requesting that an Account 311 be created for their usage within the context of the Auth Group 301, which has not been associated in any way to any Organization 312.

FIG. 7A illustrates the flow of such a request through steps 701-704. It should be noted that, while this flow example illustrates the request of an Account 311 by providing an email or phone number, this is only one example of such a request, and Account 311 creation is not necessarily predicated on this data. The flow of FIG. 7A illustrates this one possible approach as an example of the present technology. As an alternative example, it should be possible to request an Account 311 with a secure reference to a mobile device as the only linking mechanism to the Person 110. Yet another alternative example, it should be possible to request an Account 311 with a reference to a non-fungible token (NFT) as the unique mechanism linking the Account 311 to the Person 110. An NFT is a unique and non-interchangeable unit of data stored on a digital ledger (e.g., blockchain). The precise data associated with the request is less important than the fact that an Account 311 is created and related to the Person 110 and other objects of the Platform 130.

FIG. 7 shows that Person 1101 has access to Account 3111, which is directly associated to B2C Product 3031.

In FIG. 7, "Licensed B2B Product" is a reference to those Products 303 that are sold Business-to-Business (B2B) and made available to one or more Accounts 311 only through an Organization 312 which licenses those Products 303 through a Product License 302. An example of a B2B Product 303 might be an "e-commerce inventory application" which is sold to customers with a one-time fee where those customers are represented as Organizations 312. Another example of a B2B Product 303 might be "Pay-per-use Payment Provider solution" made available to customers through an on-going subscription, where those customers are represented as Organizations 312. In both examples, the record of transaction, be it one-time or recurring payment subscription, is captured as part of the Product License 302, which then associates the Product 303 to the Organization 312. Once associated, Organizations 312 can then allow Accounts 311 to be associated to both them and the Products 303 which they have licensed.

An example of this behavior can be viewed in FIG. 7. Let's assume a company called "Sage Industries" is represented by Organization 3121. "Sage Industries" purchased a Product 3032 called "Inventory Management" from the platform Implementor 501. The employees of Sage Industries (Organization $312_1$) are Persons $110_1$, $110_2$, and $110_3$. Notice, Person $110_4$ is not associated in any way to Organization $312_1$. Each of these Persons $110_1$-$110_3$ has an Account ($311_1$-$311_4$) also associated to the Auth Group 301, so that they can access and utilize the new Product $303_2$ to carry out their responsibilities for Sage Industries (Organization $312_1$). Persons/Users 110 are not limited to a single such Account 311, as is shown with Person $110_2$ controlling Accounts $311_2$ and $311_3$. These Accounts could be self-registered Accounts that are associated to Organization $312_1$ after creation as in FIG. 7A, or they can be created on behalf of the Persons and associated to Organization $312_1$ as is depicted in FIG. 7B with steps 710-723. Regardless of mechanism of creation, those Accounts $311_1$, $311_2$, $311_3$, and $311_4$ are associated to Sage Industries (the Organization $312_1$) to access the Product $303_2$ instance and associated data purchased from the Implementor 501 by the Organization $312_1$ through a Product License $302_2$.

FIG. 7 also illustrates four additional concepts worth noting. First, FIG. 7 shows that the Account $311_1$ is associated both to B2B Product $303_2$ via Organization $312_1$ and to B2C Product $303_1$. This shows the hybrid and novel nature of the technology of the Platform 130 to allow both kinds of business models to coexist within the context of a single Auth Group 301 managed by the Implementor 501 of the Platform 130. Second, Accounts 311 can be associated to multiple Organizations 312 simultaneously, as is shown with Accounts $311_3$ and $311_4$, which are each associated to both Organization $312_1$ and Organization $312_2$. Third, by associating to two different Organizations 312, Accounts $311_3$ and $311_4$ have access to the Products 303 associated to both Organization $312_1$ (Product $303_2$) and Organization $312_2$ (Product $303_3$). This access does not allow any data from the context of Organization $312_1$ to flow to Organization $312_2$, or vice versa. The Accounts $311_3$ and $311_4$ can simply choose a preferred context and access the appropriate Organization/Product $312_2$/$303_2$ or $312_3$/$303_3$. Lastly, an Organization 312 may have multiple Domains 304, as is illustrated by Organization $312_1$ and Domains $304_1$ and $304_2$. The utility of Domains 304 and their function to map Products 303 to Accounts 311 is better illustrated in FIG. 7C.

The example of Organization $312_1$ shows that Domains $304_1$ and $304_2$ both map to a single instance of the licensed Product $303_2$. FIG. 7C shows a more-complete association of these relationships, whereby Domains $304_1$ and $304_2$ are the primary mechanism by which Accounts $311_1$ and $311_2$ gain access to the Product $303_1$ via Product License $302_1$.

Within the context of an Organization 312, Domains 304 serve as the connector between a Product 303 and an Account 311. Only those Products 303 which have been associated to an Organization 312 can be then further associated to a Domain 304. Any Account 311 then associated to that Domain 304 will have access to all Products 303 associated to the Domain 304.

In FIG. 7C, Account $311_2$, for example, has access to Product $303_1$ because this Account $311_2$ is associated to Domain $304_2$ of the Organization $312_1$. As a different example, Account $311_3$ has access to Products $303_2$ and $303_3$, because, within the context of Organization $312_2$, both of those products have been licensed via Product Licenses $302_2$ and $302_3$, and Domain $304_3$ has been associated to both Products $303_2$ and $303_3$, then subsequently assigned to Account $311_3$. Similarly, Account $311_5$ in FIG. 7C has access to Product $303_3$ because Organization $312_3$ licensed Product $303_3$ via Product License 3024 and assigned the Product $303_3$ to Domain $304_5$, which was subsequently assigned to Account $311_5$.

FIG. 7C further illustrates how an Account 311 is assigned privileges within a Product 303 through the assignment of Roles 307. Note, FIG. 7C is depicting with Global Roles 307; however, Custom Roles 309 would function the same way except they would be depicted within the context of the corresponding Organization 312 only. Recall from the object entity diagram of FIG. 3 that Roles (Custom 309 or Global 307) exist within the context of a Product 303, where Custom Roles 309 simultaneously exist within the context of an Organization 312. When an Organization 312 licenses a Product 303, the Organization 312 inherits access to the associated Roles 307/309 and can then assign these roles to Accounts 311 along with the Domains 304. This duality of Domain 304 and Role 307/309 assignment provides product access and product privileges, otherwise known as Permissions 308, which are discussed in detail in FIG. 14 through FIG. 15.

An example of both Product 303 and Role 307/309 assignment in FIG. 7C is Account $311_3$. As shown earlier, Account $311_3$ has access to Products $303_2$ and $303_3$ via Domain $304_3$ of Organization $312_2$. The Account $311_3$ further has the "Admin" Role $307_{2A}$ of Product $303_2$ and the "Guest" Role $307_{3B}$ of Product $303_3$ assigned within the context of the Organization $312_2$. The terms "Admin" and "Guest" are arbitrary examples to illustrate two examples of distinct Roles 307. As indicated previously, a Role 307 is a grouping of permissions, which in turn describe privileges against a Product 303. These Role 307 and Domain 304 assignments (specifically the assignment and not the object entity of Role 307 itself) do not exist outside of the context of the Organization 312. Each Organization 312 manages its own implementation of the assignments, and if an Account 311 belongs to more than one Organization 312, then the context of Organization interaction determines which assignment of Domain 304 and Role 307/309 should facilitate access and privileges.

FIG. 7D illustrates the process of assigning a Domain 304 and Role 307/309 to an Account 311 with steps 730-740.

Figure 8:
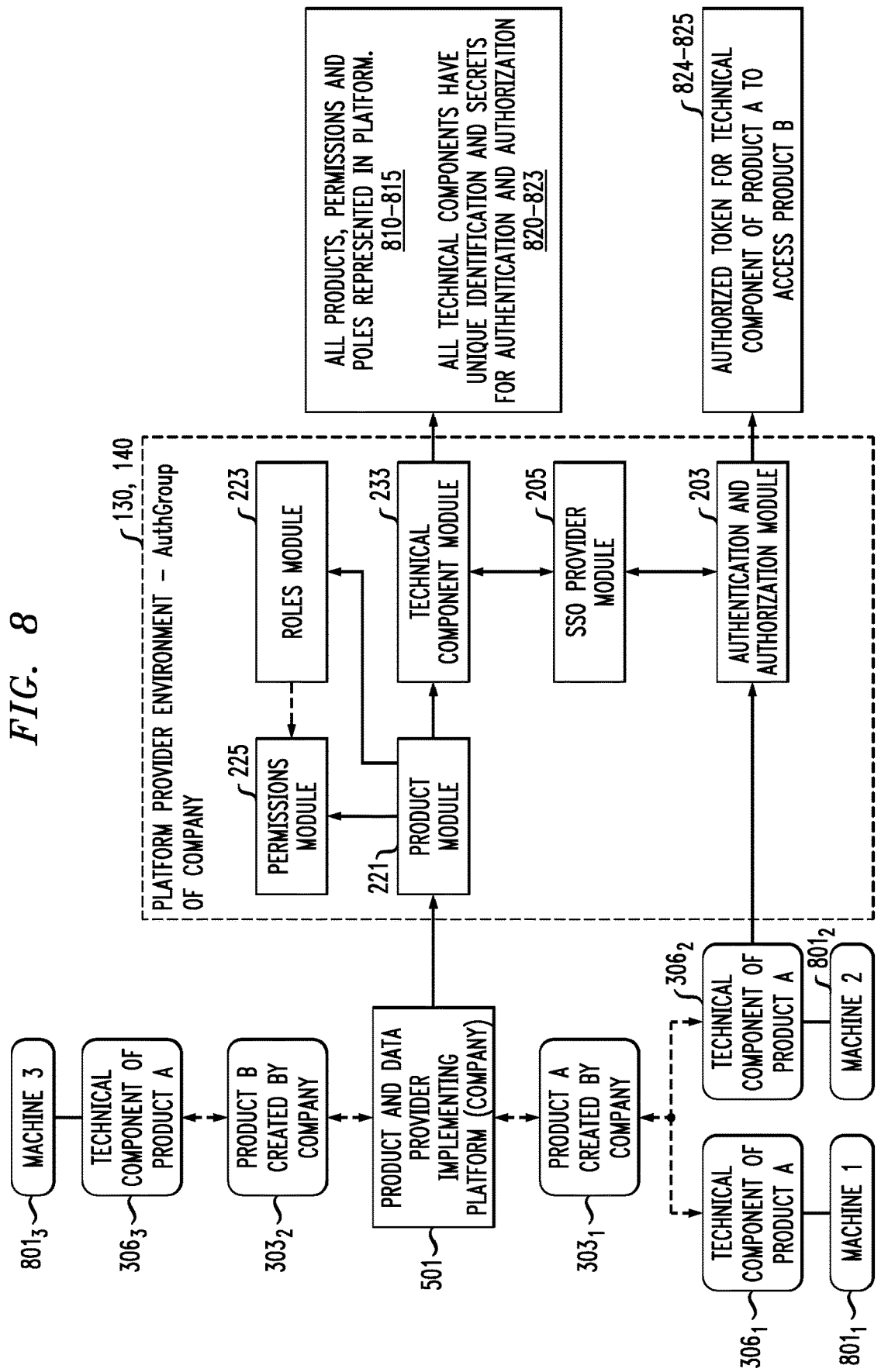
FIG. 8 is a block diagram showing an example of how the Platform of FIGS. 1-2 manages the process of adding new Products to an Auth Group and enabling the machine components (Technology Components) of those Products to securely interact.
Figure 8A:
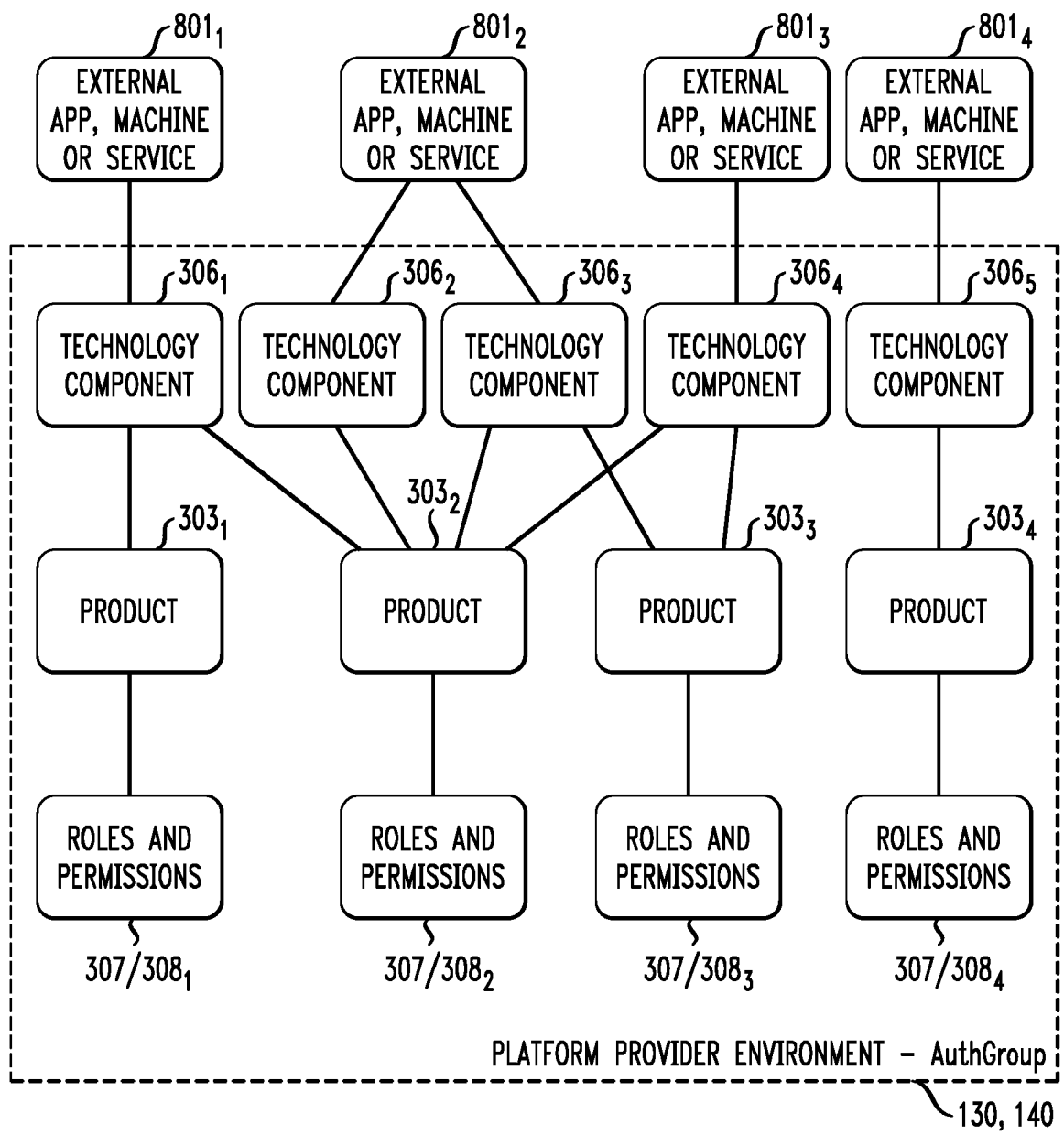
FIGS. 8A-8C build on FIG. 8 and illustrate how machine elements of an external business product are represented in the Platform of FIGS. 1-2 by an entity referred to as "Technology Component" and are then connected to the internal Product definition representing the external business product, along with associated Permissions and Roles.
Figure 8B:
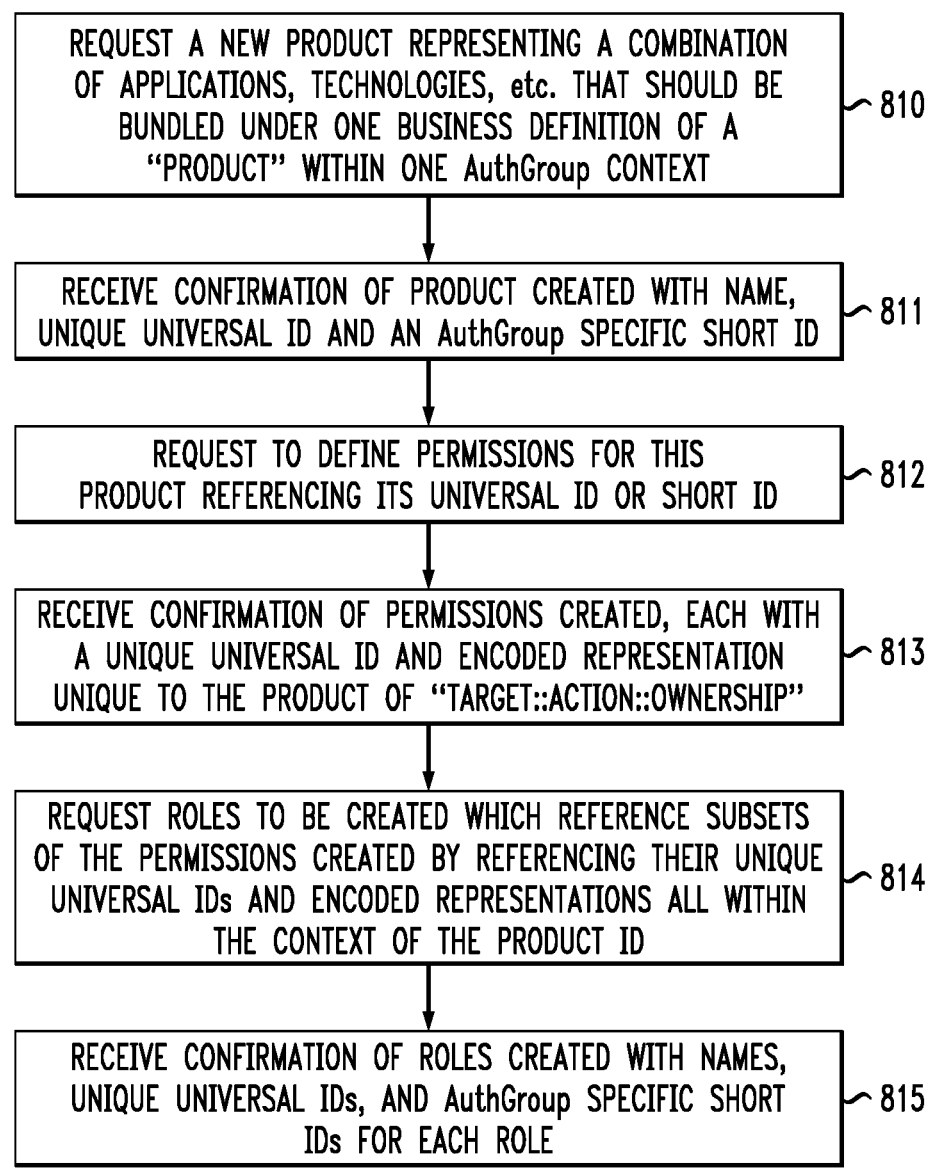
Figure 8C:
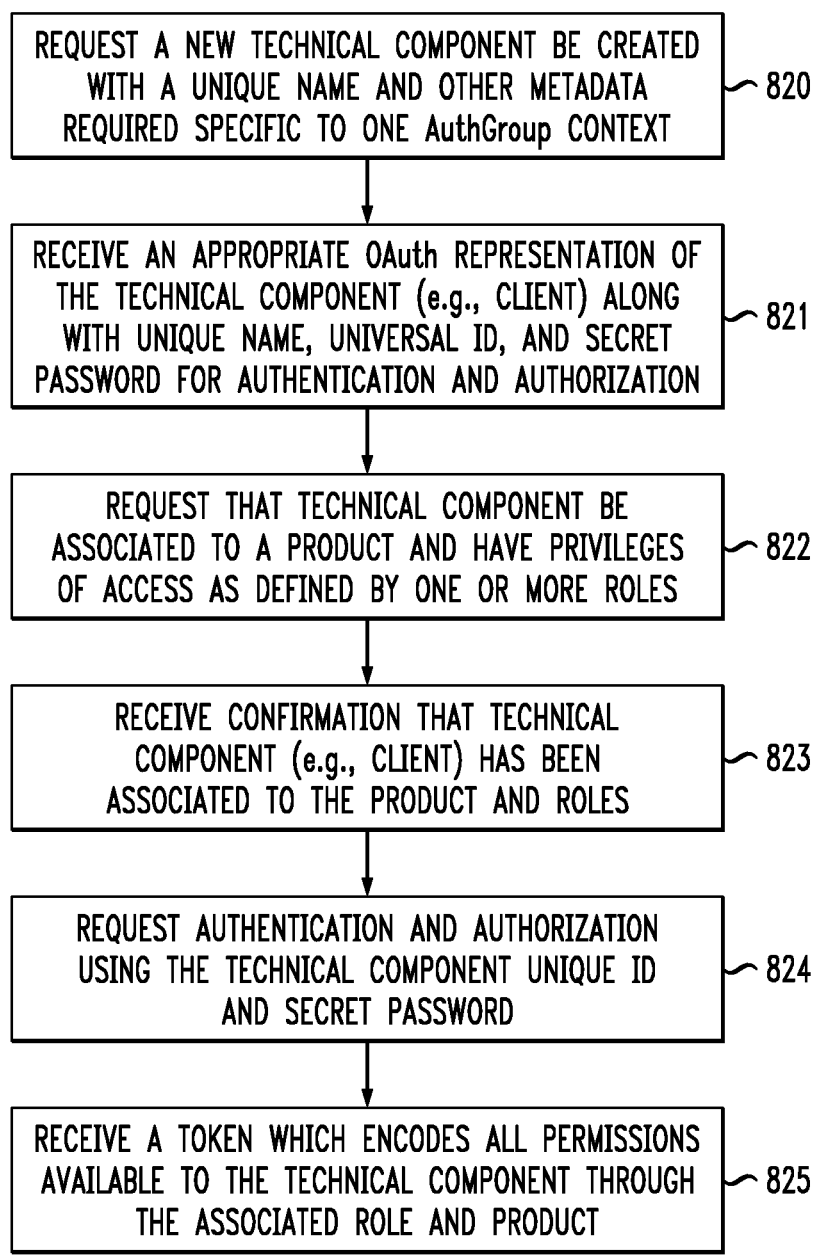

FIGS. 8-8C illustrate an example of two concepts within the Platform 130. First, the concept of a Product 303 and how the system might operate to allow its addition and management primarily through the Product Module 221. Second, the concept of a Technical Component 306, which represents real-world physical or virtual compute resources (i.e., web services, apps, or other non-human machine agents of the Platform 130), herein referred to as Machines 801 (FIG. 8A). Those skilled in the art will know that business Products 303 represented as software include one or more real-world Machines 801 that house the modules, algorithms, and other compute systems or resources that process the functionality of the Product 303. The Platform 130 allows the Implementor 501 to represent those Machines 801 as Technical Components 306, managed by the Technical Component Module 233, and in accordance with their actual real-world usage, associated to the Product 303 to allow the visualization and coordination of resources within the Platform 130. As an example of this concept, the Platform 130 is itself a Product 303 and it too may have multiple Machine 801 systems enabling its functionality as part of the Service Provider Environment 100. Those Machine 801 components are internally represented as Technical Components 306.

It should be noted, a Technical Component 306 and the Technical Component Module 233 are logical concepts with a variety of possible implementations. As an example, they can be implemented literally from FIG. 8, with the Technical Component Module 233 as a distinct Machine 801 microservice component responsible for all create, read, destroy, and update operations. Alternatively, Technical Components 306 could be represented as overloaded data elements of an OAuth 2.0 implementation provided through the SSO Provider Module 205. As an example of this approach, OAuth 2.0 has a data model called a "Client" which could be used as an inherited base object to define the broader concept of a Technical Component 306. Regardless of implementation, the concept of a Technical Component 306 is distinct and therefore agnostic of any underlying support system such as an OAuth 2.0 library or other.

FIG. 8 shows the Platform Implementor 501 and its interaction to the Platform 130 specific to two Products $303_1$ and $303_2$ created by the Implementor 501 either prior to implementation of the Platform 130 or after. Furthermore, Product $303_2$ is associated to a single Technical Component $306_3$, while Product $303_1$ is associated to two Technical Components $306_1$ and $306_2$. One of the possible use cases of the Platform 130 is that it allows for the simple integration of different technology systems, or put another way, it allows one Product $303_1$ to communicate with another Product $303_2$ in an automated and standardized way that does not require human intervention. This capability allows technology to share data, such as Product $303_1$ providing data to Product $303_2$ so that Product $303_2$ can showcase a new feature that utilizes the otherwise inaccessible data alongside its own. As another example, this capability allows a Product $303x$, where "x" is any instance, to begin modernization of its Machine 801 (FIG. 8A) components by allowing new more-modern Machine 801 components to be created and made accessible to communicate data with Product $303x$. In this way, the new Machine 801 components are able to stay in sync with the original components and data, and eventually replace the older Machine 801 components. Finally, businesses rely on the ability of Products $303x$ to interconnect and communicate because that ability allows those businesses to make accessibility to these Products $303x$ easier for Users 110. When a User 110, represented by an Account 311, inputs data into Product $303_1$, that data can be shared with Product $303_2$ so that the User 110 does not have to enter the same information more than once.

FIG. 8 shows an example implementation of the modules that enable the functionality described. In FIG. 8, the Implementor 501 has access to Product Module 221 through an API (represented by the arrow connecting Implementor 501 and Product Module 221), and can add, update, or remove one or both Products $303_1$ and $303_2$. The specific request flow of creating a Product 303 on the Platform 130 is illustrated in FIG. 8B in steps 810-815. An Implementor 501 also has access to the Technical Component Module 233 and can add, update, or remove individual Technical Components $306_1$, $306_2$, and $306_3$, associating all to the Products 303 as appropriate. The specific request flow of creating a Technical Component 306 on the Platform 130 is illustrated in FIG. 8C in steps 820-825. With each Product $303_1$ or $303_2$, the Implementor 501 can further define the Permissions 308 and associated Global Roles 307, managed by the Permissions Module 225 and Roles Module 223.

Figure 32:
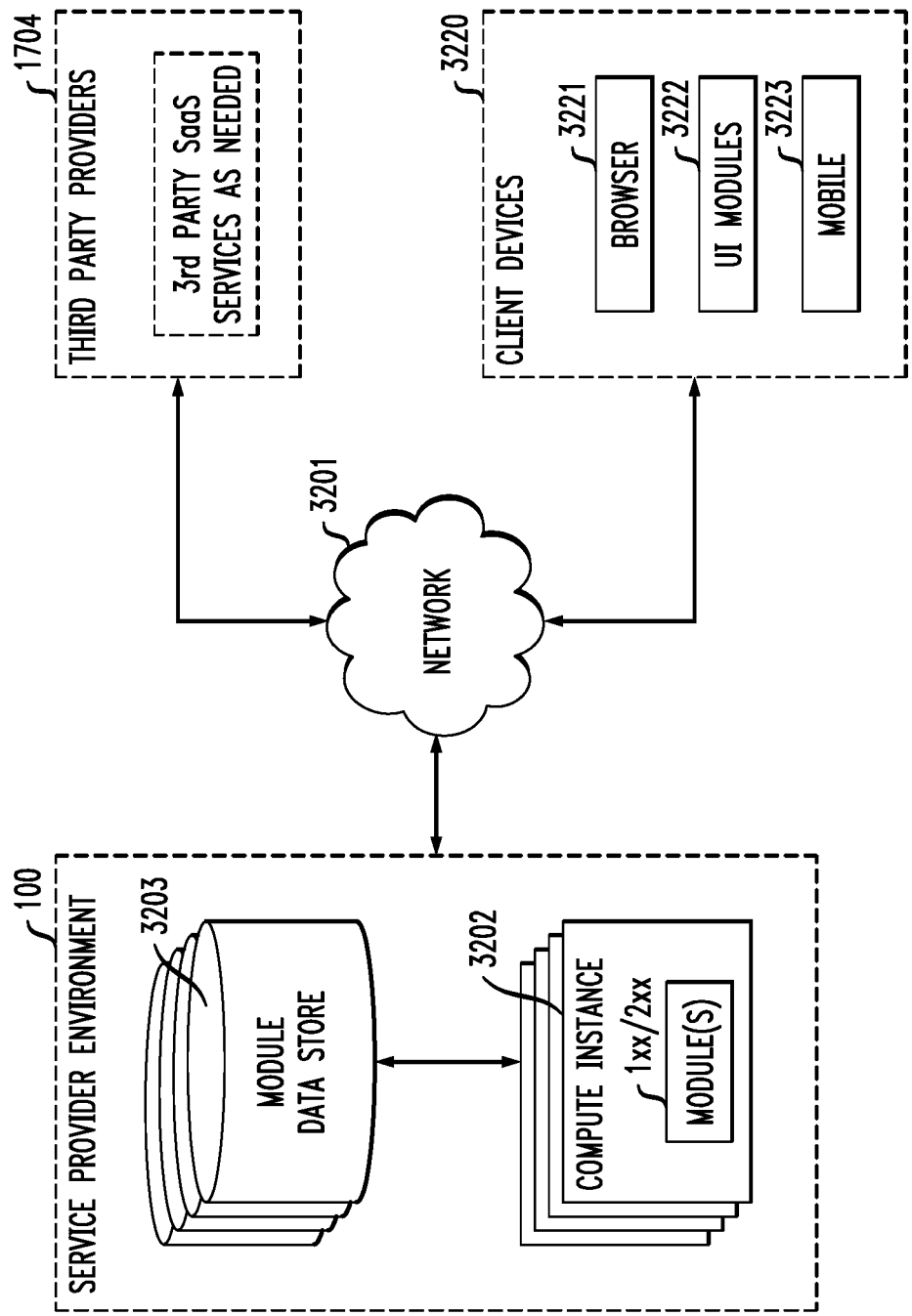
FIG. 32 is a schematic overview of distinct data, compute, and client visualization resources coordinating in accordance with an example of present technology.

Technical Components 306 include a unique ID and generated secret code which can be used by the Machine 801 component to authenticate through the Authentication & Authorization Module 203. As indicated in FIG. 8, the Authentication & Authorization Module 203 utilizes one of the integrated SSO systems as made accessible through the SSO Provider Module 205 to securely authenticate the Technical Component 306, in the same way as the Authentication and Authorization Module 203 might facilitate the authentication of credentials of an Account 311. This process then allows a Technical Component 306 to request and receive an access token which can be used to make secure API requests across a Network 3201 (FIG. 32). The Platform 130 allows the association of Product 303, Permission 308, and Roles 307 to be assigned to the Technical Components 306 as part of this process, resulting in specific access being encoded directly into the access token provided. This access encoding allows any system receiving a request with this token to know exactly what Products 303, Roles 307, and Permissions 308 have been attributed to the Technical Component 306 which requested the token, in effect, clarifying what actions the Technical Component 306 is authorized to take through a unique and granular description of Permissions 308 further described in FIG. 14.

FIG. 8A further demonstrates the relationship of external Machine 801 components to Technical Components 306. A single Machine $801_2$, as an example, may be associated to multiple Technical Components $306_2$ and $306_3$. A Product $303_2$, as an example, may have multiple Technical Components $306_1$, $306_2$, $306_3$, and $306_4$. The same is true of Product $303_3$ with Technical Components $306_3$ and $306_4$. Finally, a Technical component $306_1$, as an example, may itself be associated to multiple Products $303_1$ and $303_2$. The same is true of Technical Component $306_3$, which is associated to Products $303_2$ and $303_3$. As shown in FIG. 8A, each Product $303_x$ is also associated to corresponding Global Roles $307_x$ and Permissions $308_x$.

Figure 9:
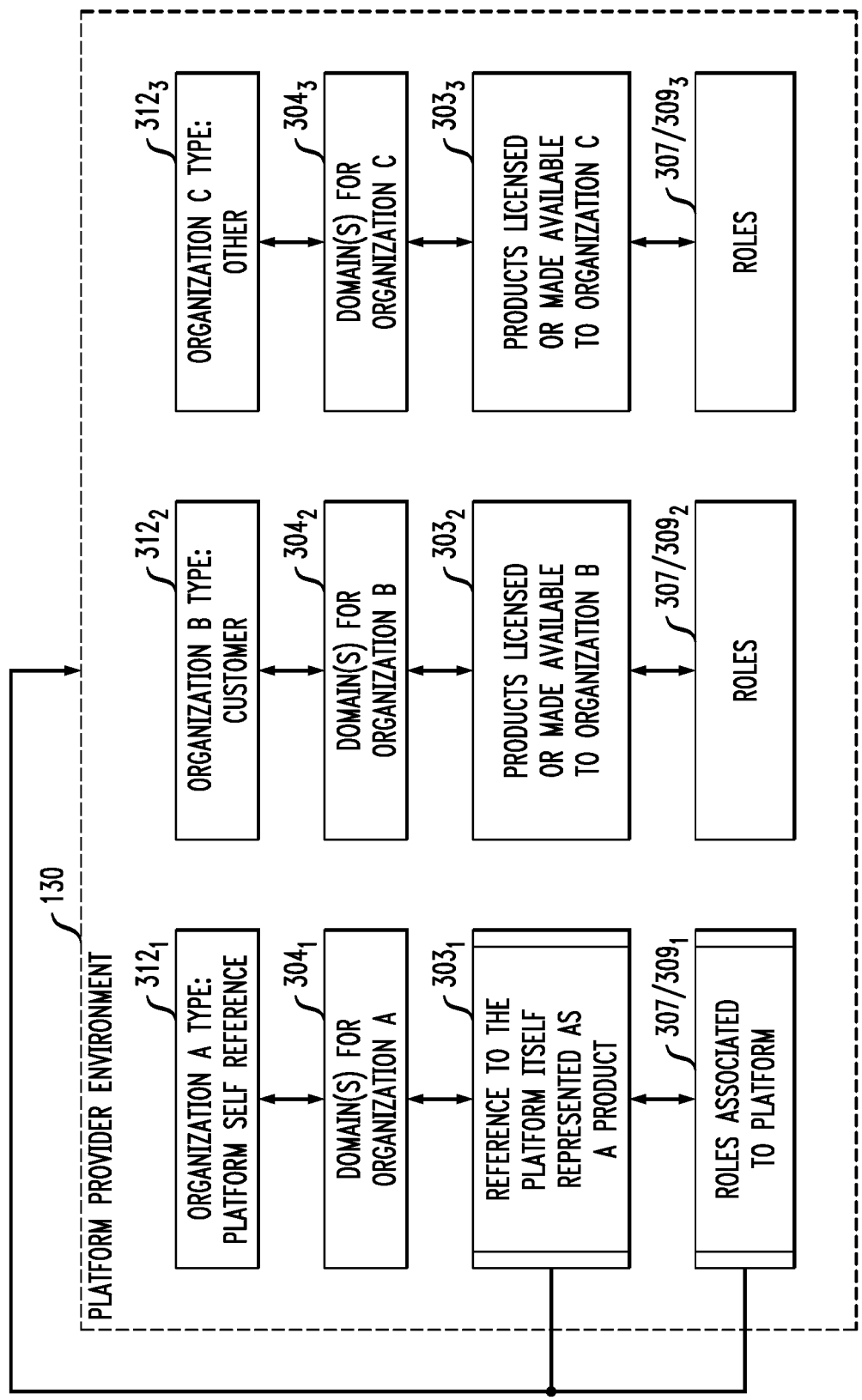
FIG. 9 is a block diagram depicting how the Platform of FIGS. 1-2 uses its data framework and technical components to manage itself as a Product just as it would for other Products through an Organization of a type designed to reference itself. It further shows that different kinds of Organizations can be represented in a single Auth Group context.
Figure 9B:
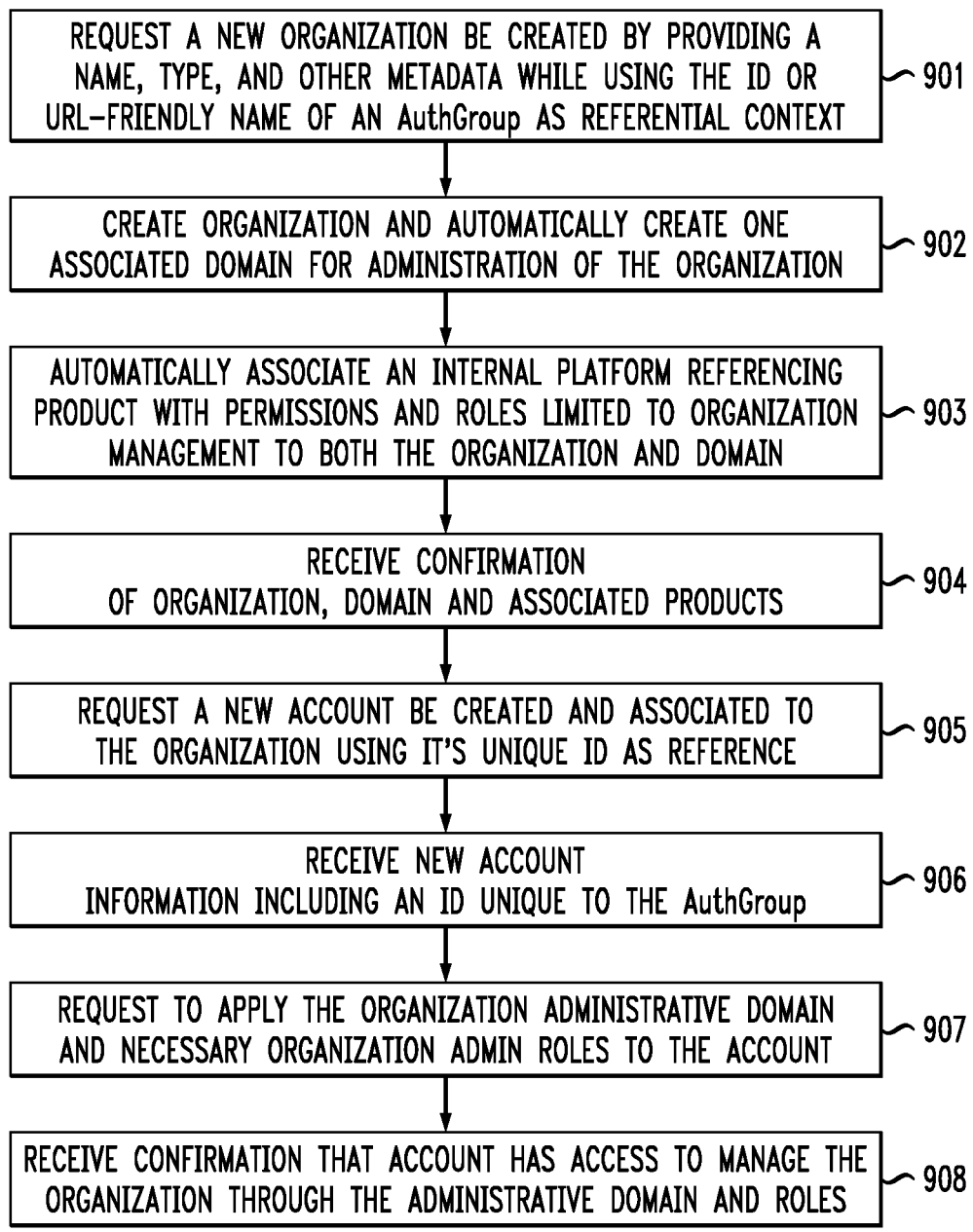
FIGS. 9B-9E build on FIG. 9A to illustrate how an Organization representing a customer might be requested with an admin Account being assigned to the Organization, how a Domain can be requested within the context of an Auth Group and Organization with any Products licensed to the Organization then being associated to this new Domain, and how an Organization might be deleted or deactivated.
Figure 9C:
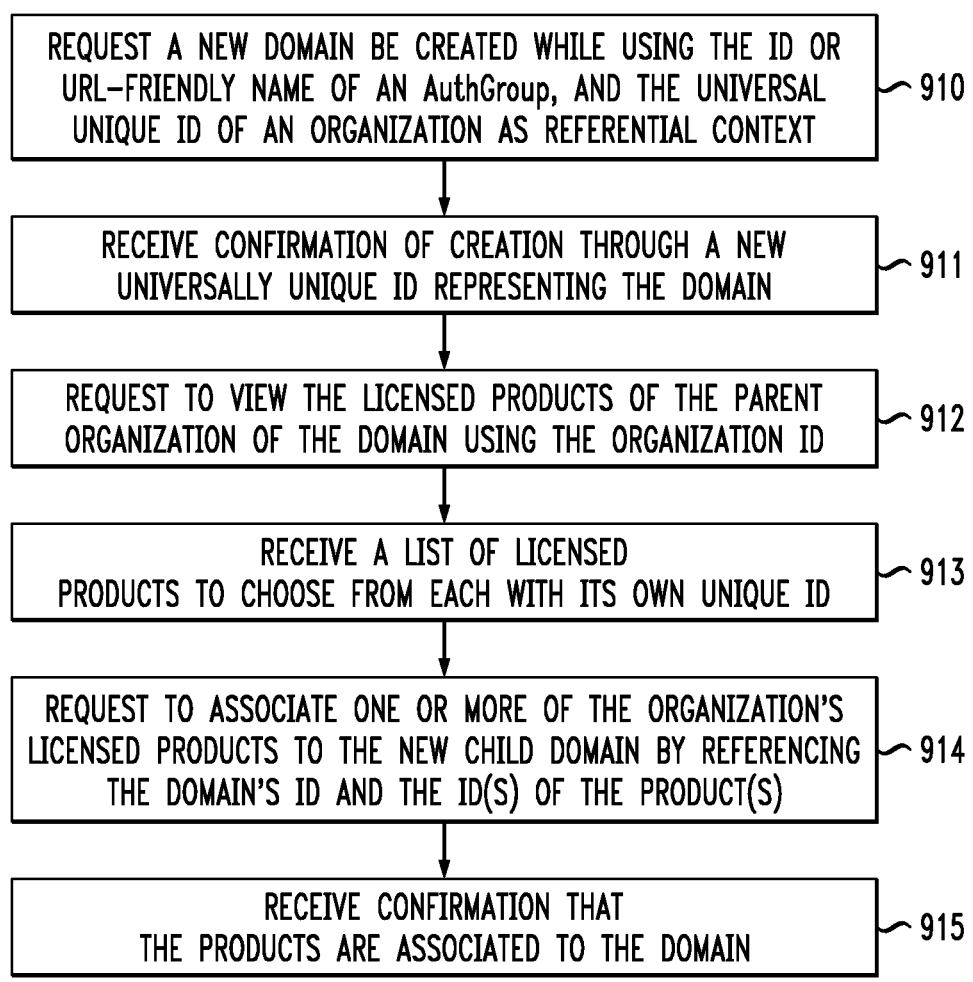
Figure 9D:
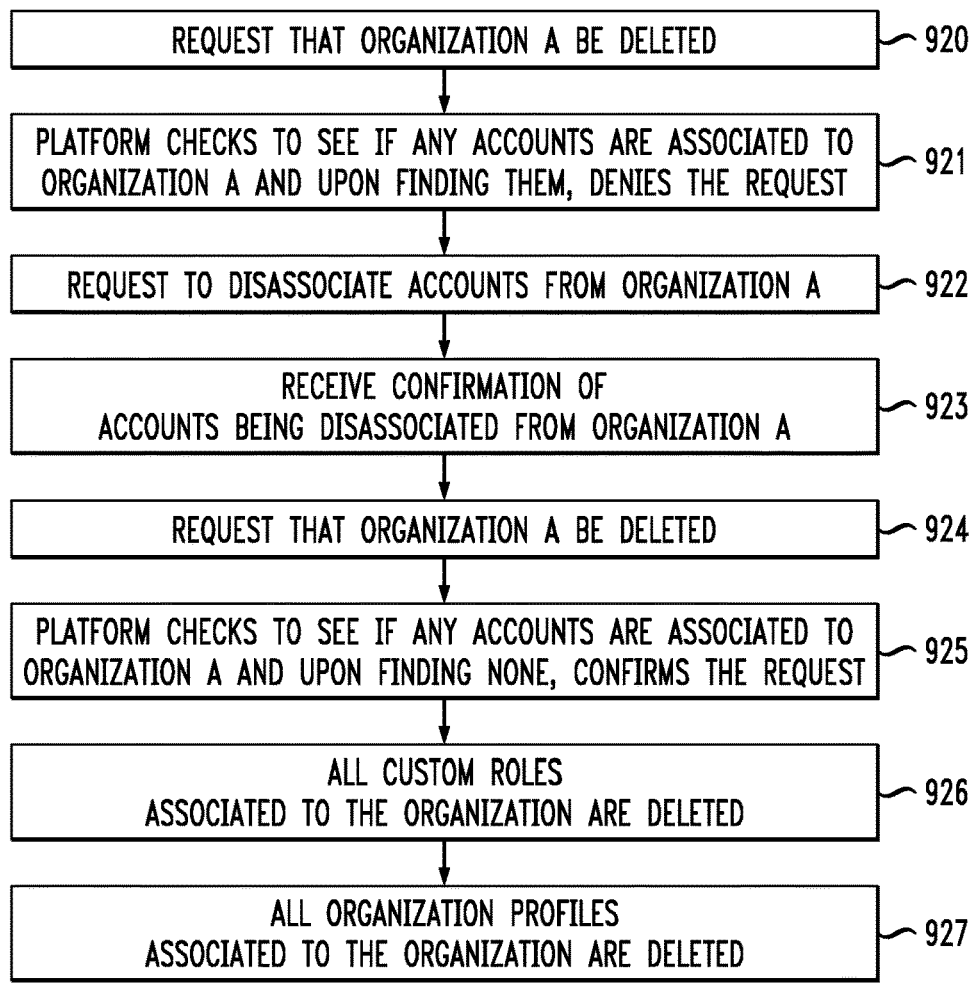
Figure 9E:
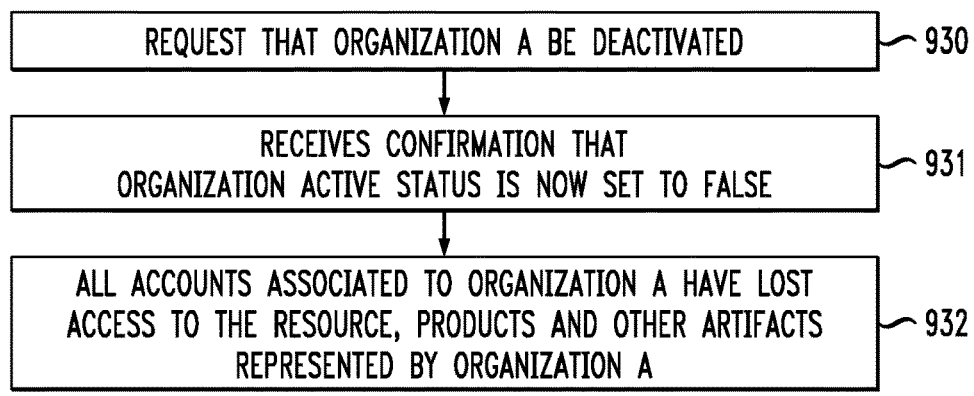

FIGS. 9-9E illustrate examples of how the Platform 130 represents different kinds of Organizations 312 such as internal departments, external customers, or any other grouping of the Implementor 501. FIGS. 9-9E further show examples of how Products 303 can be associated to those departments to then be accessible to specific subgroups of Accounts 311 within the Auth Group 301. This principal of Products 303 being managed and associated (Licensed) to Organizations 312 is also imposed against the Platform 130, where the capabilities of the Platform 130 are accessible to the Implementor 501 through a specially designated Organization $312_1$.

FIG. 9 specifically shows this relationship: the implemented Platform 130 with three example Organizations $312_1$, $312_2$, $312_3$, where Organization $312_2$ is a customer to the Implementor 501; Organization $312_3$ is some other internal type such as a department, vendor, or anything else the Implementor 501 wishes to separate in terms of access security; and Organization $312_1$ is unique in that it represents the Accounts 311 within the Auth Group 301 who control the Platform 130 itself. This latter representation is accomplished by representing the Platform 130 as a Product $303_1$ with specific Roles $307_1$ and $309_1$ which have subsequent Permissions $308_1$ (not depicted) that can be attributed to the Accounts 311 in charge of overall administration of the Auth Group 301 through a Domain $304_1$, representing the unique group of users in the Platform 130 and across all other Organizations $312_x$.

FIG. 9A shows an example block diagram of how the Platform 130 modules could work together to enable access between Accounts $311_n$ and Organization Licensed Products $303_x$ (not shown). FIG. 9A shows an Implementor 501, and the Auth Group 301 of the Platform 130 is represented. Within the Auth Group 301, there are an unspecified number of accounts $311_n$. The Implementor 501 has defined two customer Organizations $312_1$ and $312_2$. From within the common pool of Auth Group 301's Accounts $311_n$, two Accounts $311_1$ and $311_2$ have been identified to be given access and administrative privileges over one Organization 312 each. Account $311_1$ is attributed to Organization $312_1$ and Account $311_2$ is attributed to Organization $312_2$. This is a slightly different visualization of the concepts shown in FIGS. 7 and 7C. The Platform 130 diagram of FIG. 9A shows that the Implementor 501 interacts with the Organization Module 207 to define the customer Organizations $312_1$ and $312_2$. The specific requests and responses of creating an Organization 312 are shown in FIG. 9B with steps 901-908. The Implementor 501 further licenses the Products $303_x$ to each customer using the Product License Interface 219 and Product License Purchase Module 133. The Platform 130 itself is represented as a Product 303 as explained in FIG. 9 and is one of the Products $303_x$ assigned to the Organizations $312_1$ and $312_2$ to allow Accounts $311_1$ and $311_2$ to administrate. From here, the licensed Products $303_x$ are further associated to Domains 304 (FIG. 9) managed by the Domain Module 209. The specific requests and responses for creating a Domain 304 and associating Products 303 can be seen in FIG. 9C with steps 910-915. At this point, administrative access and control of each Organization $312_1$ and $312_2$ are assigned to their corresponding Accounts $311_1$ and $311_2$. This process of Account 311 access to Products 303 through Domains 304 and Roles 307/309 within the context of an Organization 312 is detailed in FIG. 7C. FIG. 9A shows which potential modules interacting make the functionality possible. The result is that, as an example, a User 110 (not shown in FIG. 9A) controlling Account $311_1$ can receive authorized access through the Authentication & Authorization Module 203 to access and manage functionality in only Organization $312_2$.

Organization 312 may involve cleanup, deactivation, or deletion over time. The Platform 130 manages these activities with limits to ensure that Accounts 311 are not orphaned in terms of associations or access. FIG. 9D shows an example of a request to delete (step 920), a check to make sure it is possible (step 921), and the subsequent elements to complete the transaction (steps 922-927). Alternatively, the Platform 130 could allow a soft delete in the form of a deactivation for Organization 312 where no data is lost. FIG. 9E shows an example of such a transaction in steps 930-932.

Figure 10A:
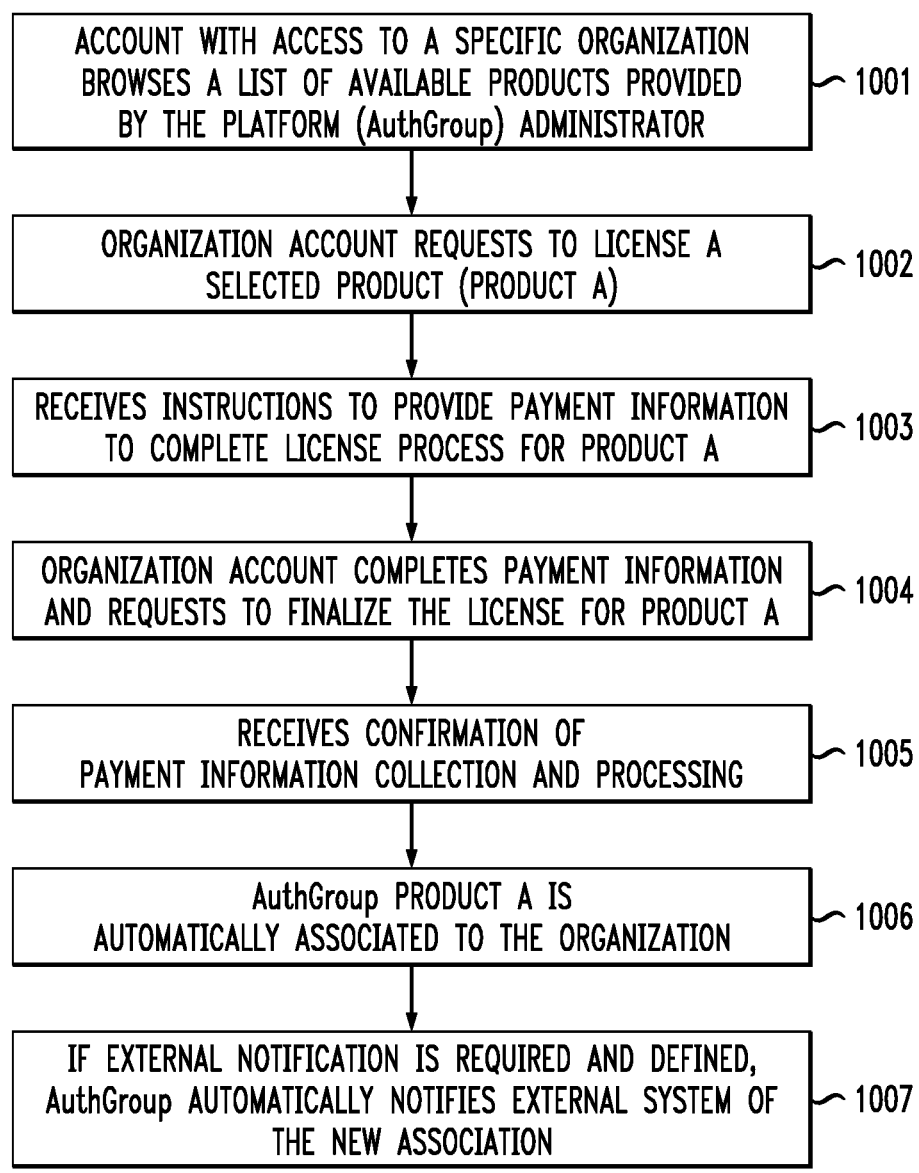
Figure 10B:
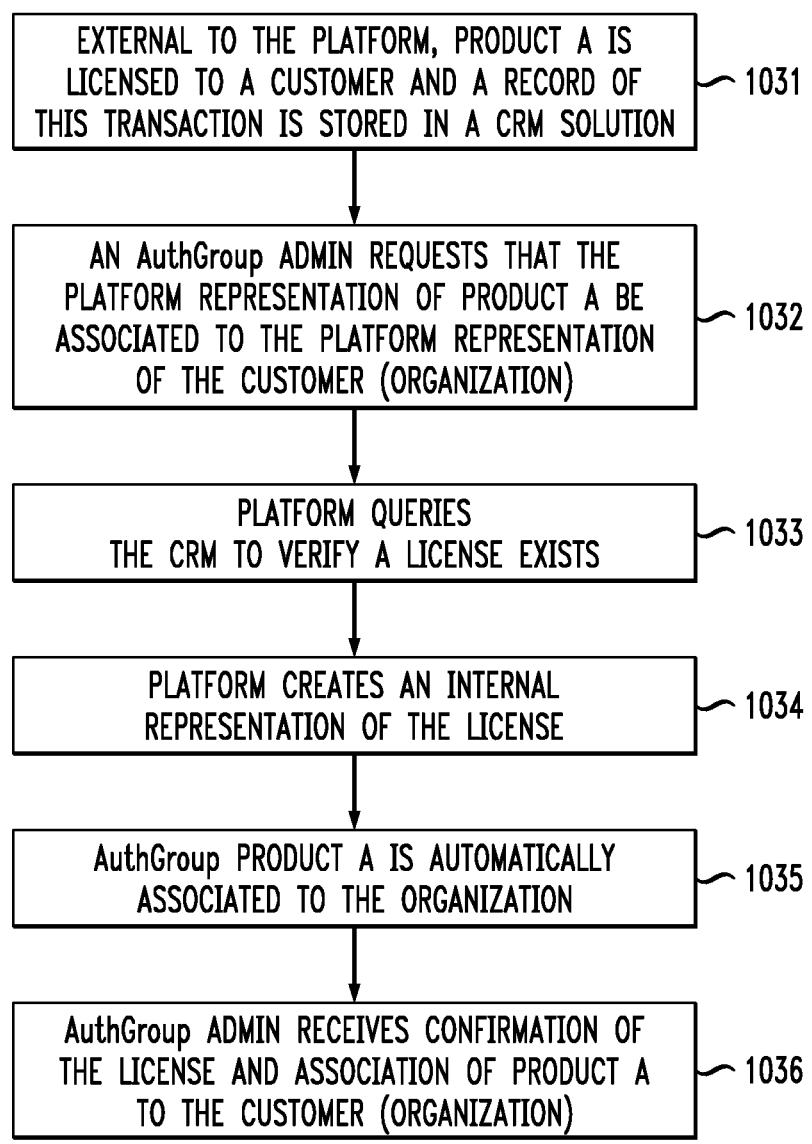
Figure 10C:
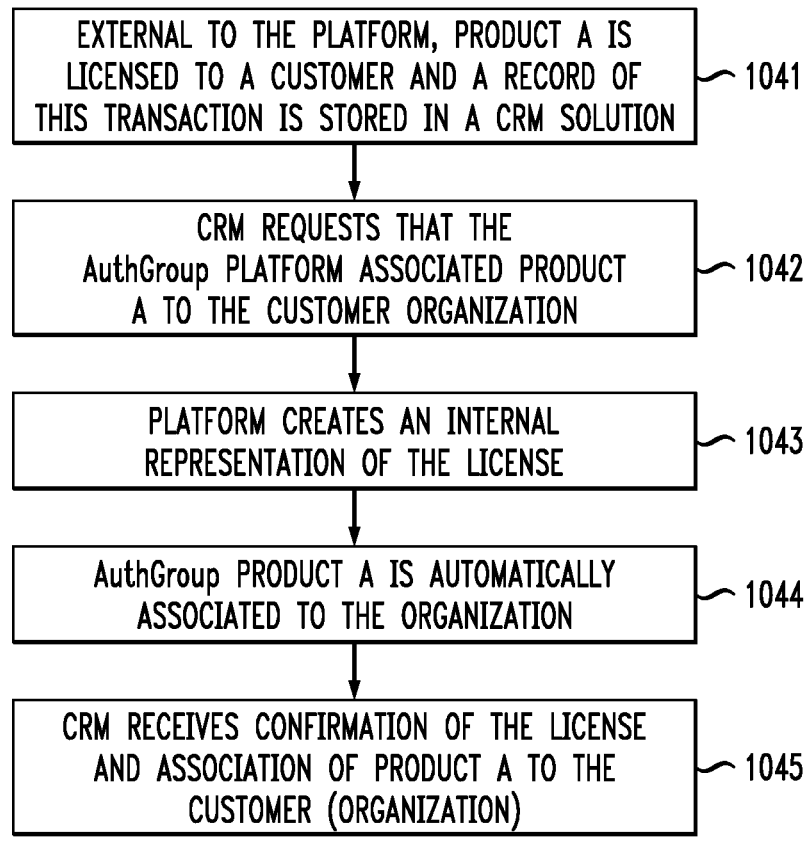
Figure 10D:
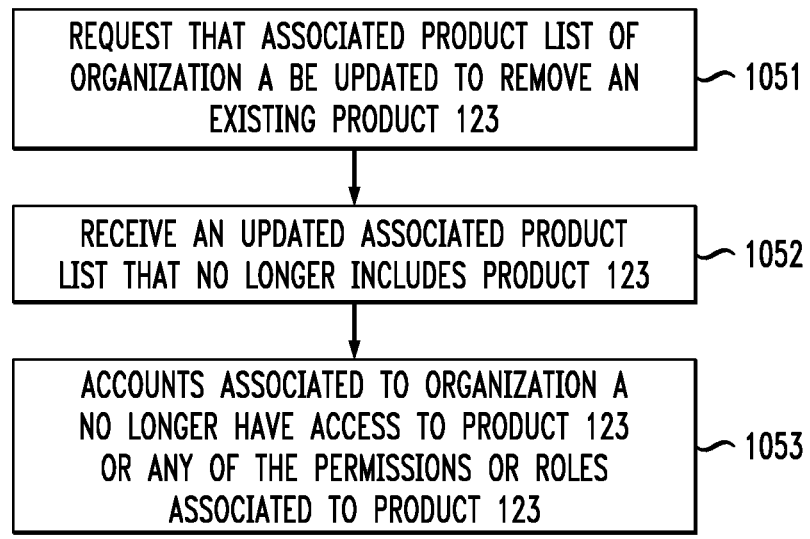

FIGS. 10-10D illustrate the possible capabilities of the Platform 130 with regards to the act of licensing a Product 303 to an Organization 312. The Platform 130 allows at least three possible licensing mechanisms which are described: self-service, an example of which is detailed in FIG. 10A steps 1001-1007; manual entry, an example of which is detailed in FIG. 10B steps 1031-1036; and automated synchronization to an external customer relationship management (CRM) or similar system, an example of which is detailed in FIG. 10C steps 1041-1045. These are three possible implementations supported by the Platform 130 to achieve licensing of a Product 303 to an Organization 312; however, licensing as a feature is not limited to these possible implementations. As yet another example of a licensing mechanism (not depicted), the Product License Purchase Module 133 could be connected to a Data Stream 406 where license instructions are asynchronously published by an outside system. Whenever the Product License Purchase Module 133 sees a license request asynchronously flow through the stream, the Product License Purchase Module 133 would react by applying the appropriate Product License 302 to the specified Organization 312.

FIG. 10 depicts one possible implementation of modules within the Platform 130 to achieve the three variations of licensing described. Implementor 501 of the Platform 130 has a customer Organization 312 and a Product 303 which the customer Organization 312 wishes to license. Licensing would result in some number of Accounts $311_n$ from the Auth Group 301 (not depicted) which may be associated to the customer Organization 312 to potentially have access to the Product 303, which is itself managed by the Product Module 312. FIG. 7C shows a detailed possible relationship mapping of Accounts 311 to Organizations 312 and Products 303 from an object entity perspective. FIG. 7C shows a possible External CRM Solution 1010 of FIG. 10 that the Implementor 501 may or may not use to manage licensing. The External CRM Solution 1010 is relevant only to manual entry licensing (flow depicted in FIG. 10B) or automated synchronization licensing (flow depicted in FIG. 10C). Note that the act of licensing creates a Product License 302 within the Platform 130; however, this object entity is not depicted in FIG. 10 in order to focus attention on the modules. The relationship of Product License 302 to Product 303 and Organization 312 is detailed in the object entity diagram of FIG. 3. Within the Platform 130 environment, FIG. 2 shows all the modules that primarily manage Products 303, Organizations 312, and Accounts 311: Product Module 221, Organization Module 207, Domain Module 209, Roles Module 223, and the Account Module 229.

In the case of a self-service licensing approach as described in FIG. 10A, the Organization Module 207 interacts with the Plugin Module's Product License Interface 219 to gain access to the Product License Purchase Module 133. This allows customer Organization 312 to request the License 302 (not depicted) and possibly pay for it through an External Payment Provider 1020 managed by the Product License Purchase Module 133. This process results in the Product 303 being associated to the Organization 312.

FIGS. 10B and 10C show scenarios where the Implementor 501 has invested in an external CRM or equivalent system to manage licenses. In one alternative implementation depicted in FIG. 10B, an administrator of the Platform 130 could manually create an association of the Product 303 to the Organization 312, bypassing the External Payment Provider 1020. The Product License Purchase Module 133 would in this situation simply query the External CRM 1010 to verify that the license exists, and if so, define an internal platform Product License 302 to allow access and association.

As another alternative depicted in FIG. 10C, it is possible to configure the Platform 130 to listen to updates from an External CRM 1010 and automatically create internal Product Licenses 302 to associate Product 303 to Organization 207. These updates could be http web requests, asynchronous messages, or some other protocol of communication across a Network 3201 (FIG. 32).

In all three possible implementations of licensing, access is ultimately governed through a Domain 304 which is managed by the Domain Module 209. A Domain 304 can have an associated Product 303 once the Domain 304's parent Organization 312 has licensed that Product 303. FIG. 10 shows that the Organization Module 207, Domain Module 209, and the Roles Module 223 then interact with the Account Module 229 in order to validate an Organization 312, Product 303, and Roles 307/309 specific to an Account 311 when that Account 311 attempts to obtain access through the Authentication & Authorization Module 203, which in turn uses one of several possible Authentication and Authorization protocols (e.g., OpenID Connect) managed through the SSO Provider Module 205. The result of these interactions is that the Account 311 can obtain tokens with privileges to the Organization 312 and Product 303 defined, allowing the Person 110 who owns the Account 311 to interact.

FIG. 10D shows how this association through licensing can be reversed and a Product 303 removed from an Organization 312 through steps 1051-1053.

Figure 11:
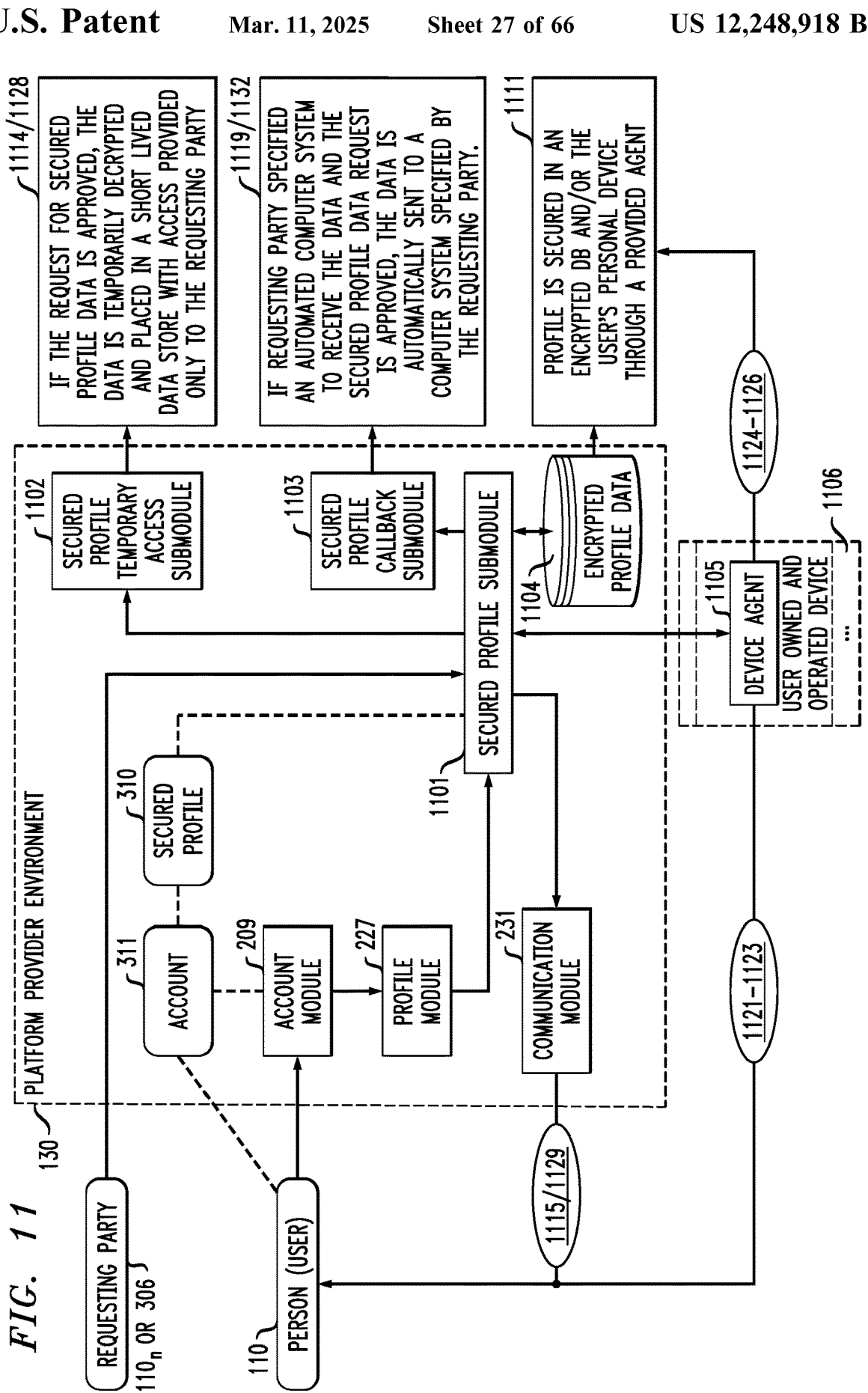
FIG. 11 is a block diagram and FIGS. 11A-11B are related flow diagrams showing an example of how internal components of the Platform may allow a Secured Profile containing personal information to be created for an Account either in the Platform of FIGS. 1-2 or on a personal device of the Person who owns the Account. It further shows how the Platform of FIGS. 1-2 enables requests for the information to be routed to the Account holder for approval or denial.
Figure 11A:
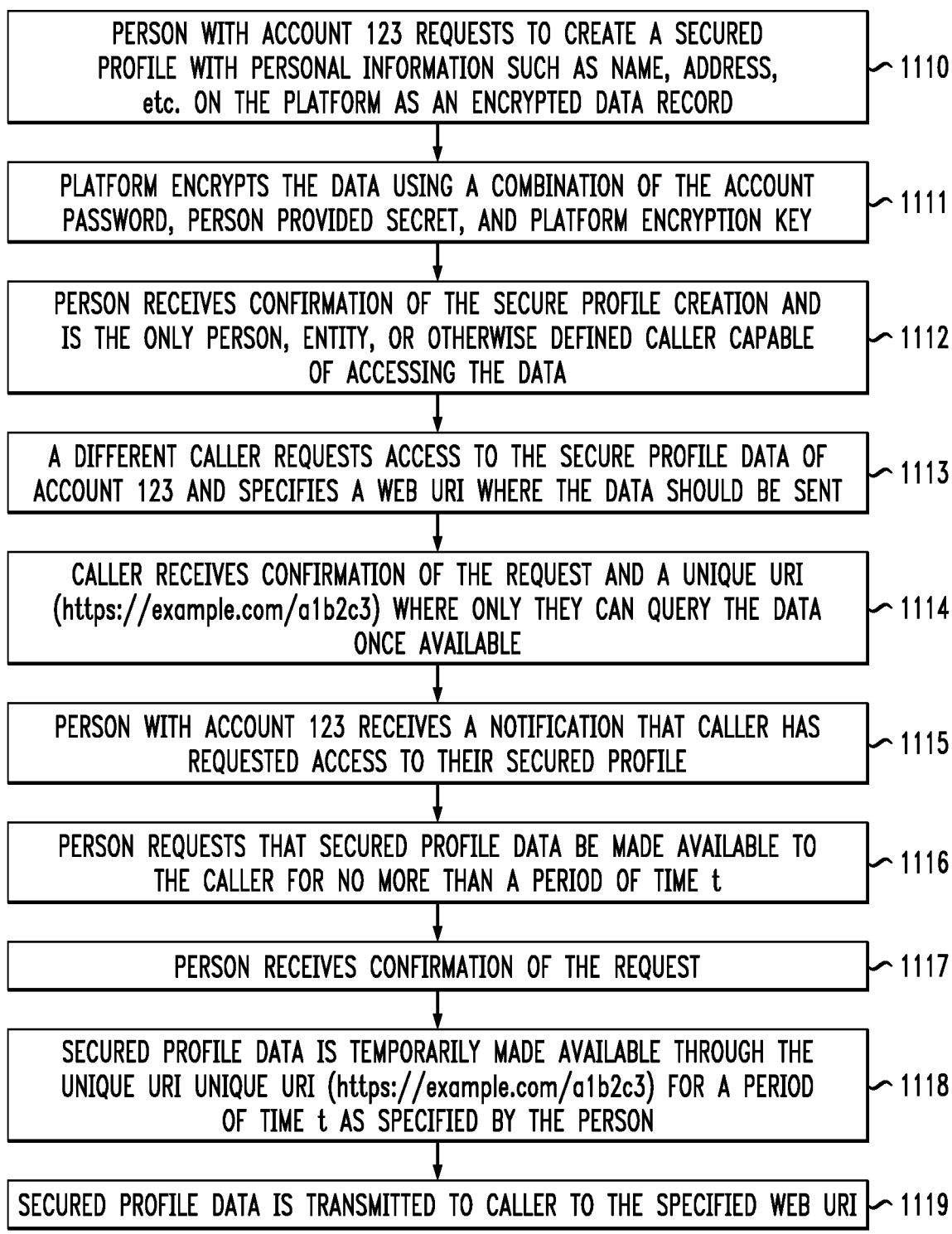
Figure 11B:
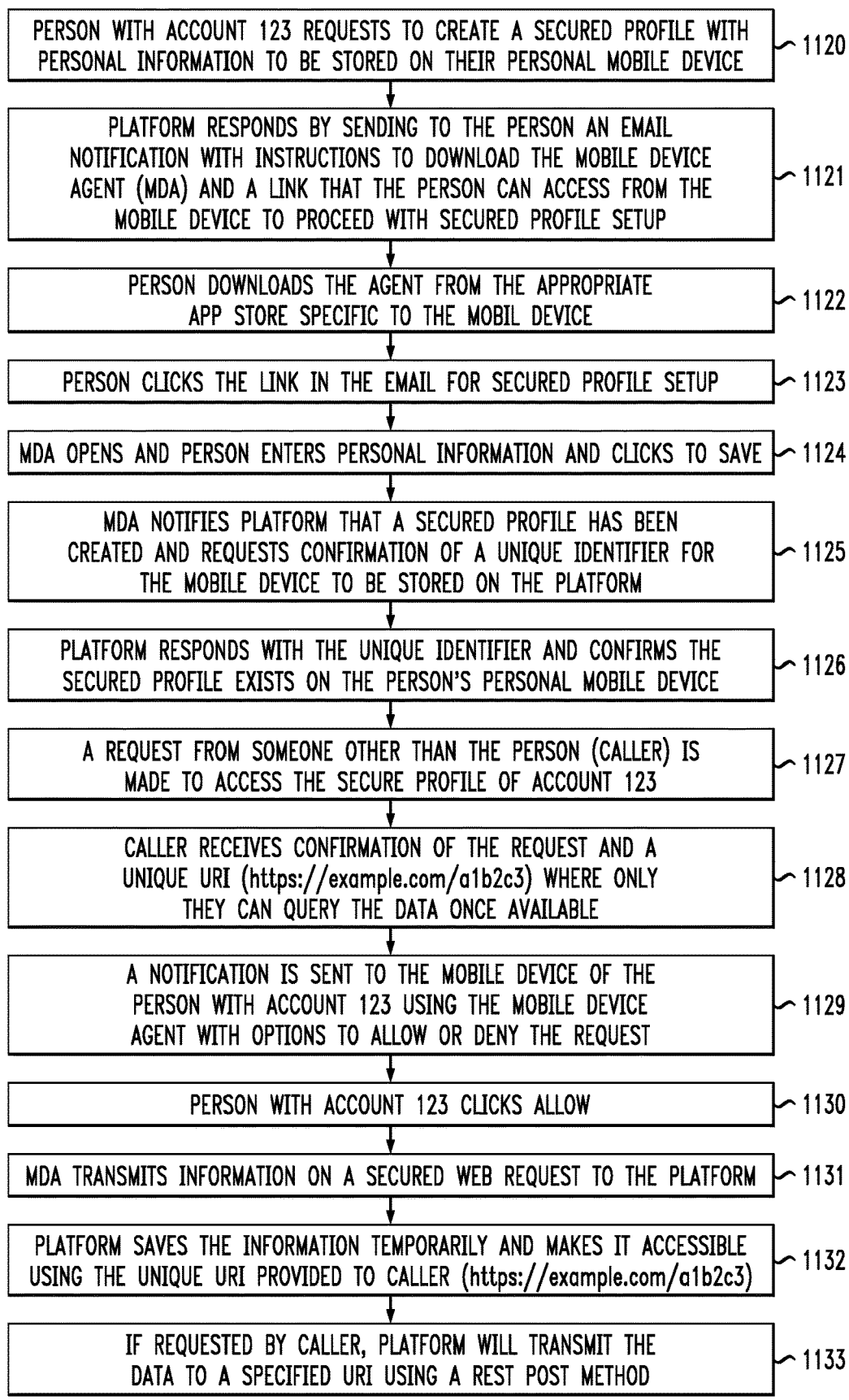

FIGS. 11-11B illustrate two examples of an Account 311 holder (Person 110) utilizing a Secured Profile 310 of FIG. 3 to manage personal information about themselves. Secured Profile 310 data can be requested, and access granted or denied by the Person 110 who owns the associated Account 311 (not shown in FIG. 11).

In one example, with flow illustrated in FIG. 11A with steps 1110-1119, a Secured Profile 310 can be created and managed by the Person 110 and stored in the Encrypted Profile Data 1104 data store managed by the Platform 130 itself. The Profile Module 227 and its submodule, the Secured Profile Submodule 1101 (FIG. 11), manage this interaction and persist the data. Only the Person 110 can access this data through an associated Account 311. As indicated in FIG. 3, an Account 311 can have only one Secured Profile 310, and a Secured Profile 310 can be associated to only one Account 311. The Encrypted Profile Data 1104 data store can be any kind of system that persists data in a variety of models. Examples of data storage systems include No-SQL databases, SQL databases, columnar databases, blockchains, and so on.

In another example, with flow illustrated in FIG. 11B with steps 1120-1133, a Secured Profile 310 can be created and managed by the Person 110 and stored on a personally Owned and Operated Device 1106 (FIG. 11) of the Person 110 which utilizes a Device Agent 1105 (FIG. 11) as a module to manage such data locally within the Device 1106. Unlike the previous example, in this model, the Secured Profile 310 data is never stored anywhere within the Platform 130 or even any part of the overall Service Provider Environment 100 except temporarily when a copy is briefly and securely provided after access is granted. It exists in a permanent form only on the Device 1106. The format of this data on the Device 1106 can be anything that allows a unique identification of the data representing the Secured Profile 310. Examples include a JSON document, encrypted text, non-fungible cryptographic token, and so on. In this example, the Secured Profile Submodule 1101 manages interactions with the Device 1106 through the Device Agent 1105, which utilizes a secured communication protocol to ensure that only the intended Device 1106 of the Person 110 is being affected. This is primarily accomplished by ensuring that the Device Agent 1105 is initiating requests to the Platform 130 rather than accepting requests or commands, as shown in step 1125 of FIG. 11B.

Regardless of which example storage is utilized, a Secured Profile 310 allows access to be granted or denied by the Person 110 by utilizing the Communication Module 231 to send notifications to the Person 110. Examples of communication notification are further illustrated in FIG. 18. These personal communications allow the Person 110 to send commands to the Platform 130 which enable or deny access by the requesting party (FIG. 11A step 1116 and FIG. 11B step 1130).

A requesting party might be another Person $110_n$ or a Technical Component 306 operating independently. Such requests are asynchronous and result in the Platform 130 responding with an acknowledgement while the owner of the Secured Profile 310 is contacted for permission. A request can optionally include a callback URI to which the Platform 130 should automatically send the Secured Profile 310 data should the request be approved. This functionality is managed by a nested submodule of the Secured Profile Submodule 1101 shown in FIG. 11B as the Secured Profile Callback Submodule 1103. Regardless of a request which includes a callback URI, whenever Secured Profile 310 data access is granted, a copy of that data is written to a temporary data store within the Platform 130 managed by the Secured Profile Temporary Access Submodule 1102 (FIG. 11). The data is keyed to the unique ID of the initial request so that the Requesting Party 110/306 can then query the data when it is available. This data has a set time-to-live duration and is deleted immediately when that time expires. Otherwise, the data is immediately deleted after the first successful query.

Figure 12:
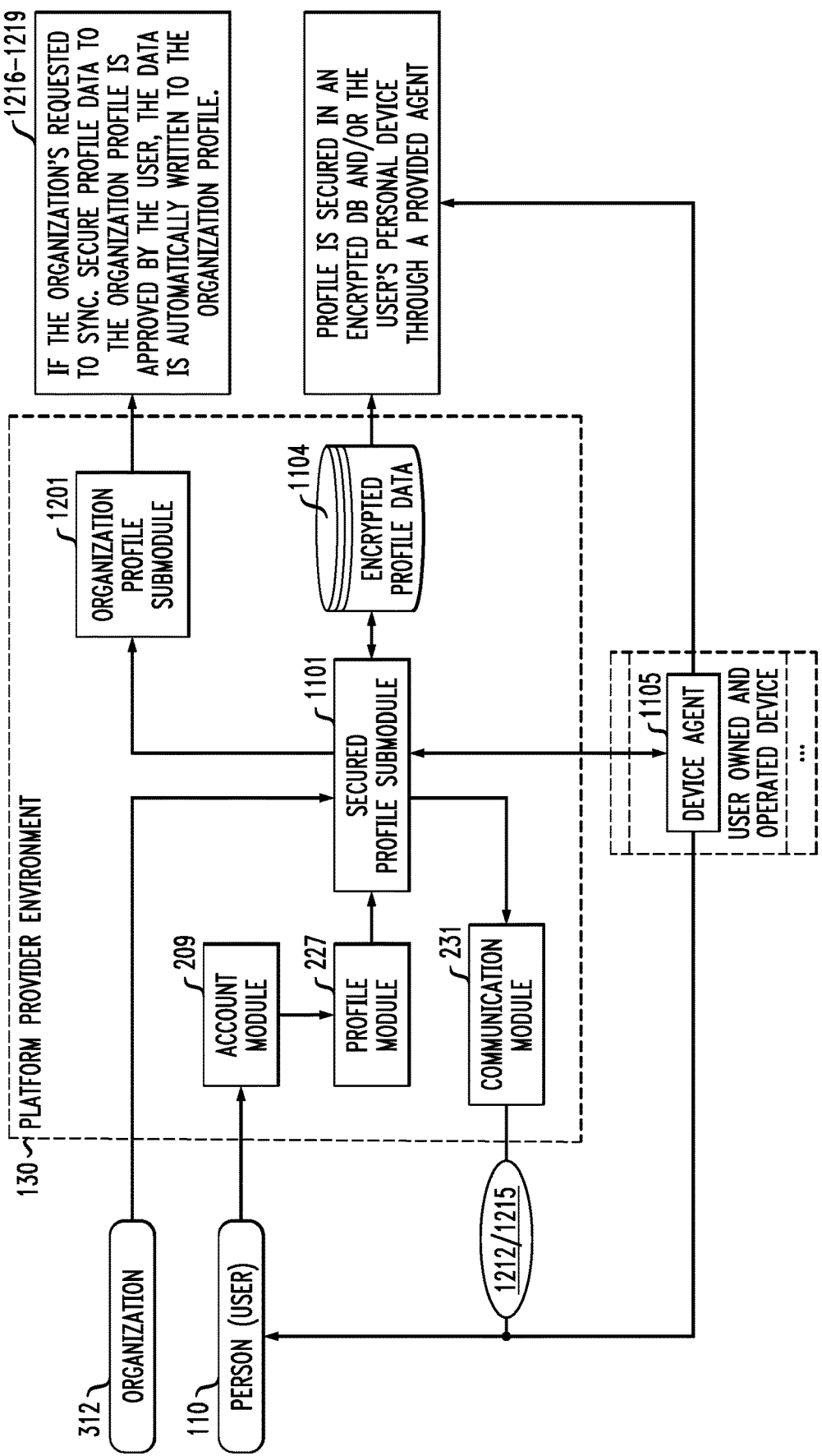
FIG. 12 is a block diagram and FIGS. 12A-12B are related flow diagrams showing an example of how the Platform of FIGS. 1-2 enables organizations to request that an Account's Secure Profile be used to generate an Organization Profile and how the Person who owns the Account can allow or deny this request.
Figure 12A:
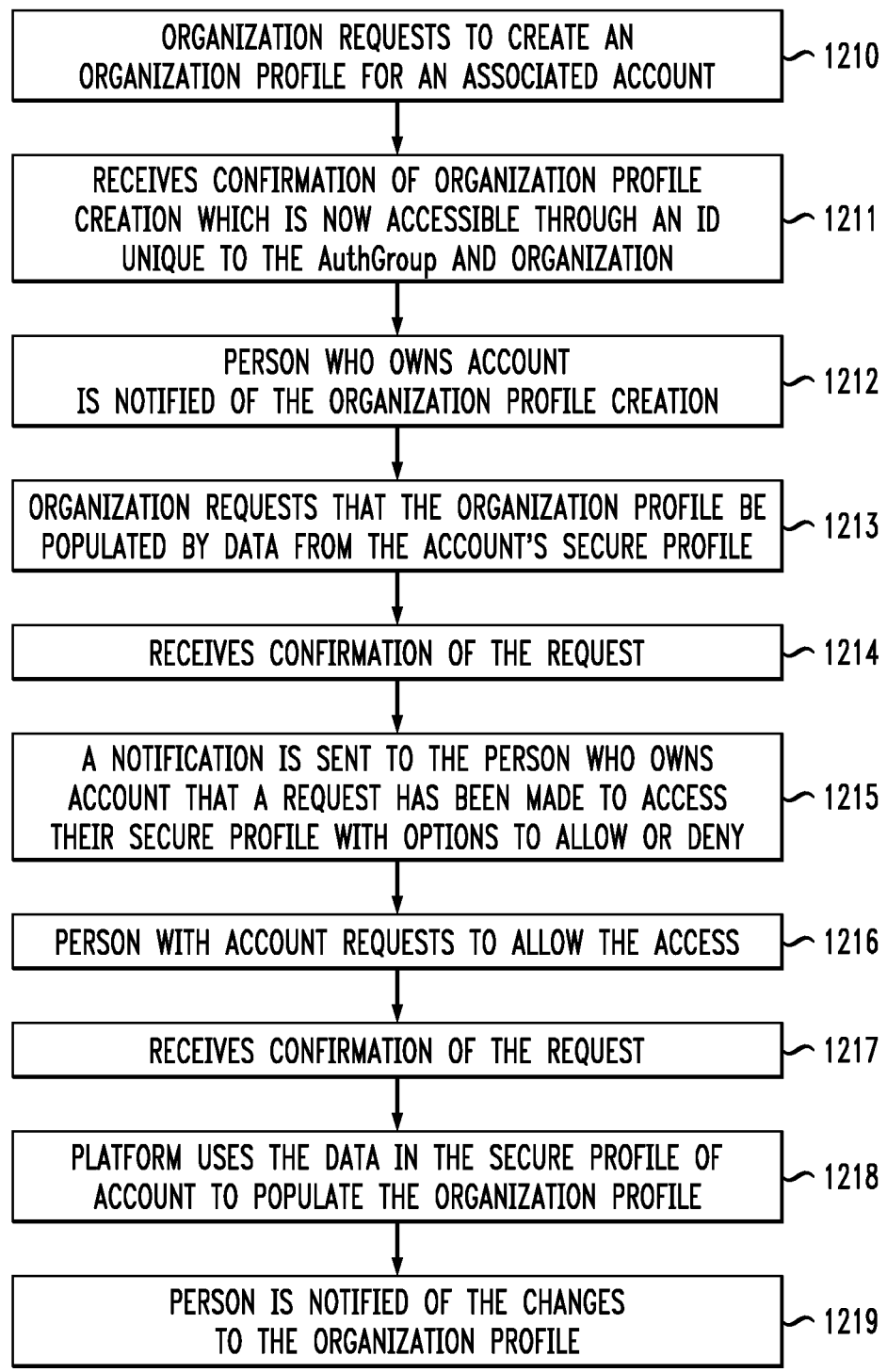
Figure 12B:
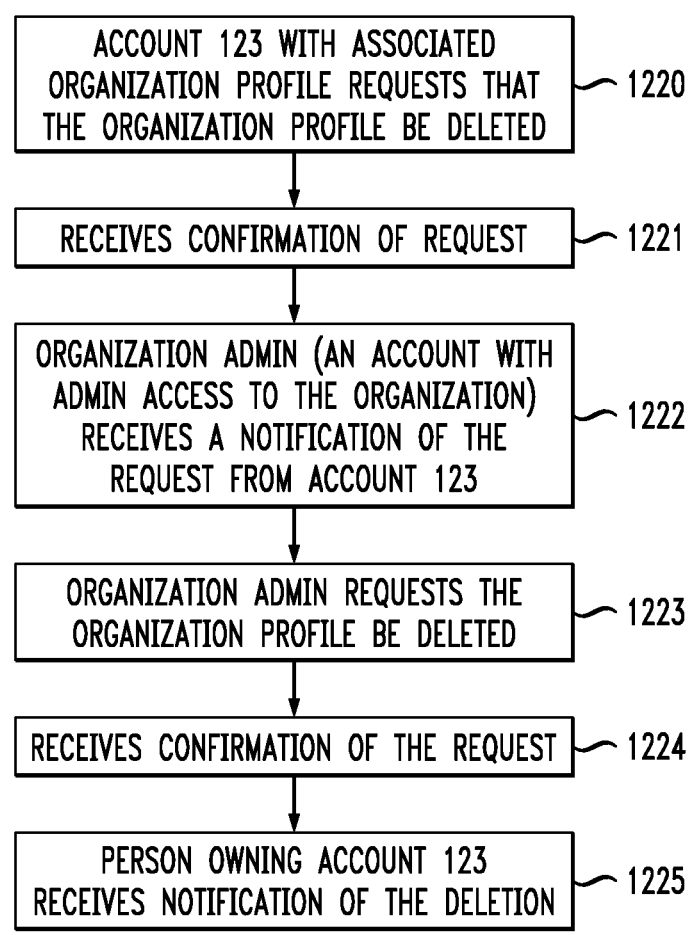

FIGS. 12-12B illustrate an example of how an Organization Account Profile 305 of FIG. 3 might (i) be managed by the Platform 130 and (ii) with the permission of a Person 110 who owns an associated Account 311 of FIG. 3 with a Secured Profile 310 of FIG. 3, be synced to the data in the Secured Profile 310 which itself is stored on either the Device Agent 1105 or Encrypted Profile Data 1104 database of FIG. 11.

Organizations 312 often have Accounts 311 associated to allow the Persons 110 who own those Accounts 311 to access Products 303 licensed from the Auth Group 301 operated by the Platform 130 managed by the Implementor 501. Those Persons 110 have distinct relationships with the Organizations 312 which the Platform 130 Account Module 209 does not explicitly track. This is by design. The purpose of the Account Module 229 and its corresponding object entity, Accounts 311, is to allow a Person 110 to sign into Products 303 associated to the Platform 130, not to track personal information or other metadata of the particular Person 110. FIG. 11 clarifies that personal information about a Person 110 is controlled solely by that individual and is managed through the Profile Module 227 in the form of a Secured Profile 310. With this abstraction, a Person 110 can potentially access multiple Organizations 312 through an Account 311 when those Organizations 312 provide access. Putting aside the privacy concerns of a Person 110 for a moment, if it were possible for an Organization 312 to update a Person 110's information and all Organizations 312 could see that information, then this could create conflicting data for each Organization 312's integrated systems. As an example, if two Organizations 312 could change a Person's 110 name, and Organization $312_a$ (not depicted) picks a different name than Organization $312_b$ (not depicted), which organization would be entitled to the change and considered correct to make said change? Even if this logistical issue were not a concern, modern privacy laws make it clear that a Person 110 is in full control of their personal information and no other entity, be they an individual or a business, has rights to that information unless otherwise stated by the Person 110 in question. The result of these limitations is that an Organization 312 could provide access to an Account 311 held by a Person 110 which is in effect anonymous.

For some Organizations 312, the notion of anonymous Accounts 311 is not an issue. For many others, this will not be tolerable because those Organizations 312 will need to manage information about the people they employ or do business with, to effectively operate their businesses. To bridge this gap, the Platform 130 provides the concept of an Organization Account Profile 305 of FIG. 3 to store metadata (e.g., first name, last name, address, etc.) about the associated Account 311 of a Person 110 to whom the Person 110 has provided access. Even if the Person 110 refuses to divulge any personal information from their Secured Profile 310, the Organization 312 may define information to reference regarding that Person 110 in the Organization Account Profile 305 and link it to the Person 110's Account 311.

In FIG. 3, it is clarified that, while Secured Profiles 310 and Accounts 311 have a one-to-one relationship, Organization Account Profiles 305 and Accounts 311 have a one or-more-to-one relationship. In other words, an Account 311 may have as many linked Organization Account Profiles 305 as Organizations 312 to which they have been granted access. Organization Account Profiles 305 are unique within the Organization 312, meaning that an Account 311 can have only one Organization Account Profile 305 associated within the context of a single Organization 312.

FIG. 12 shows that the module that manages an Organization Account Profile 305 is a nested submodule of the Profile Module 227 called the Organization Profile Submodule 1201. Specifically, FIG. 12 illustrates how the Platform 130 might utilize the functionality of Secured Profile 310 access request described in FIG. 11 to sync data from a Secured Profile 310 to an Organization Account Profile 305. This would allow an Organization 312 to cooperate and coordinate with a Person 110 with Account 311 to access their Secured Profile 310 and use the data to populate the Organization Account Profile 305 in part or in full. The Person 110 would always have the ability to deny this request. As with any request for access, the Secured Profile Submodule 1101 orchestrates communication with the Person 110 through the Communication Module 231, and the Person 110, acting through an Account 311, grants or denies the request. When the request is granted, the Secured Profile Submodule 1101 sends the data to the Organization Profile Submodule 1201, and that data is persisted. This flow is illustrated in FIG. 12A through steps 1210-1219.

FIG. 12B illustrates an example flow for a Person 110 with an associated Organization Account Profile 305 to request that the Organization 312 remove their data in steps 1220-1225. The Platform 130 makes the fact that data is stored about a Person 110 transparent to them to afford the Person 110 an opportunity to inquire about the nature of that data or request that the Organization 312 managing the data (the Organization Account Profile 305) purge their records.

Figure 13:
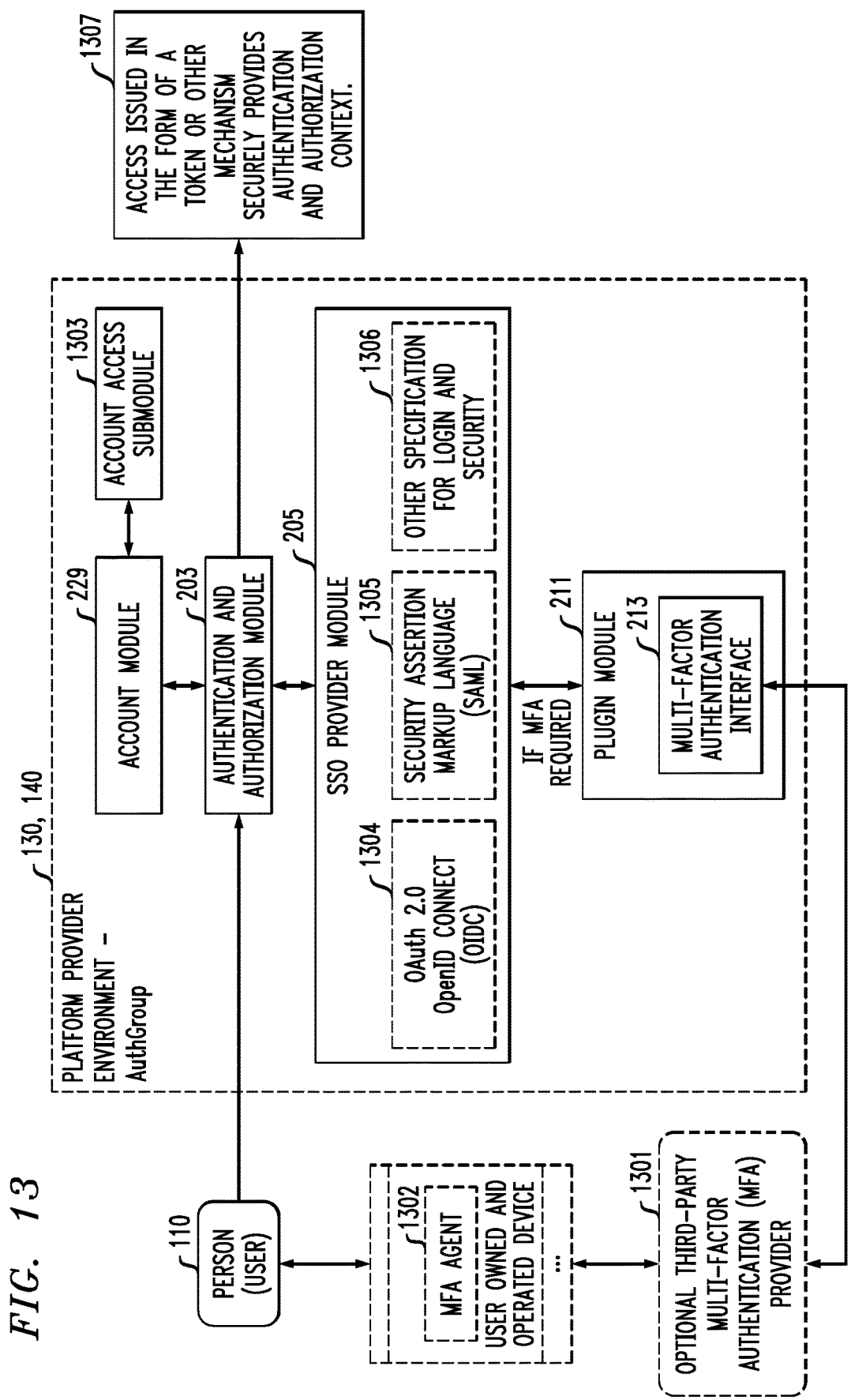

FIGS. 13-13A illustrate an example implementation of modules within UE Auth 140 to allow the Platform 130 to manage authentication and authorization of Accounts 311. As depicted in other drawings, the Authentication & Authorization Module 203 is the primary interface point that a Person 110 interacts with to provide credentials for an Account 311. The Authentication & Authorization Module 203 then validates the Account 311 by checking the Account Module 229 and employing one of the supported security strategies associated to the SSO Provider Module 205. FIG. 13 shows, for example, that one or more of the depicted protocols shown could be supported individually or concurrently: OAuth 2.0 OpenID Connect (OIDC) 1304, Security Assertion Markup Language (SAML) 1305, or some future Specification for Login and Security 1306 that has not yet been defined or standardized in the industry.

These illustrate that the Platform 130 is agnostic of any one specific protocol managed by the SSO Provider Module 205 but may implement one or more of them with various levels of integration and dependency to facilitate the authentication and authorization of an Account 311 managed by a Person 110. Additionally, these interactions allow the access privileges of Account 311, managed by the Account Access Submodule 1303, to be communicated through the resulting access information, usually a Token 1307. The specific access privileges of an Account 311 include: all associated Organizations 312, all associated Domains 304 within the context of each Organizations 312, all associated Products 303, all associated Roles 307 or 309, and all associated Permissions 308. The details of access can also be explicitly managed with the underlying request for authentication and authorization. For example, the request can specify that only the associated Organizations 312 of the Account 311 should be included in the resulting Token 1307 and all other details omitted. Alternatively, the request can specify that only the associated Permissions 308 and Products 303 should be included in the resulting Token 1307 and all other details omitted. Additionally, the request can specify that all access privileges be omitted.

As stated, this information is typically represented as a Token 1307 of some kind, or any other mechanism that provides the context and data necessary. One example of how such a Token 1307 can be communicated is through a JSON Web Token (JWT) issued through an OpenID Connect 1304 protocol, which may look something like the example in FIG. 13A.

In the example of FIG. 13A, the Auth Group is identified by the property "group" 1312 and the Account 311 is identified using the property "sub" 1311. The request to include access data is delivered through an OpenID Connect 1304 (an oAuth 2.0 protocol) scope, as shown with the associated data of the "scope" property 1319, "openid access". The data associated to the various access properties, i.e., "x-access-organizations" 1314, "x-access-domains" 1315, "x-access-products" 1316, "x-access-roles" 1317, and "x-access-permissions" 1318, represent the unique identifiers of those object entity instances of Organization 312, Domain 304, Products 303, Roles 307/309, and Permissions 308, respectively. Additionally, within the context of each property, the data is partitioned by Organization 312 context as depicted by the Permissions 308 shown within the context of an Organization 312 (13181). The other properties in this example (1319) are specific to the OIDC protocol and adopted by the Platform 130 to allow compatibility with that protocol for any integrating system.

FIG. 13 also illustrates how established Third-Party Multi-Factor Authentication (MFA) Providers 1301 can be utilized by the Platform 130 and UE Auth 140 to provide this security enhancement to a Person 110 who has this feature enabled for their Account 311. An MFA Provider 1301 typically works with an Agent 1302 of some kind hosted on a device operated by the Person 110.

MFA provides for the ability to agnostically interface with any number of implementations using the Plugin Module 211 and a Multi-Factor Authentication Interface Module 213.

Figure 14A:
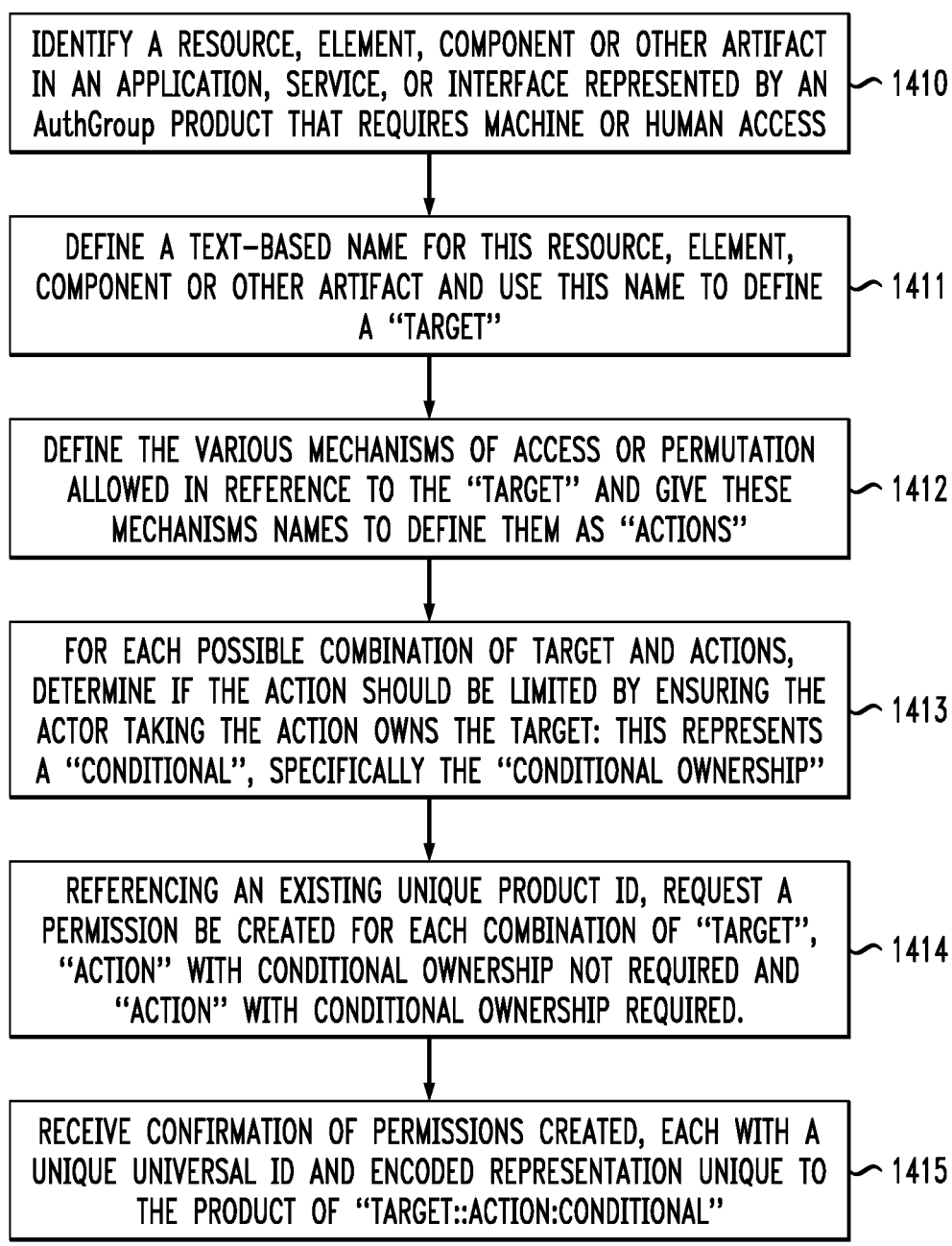
FIGS. 14-14B are diagrams that illustrates a novel definition of "Permission" and an example of how the Platform of FIGS. 1-2 may be defined and encoded in the concept.
Figure 14B:
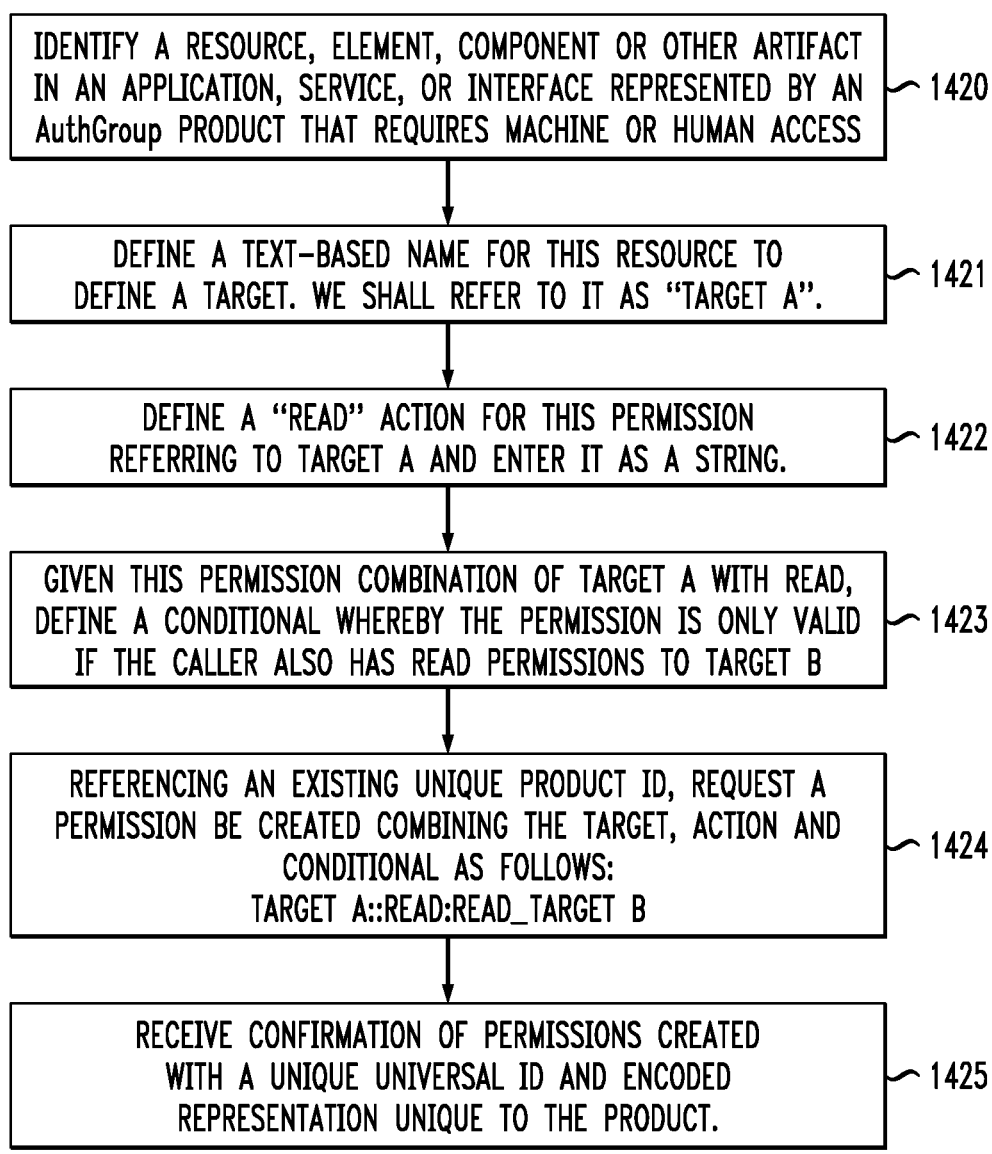

FIGS. 14-14B illustrate an example of how the Permission Module 225 of FIG. 2 constructs and defines Permissions 308, and how those Permissions 308 ultimately govern the behavior of an Account 311 or Technical Component 306. FIG. 14 breaks down the components of a Permission 308 to show that ultimately, all Permissions 308 are functions of three concepts: Target 1401, Action 1402, and Conditional 1403. Targets 1401 are objects within a Product 303, the Platform 130, or any other connected system, against which some action might be taken. These could be API endpoints (e.g., FIG. 16A), a data resource in the system, a web page, a specific user interface input field, or any combination of concrete or abstract concepts. Actions 1402 are like verbs that are applied to a Target 1401 to signify that such an Action 1402 is allowed against that Target 1401. Actions 1402 can be simple operations such as "read," "write," "update," and "delete," or they may be more abstract/irregular concepts like "allow," "push," "run," and so on. As an example, assume a system resource such as "user" is defined as a Target 1401 and "read" is defined as a potential Action 1402. When coupled together, a Permission 308 allows someone to "read" information about "users". Conditionals 1403 are qualifying statements (e.g., if/then logic) that must be true for the Action 1402 to be allowed against the Target 1401. Conditionals 1403 are not required to define a Permission 308, but Target 1401 and Action 1402 are defined.

Permissions 308 govern the behavior of agents within the system, where those agents are either an Account 311 or a Technical Component 306. In the example of FIG. 14, Permission $308_n$ governs the behavior of an Account $311_1$ or Technical Component $306_1$. In the Permission $308_n$ example, Conditional $1403_c$ is defined as "if the Account $311_1$ or Technical Component $306_1$ owns the Target $1401_a$,", where Target $1401_a$ is, in this case, depicted as a system resource. In this example, if the agent (Account $311_1$ or Technical Component $306_1$) does own the Target $1401_a$ resource, then the Action $1402_b$ is "Allowed" 1405. When the agent (Account $311_1$ or Technical Component $306_1$) does not own the Target $1401_a$ resource, the Action $1402_b$ is not allowed but rather "Denied" 1406. To expand on the previous concrete example of Action 1402 "read" and Target 1401 "user", this ownership Conditional $1403_c$ can be included. When the resulting Permission 308n is applied to the agent (Account $311_1$ or Technical Component $306_1$), the agent would be able to "read" data from the "user" only if the agent was that user (Account $311_1$). In FIG. 14A, there is an example flow diagram depicting how a Permission $308_n$ that has such a Conditional $1403_c$ may be requested in steps 1410-1415.

Conditional $1403_c$ requiring ownership of the Target $1401_a$ is just one example of a Conditional 1403. Other examples (without limitation) could be "if Target $1401_a$ name equals some value" or "if the date of request is some specific recurring value." FIG. 14B depicts an example of how Permissions 308 with different kinds of Conditionals 1403 might be requested in steps 1420-1425.

Recall that Permissions 308 are tied to Products 303, as shown in FIG. 3. One or more Permissions 308 can be associated to exactly one Product 303. Permissions 308 can be encoded in various ways using identifiers or other shorthand syntax to allow for easy transmission and query. One example of an encoding is to concatenate the identifiers for the Product 303, the Target 1401, the Action 1402, and the Conditional 1403 into a single string delimited by colons to show distinctions, "Product:::Target::Action:Conditional" 1404. This encoding of Permissions 308 is depicted in FIG. 13A with many examples under the "x-access-permissions" 1318 property of the example JSON object.

FIG. 14 also shows how Targets 1401, Actions 1402, and Conditionals 1403 have a multiplicative effect in the number of possible Permissions 308. Inset 1407 shows how five Targets $1401_{1-5}$, five Actions $1402_{1-5}$, and zero Conditionals 1403 can create twenty-five Permissions $308_{1-25}$.

Figure 15:
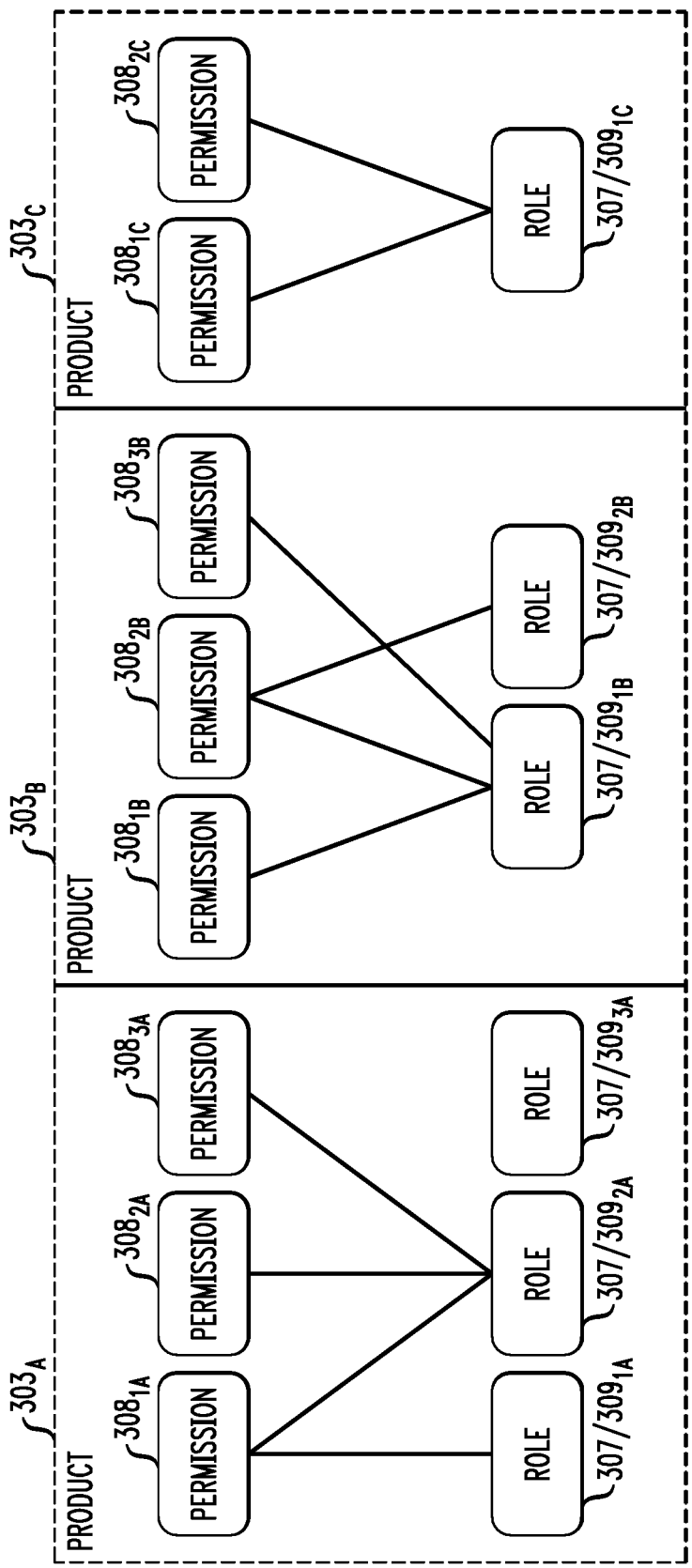
FIG. 15 is a block diagram and FIG. 15A is a flow diagram that show the relationship of Permissions to Roles within the context of a Product.
Figure 15A:
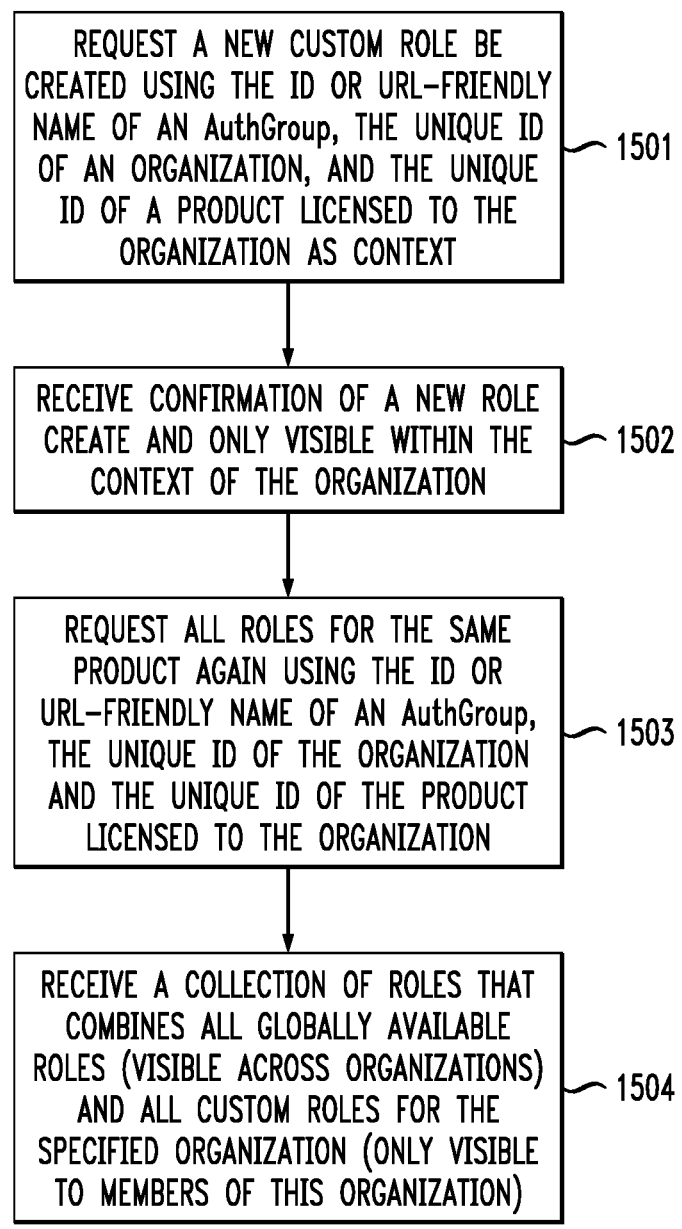

FIGS. 15-15A illustrate the relationship of Permissions 308 to both Global Roles 307 and Custom Roles 309. Both Permissions 308 and Roles 307/309 exist within the context of a Product 303. Roles 307/309 are groupings of existing Permissions 308, but Roles 307/309 can exist on their own without any Permissions 308 as well, as shown with Role 307/3093A in Product 303A. As FIG. 15 shows, Permissions 308 and Roles 307/309 never exist in more than one Product 303 at a time. In Product $303_B$, for example, Role $307/309_{1B}$ is associated to Permissions $308_{1B-3B}$. This does not prevent Permission $308_{2B}$ from also being associated to Role $307/309_{2B}$. As first shown in FIG. 3, Permissions 308 have a one-or-more-to-one-or-more relationship with Roles 307/309. Additionally, recall that Custom Roles 309 are specific to both a Product 303 and an Organization 312, also depicted in FIG. 3. FIG. 15A illustrates an example flow of how such a Custom Role 309 could be created in the Platform 130 in steps 1501-1504.

Figure 16:
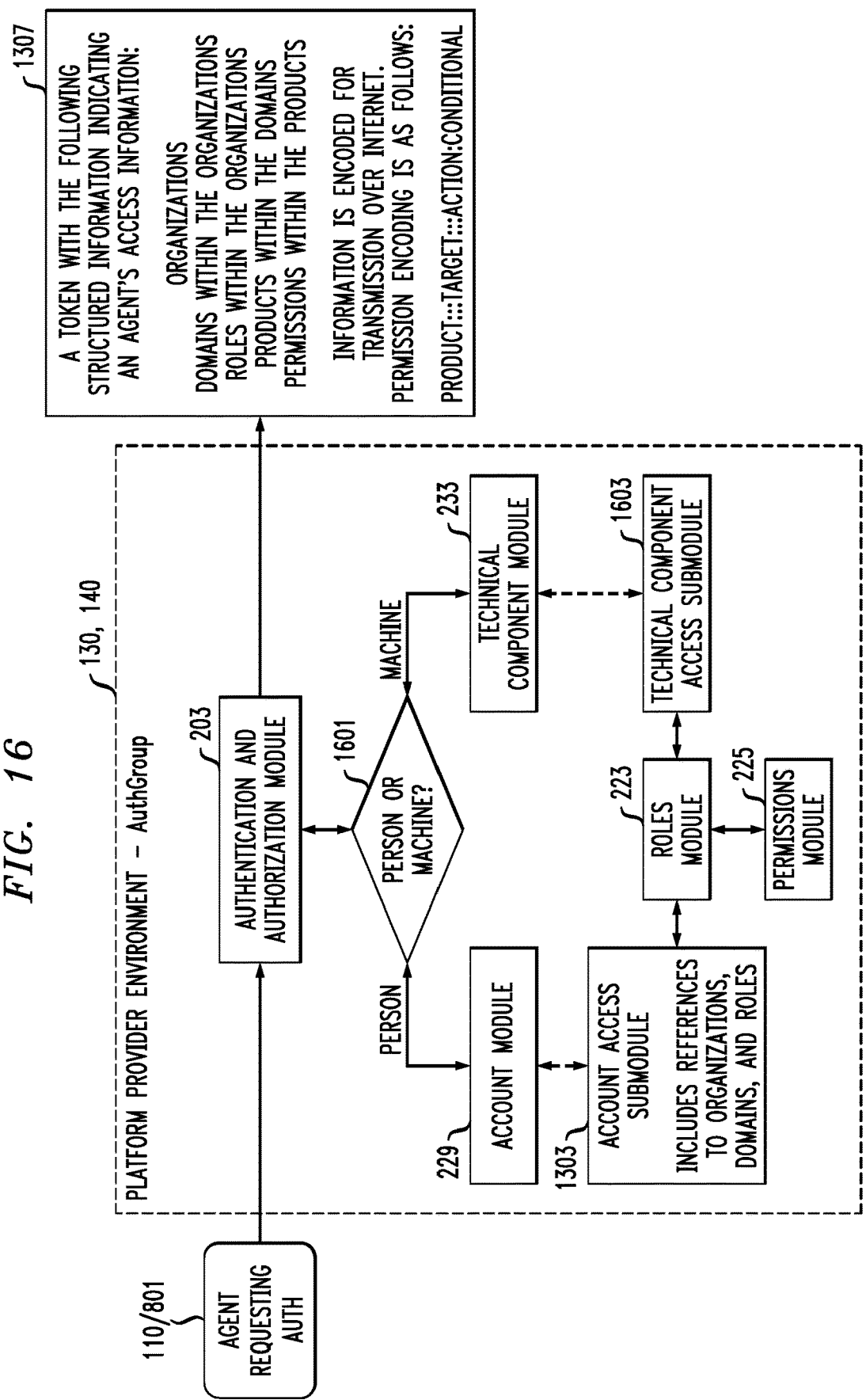
FIG. 16 is a block diagram that shows an example of how the Platform components of FIGS. 1-2 allow information regarding an Account's or Technical Component's (machine) access to Organizations, Domains, Roles, Products, and Permissions to be encoded into an authorized access token issued by the Platform's SSO Provider interface via the Authentication and Authorization Module.
Figure 16A:
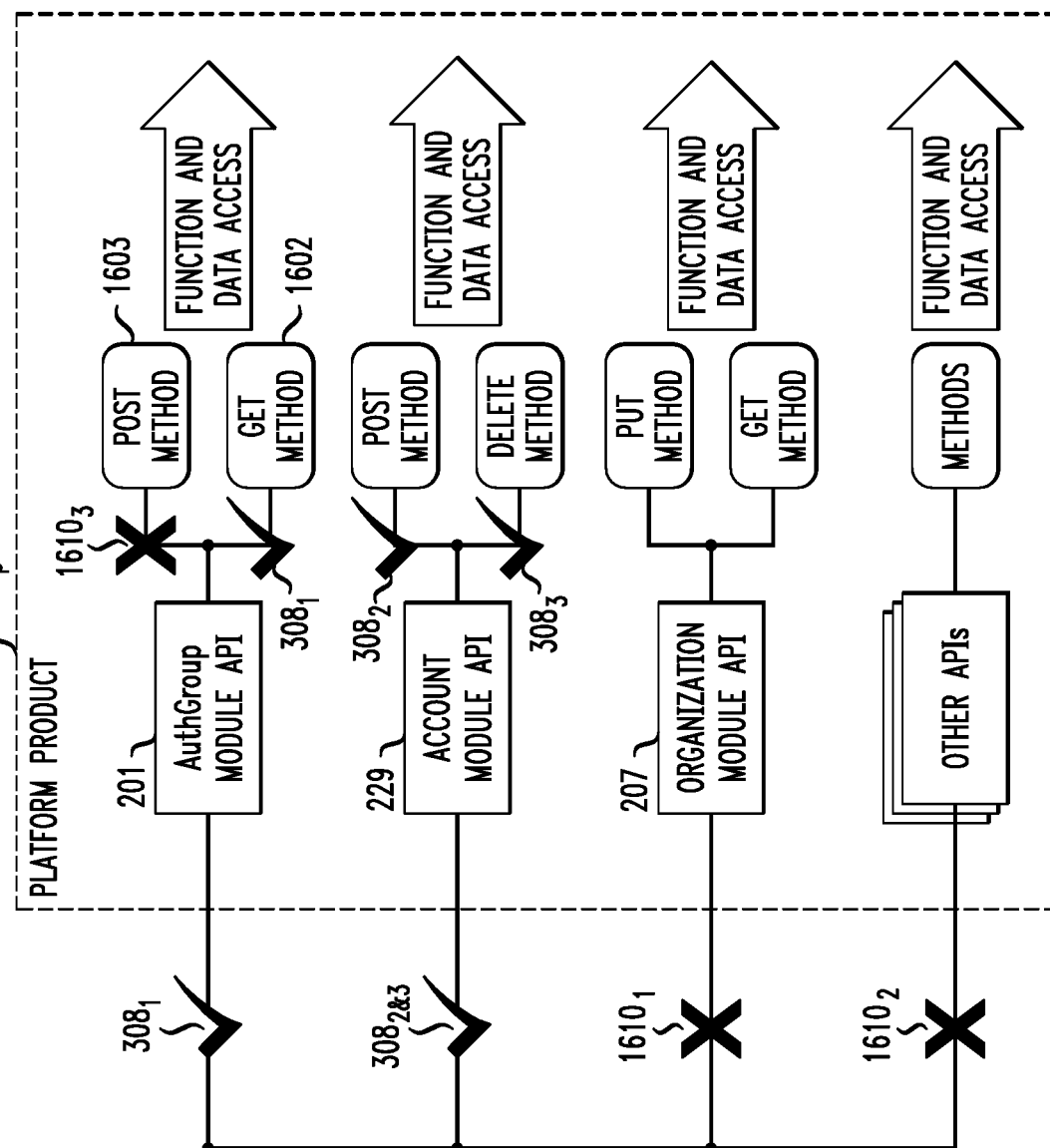
FIGS. 16A-16B build on FIG. 16 to illustrate how the Platform utilizes its definition permissions to govern access to resources.
Figure 16B:
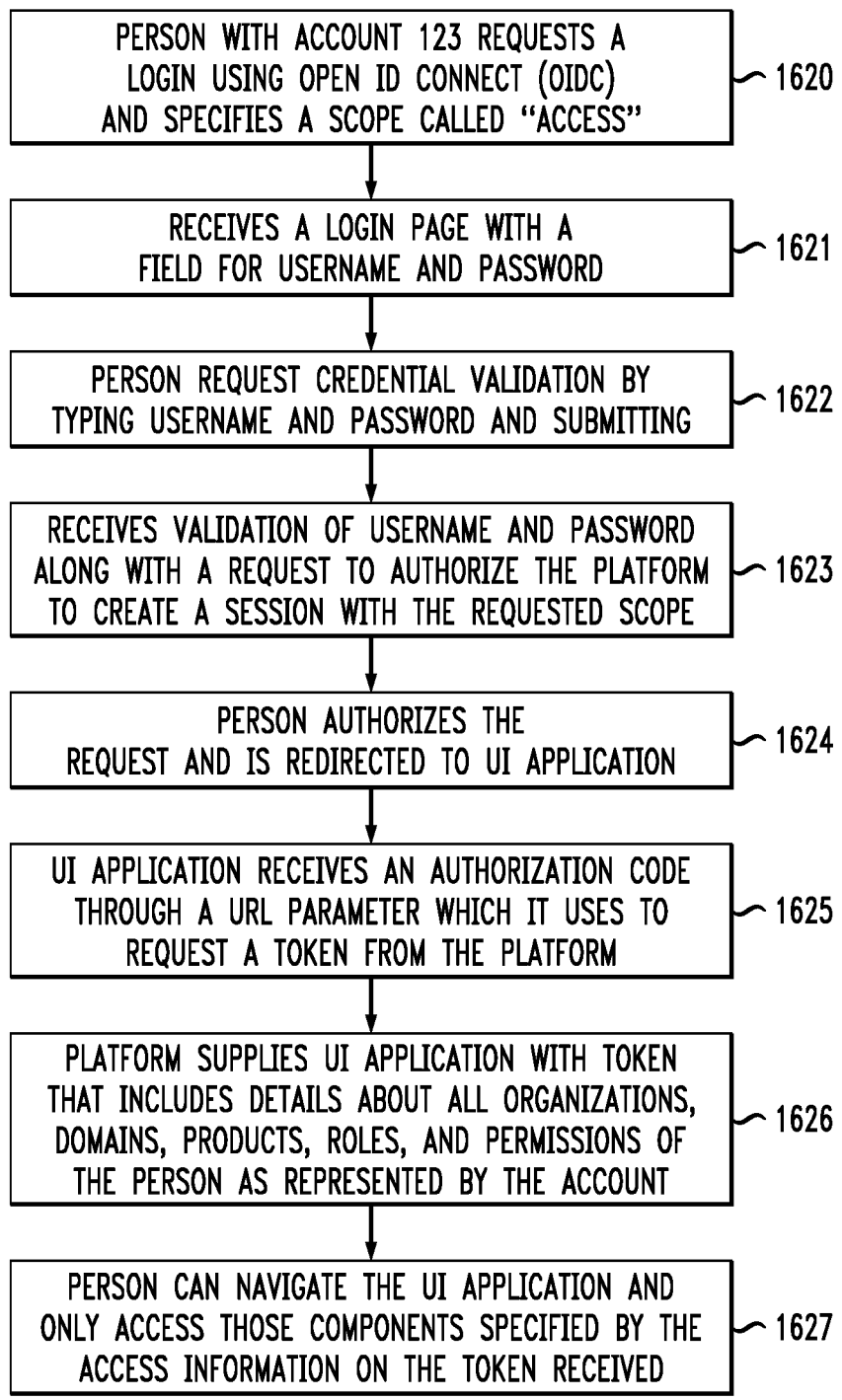

FIGS. 16-16B further illustrate examples of how the Platform 130, and specifically UE Auth 140, work to communicate assigned Roles 307/309 and associated Permissions 308 of a Person 110 represented by an Account 311 or an Automated Machine 801 represented by a Technical Component 306 (collectively referred to as an "Agent" in FIG. 16) through the Account Access Submodule 1303 or Technical Component Access Submodule 1603 to an authorization Token 1307 which can be interpreted by systems that receive the Token 1307, one implementation example of which is depicted in FIG. 16A.

Specifically, FIG. 16 shows that an Agent 110/801, regardless of type (Account 311 or Technical Component 306), authenticates through the Authentication & Authorization Module 203, at which point the Agent's type is determined through a logic gate 1601. Depending on that type, Persons 110 with Accounts 311 are routed through the Account Module 229, and Machines 801 with Technical Components 306 are routed through the Technical Component Module 233. Their respective routes ultimately lead to the Roles Module 223 which can provide details of the Roles 307/309 defined for either the Account 311 or Technical Component 306, with additional referential Permission 308 data provided from the Permission Module 225. All of this information culminates in the Token 1307, one possible example of which is shown in FIG. 13A.

There are many possible implementations to enforce access of data restrictions in a computer system, and the Platform 130 does not itself prescribe one approach over another. The access data (Roles 307/309, Permissions 308, Organizations 312, Products 303, Domains 304, etc.) represented in the Token 1307 is intended to exist as an abstracted concept that each implementing Product 303 can interpret as appropriate for its specific business case. That said, the Platform 130 itself and all the other modules and systems of the overall Service Provider Environment 100 are also Products 303 that implement some method of enforcement as well.

In FIG. 16A, one possible implementation to enforce the Role 307/309 and Permission 308 data represented in the Token 1307 is shown. A Caller is represented that could be a Person 110 or Machine 801 and that Caller 110/801 has with them a Token 1307 with access data. In this example, the access data represents three Permissions $308_{1-3}$. One important concept is that there is no guarantee of direct access to the Account 311 or Technical Component 306 data that the Caller 110/801 controls for an implementing Product 303, even within a Platform 130-specific Product $303_P$. All that is guaranteed is that there is a Caller 110/801 and a Token 1307. In the example, the Permissions $308_{1-3}$ correspond to Platform 130 modules grouped together as a Product $303_P$ solely for this example, by representing them as Targets 1401. Each Target 1401 has an accompanying Action 1402 which corresponds, in this example, to REST methods: POST equals "create", GET equals "read", and DELETE equals "delete". With this information, the Product $303_P$ can interpret in an automated process to which APIs the Caller 110/801 should be able to successfully make requests. For instance, because Permission $308_1$ equals "AuthGroup::Read", the Caller 110/801 can successfully access the Auth Group Module 201 API GET Method 1602; however, because the Caller 110/801 does not possess a Permission 308 for the POST ("create") method 1603 of this API, access is denied $1610_3$. The other Permissions $308_{2-3}$ and their resulting ability to access APIs are depicted by a check mark showing granted access corresponding to the permission or "X" marks $1610_{1-3}$ depicting restriction and denied access.

As first depicted in FIG. 13, the Platform 130 can utilize multiple security protocols to issue Tokens 1307. One of those standard security implementations, as one example, is OpenID Connect 1304. FIG. 16B illustrates, in steps 1620-1627, one possible flow of requests using the OpenID Connect 1304 protocol as supported by the Platform 130 to receive a Token 1307 which holds all the access data to securely navigate an example Product 303, in this case a graphical user interface.

Figure 17:
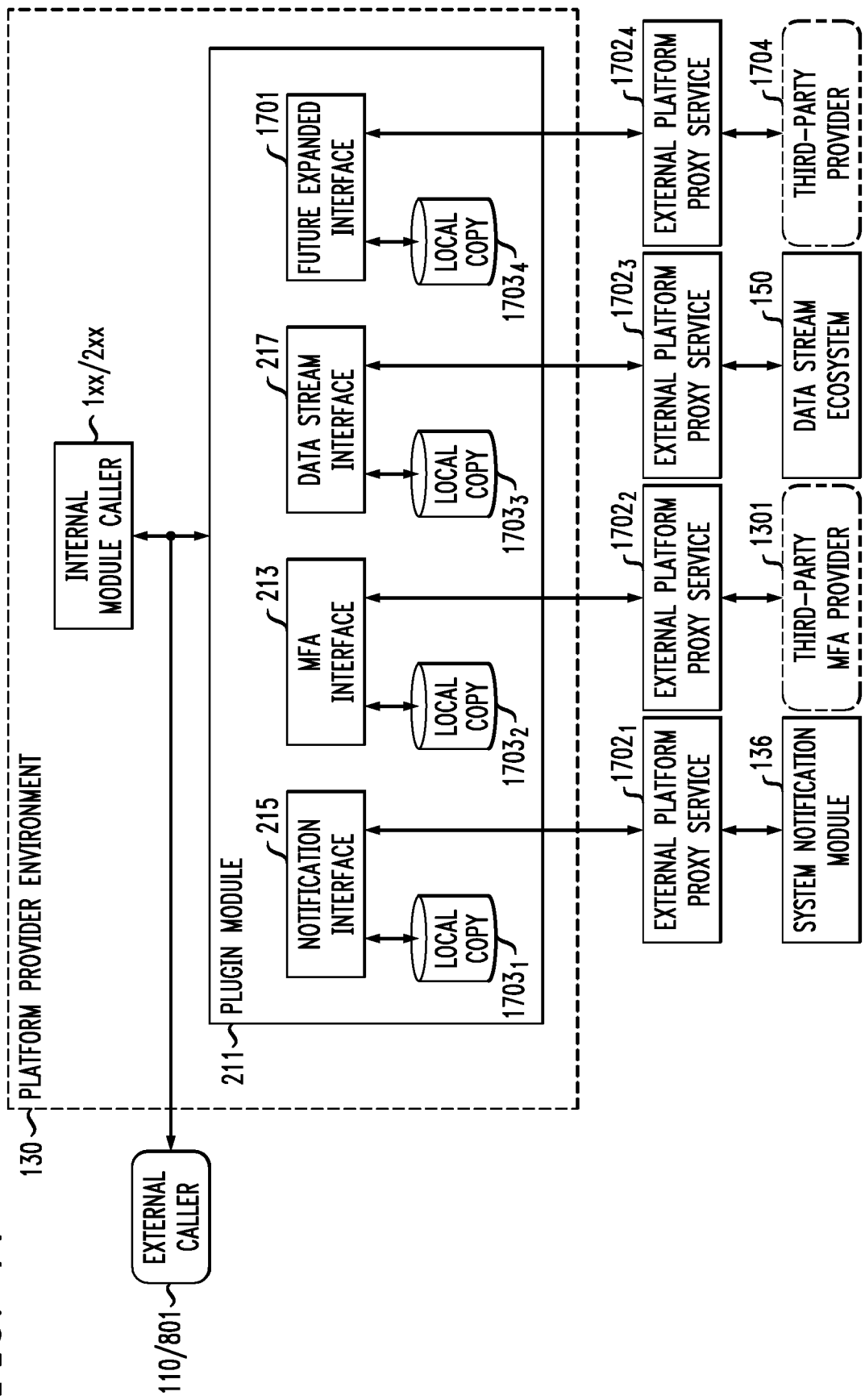
FIG. 17 is a block diagram that shows an example of how the Plugin Module allows expansion of overall Platform capabilities of FIGS. 1-2 through interfaces to external systems.

FIG. 17 illustrates in more detail an example of the Plugin Module 211 of FIG. 2 implementation. The Plugin Module 211 orchestrates implementations to external interfaces which can then be accessed by external Callers 110/801 or other internal modules within the Platform 130. Each instance of an interface implementation maintains a local copy of data $1703_{1-4}$ and synchronizes that data with the external service to which it is interfaced. This allows the Platform 130 to respond to queries quickly without having to transmit every request to a plugin interface outside the Platform 130. Interfaces in the Plugin Module 211 typically interact with a Proxy Service $1702_{1-4}$ outside of the module to access third-party systems and services outside of the Network 3201 (FIG. 32). As an example, the Notification Interface 215 interacts with a Proxy Service $1702_1$ which in turn interacts with the System Notification Module 136. This pattern can be reproduced to continuously add new interfaces to the Plugin Module 211 and, in doing so, expand the capabilities of the Platform 130. An example of expansion is shown with the depiction of a Future Expanded Interface 1701, accessing a Proxy Service $1702_4$ which connects to some third-party System 1704. While the Proxy Service 1702 approach is one example of implementation, another example would be to access the underlying system, such as the Third-Party Provider 1704, directly without going through a proxy (not depicted). FIG. 17 further illustrates examples of Platform 130 expansion through the MFA Interface 213 of FIG. 2, which allows the Platform 130 to leverage multi-factor authentication capabilities associated to the Third-Party MFA Provider 1301 of FIG. 13 and the Data Stream Interface 217 of FIG. 2, which allows components of the Platform 130 not directly connected to the Data Stream Ecosystem 150 of FIG. 1 to leverage the available functionality associated to Data Streams 406 of FIG. 4.

Figure 18:
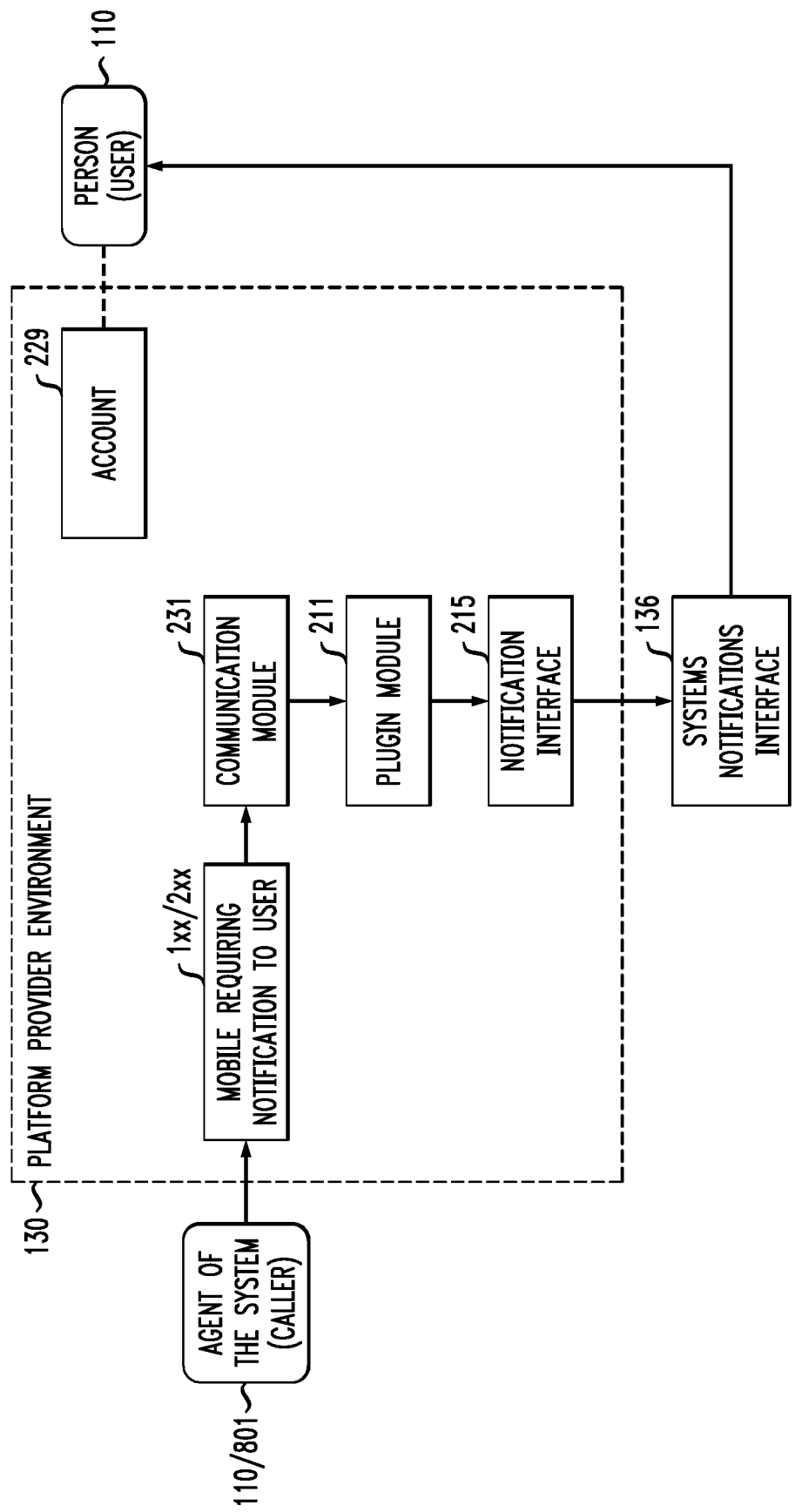
FIG. 18 is a block diagram that illustrates an example of how the Communications Module of FIG. 2 utilizes the Plugin Module and Notification Interface to send messages to Persons with Accounts.

FIG. 18 further illustrates an example implementation of how the Communications Module 231 within the Platform 130 utilizes the Plugin Module 211 and Notification Interface 215 to send messages to Persons 110 with Accounts 311 through the System Notification Module 136. This same flow was depicted in FIG. 17 alongside other possible interface implementations.

Figure 19:
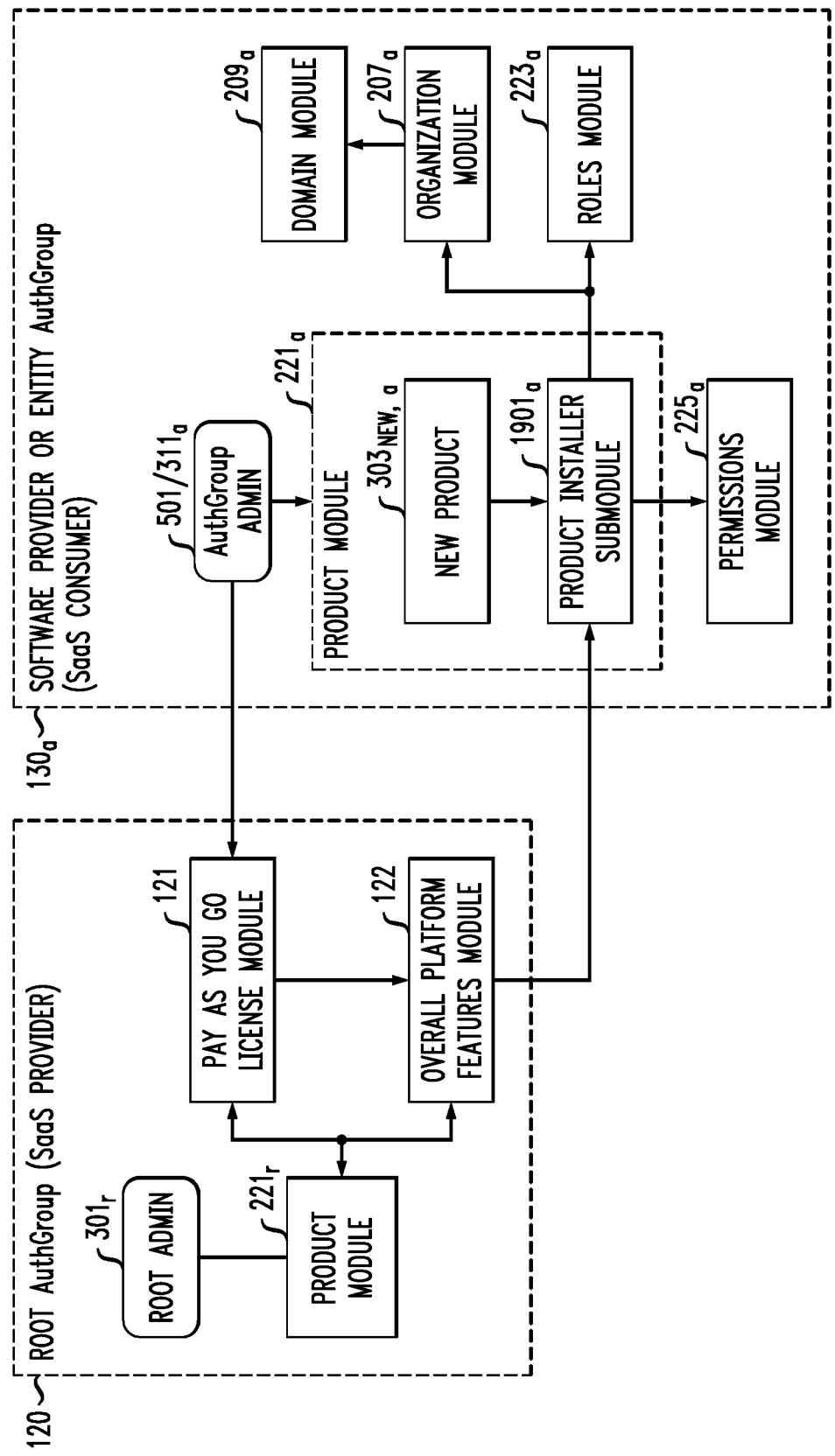
FIGS. 19-19A are a block diagram and related flow diagram, respectively, that show an example of how the Platform of FIGS. 1-2 allows overall Platform features to be managed by the Root Auth Group and purchased by other Auth Groups for installation and access in their own tenant context, making them available to their own Organizations and Accounts.
Figure 19A:
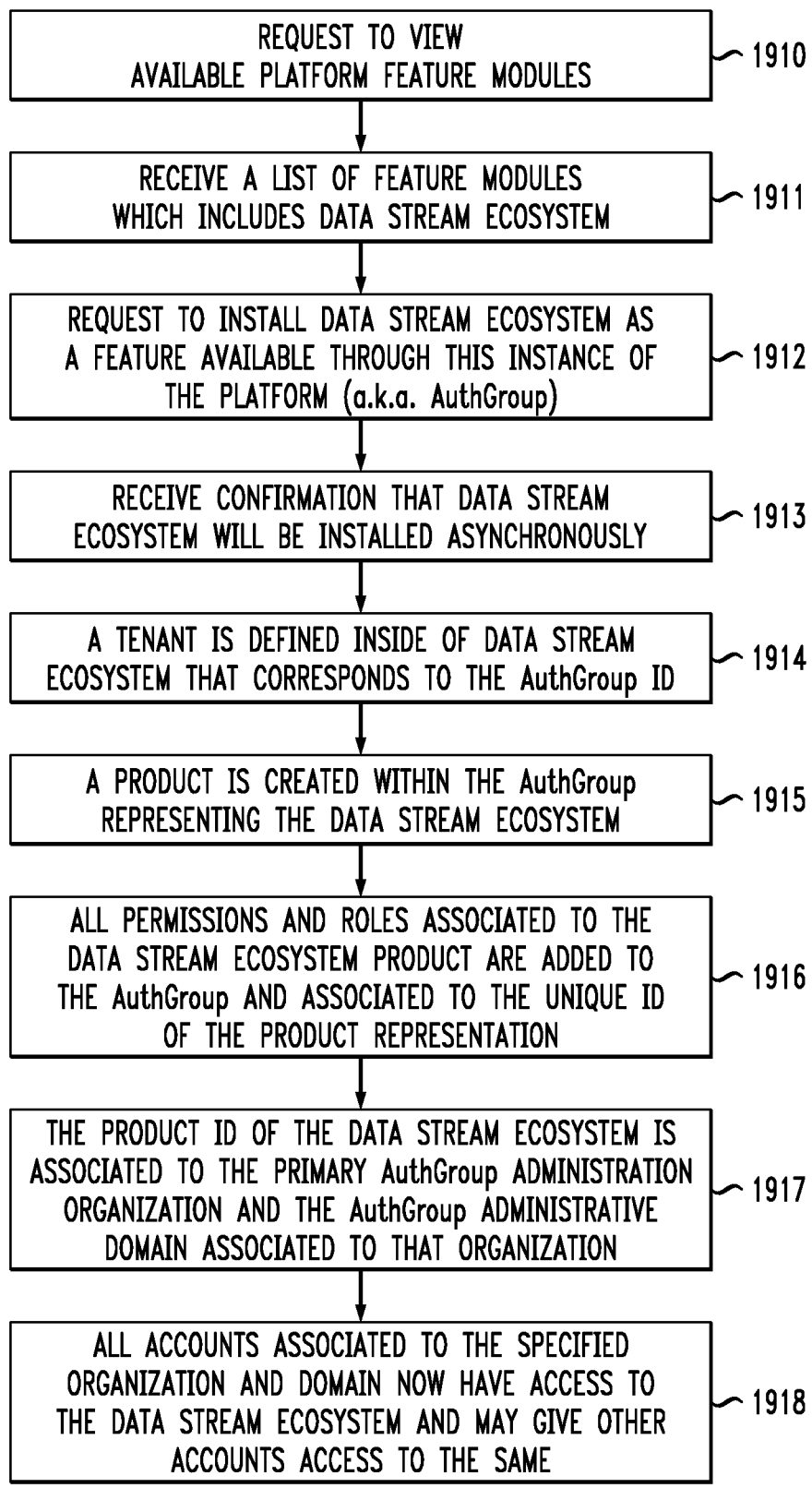

FIGS. 19-19A builds somewhat on the example implementations depicted in FIG. 6, where a unique and special instance of the Platform 130 is designated as the SaaS Provider 120 with the Root Auth Group 301, allowing Accounts 311, of the Root Auth Group 301, to manage (i) all other Platform 130 instances as SaaS Consumers (e.g., 130$_a$) and (ii) all platform object entities 300 & 400 across all Auth Groups 301. As part of this hierarchal relationship, the SaaS Provider Platform 120 can make features and products that represent, and over time enhance, the core functionality of all Platform 130 instances. These features are represented as new Products 303$_{new}$ and may comprise new modules not yet represented in FIGS. 1 and 2.

FIG. 19 shows (i) how the Pay-As-You-Go Module 121 is specific to the SaaS Provider 120 and (ii) how an Implementor 501$_a$ represented by an Account 311$_a$ in the Auth Group 301$_a$ with administration privileges over an instance of the Platform 130$_a$ can initiate a transaction that requests new Products 303$_{new}$ as inventoried by the Overall Platform Features Module 122 to be installed and made functional in the Platform 130$_a$. To fulfill the request, data concerning the Product 303$_{new}$ is transmitted to the Product Module 221$_a$ which utilizes its Product Installer Submodule 1901$_a$ to appropriately install the Permission 308, Role 307, Organization 312, and Domain 304 data for Product 303$_{new}$ operation via the Permission Module 225$_a$, Roles Module 223$_a$, Organization Module 207$_a$, and Domain Module 209$_a$, respectively. The physical implementation of any new modules in the form of code or compute devices 3110 (FIG. 31) already exists across all instances of the Platform 130 because the SaaS Provider 120 is itself an instance of the Platform 130. The installer 1901$_a$ makes the functionality available to the Platform 130$_a$ and empowers agents (Accounts 311$_a$ and Technical Components 306$_a$) to interact with the Product 303$_{new}$.

One such Platform 130 feature that could be installed on demand is the Data Stream Ecosystem 150. FIG. 19A illustrates one possible flow to fulfill such an installation request through steps 1910-1918.

Figure 20:
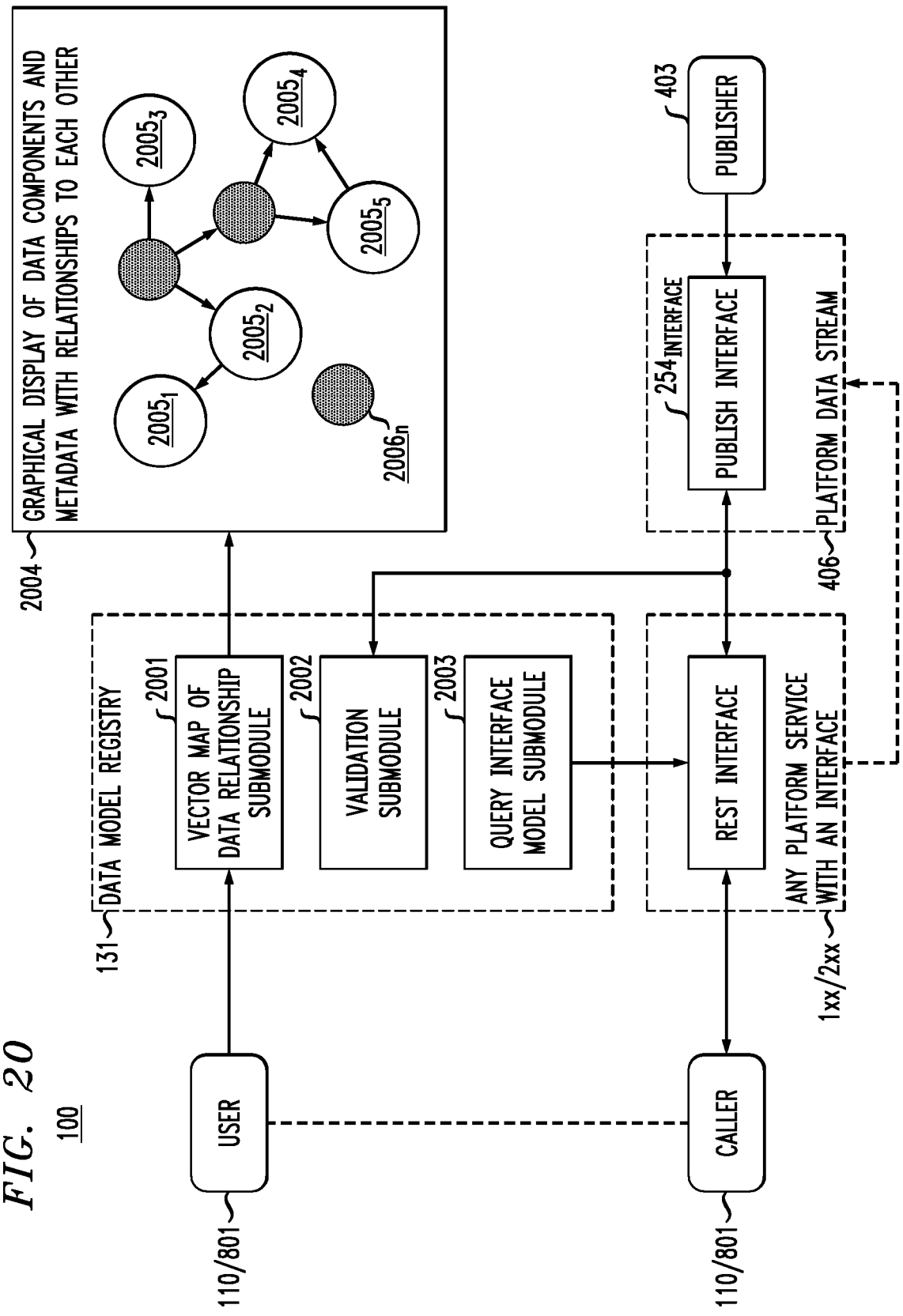
FIG. 20 is a block diagram that shows an example of how the Data Model Registry Module of FIGS. 1-2 manages data model management for Users and validation of data models for API and Data Stream interfaces within the Platform of FIGS. 1-2.

FIG. 20 illustrates an example implementation of the Data Model Registry 131. This module is shown with three primary submodules, but the logic could be implemented in a variety of ways: the Vector Map of Data Relationship Submodule 2001, the Validation Submodule 2002, and the Query Interface Model Submodule 2003.

The Vector Map of Data Relationship Submodule 2001 provides data for any given graphical user interface to render a vector map 2004 of Data Components 2005 and how they interact with each other or are categorized 2006, where categorization includes a metadata value that is shared by some subset of Data Components 2005. The purpose of this vector map 2004 is to allow a Person 110 to visualize the Data Components 2005 of their Product 303, Organization 312, or Platform 130 in order to identify patterns, relationships, gaps, and possible innovations that might otherwise not be immediately obvious.

A Data Component 2005 is a representation of any data object in the overall environment, described through a metadata schema language such as JSON schema, XML, YAML, and so on. A Data Component 2005 is not itself an instance of the data it represents. For example, if one assumes Data Component 2005$_1$ represents User Data, one expects Data Component 2005$_1$ to describe what a User object may look like, but not ever describe any specific users themselves. From this, Data Component 2005$_1$ describes that a User object includes an email address, a password, one or more phone numbers, and so on. Data Components 2005 are descriptive only.

Data Components 2005 can build on each other, inheriting descriptive information, as necessary. For example, if Data Component 2005$_1$ describes a User, and Data Component 2005$_2$ could describe Phone Numbers, which conceptually could also be part of the definition of a User (because users have phone numbers), then the Data Model Registry 131 allows Data Component 2005$_1$ as User to reference and inherit the description of Phone Numbers from Data Component 2005$_2$. This relationship is depicted through the arrow from Data Component 2005$_2$ to Data Component 2005$_1$.

Data Components 2005 can also describe data that is being transmitted between APIs of modules 1xx/2xx within the Platform 130 or Data Streams 406 within the Data Stream Ecosystem 150. The Validation Submodule 2002 is used to validate such data as it flows through these interfaces against the expected Data Component 2005 definition. This functionality is desirable because it adds a reasonable expectation that the data being transmitted is correctly formatted and will not create unexpected results either within a system module 1xx/2xx or a Data Stream 406. The Validation Submodule 2002 is depicted here within the Data Model Registry 131; however, it could also be replicated and located within each module 1xx/2xx or within the Data Stream Ecosystem 150 Data Stream 406 interface to accommodate a federated implementation. The example of a Data Publisher 403 of FIG. 4 validating data before it is pushed into a Data Stream 406 (FIG. 4) by going through the Publish Interface 254 of FIG. 2, which utilizes the Validation Submodule 2002, is also shown.

The Data Model Registry 131 can serve individual Data Components 2005 by ID, name, version, or some combination of metadata properties, in response to queries, which typically would be sent to the Query Interface Model Submodule 2003. REST is only one specification of query that would be supported; alternatively, another specification would be GraphQL. The implementation is flexible. This submodule 2005 can be used by other module interfaces to centralize entire API definitions as well using established API description schemas such as OpenAPI, SOAP, or RAML. In doing so, those APIs can ensure that there is only ever one true description for any given API definition centralized within the Data Model Registry 131.

FIG. 21 begins to explore the Data Stream Ecosystem 150, and specifically, the ability to create Data Streams 406. Data Streams 406 allow information to pass from a publishing entity, referred to as Publisher 403 (FIG. 20), to receiving entities, referred to as Subscribers 402. One Publisher 403 can send data through a Data Stream 406 to one or more Subscribers 402 simultaneously. The Data Stream 406 technology itself is not specific to the Platform 130. The Data Stream Ecosystem 150 uses a configurable Interface to Streaming Technologies 2102 to take advantage of existing solutions that allow for data to be mapped and transmitted between groups of Publishers 403 and Subscribers 402. The notion of One Possible Streaming and Queuing Technology 2103 is depicted in FIG. 21. Examples of these technologies include Kafka, Apache Pulsar, NATS Jetstream, and more. The Data Stream Ecosystem 150 wraps the internal functionality of one of these solutions to present novel capabilities and interfaces. One such novelty is the Stream Visualization Module 242, which interprets the data of a Data Stream 406 to be displayed in a UI Application 2101 with new features and capabilities that would not otherwise be available except through the Platform 130 and Data Stream Ecosystem 150. Additional details of the UI Application 2101 features are provided in FIGS. 24, 27, and 28.

For any of these features and interactions to be possible, the Data Stream Ecosystem 150 allows Agents (Person 110 or Machine 801) of the system to create, edit, query, destroy, and otherwise manage Data Streams 406 through the Stream Management Module 240, as depicted. For the sake of simplicity, the Stream Management Module 240 is depicted as an isolated module; however, as with all modules, this is only one possible implementation designed to logically describe the functional domain of managing Data Streams 406. Creation of a Data Stream 406 will include descriptive metadata further associating the Data Stream 406 to other object entities in the Platform 130 such as Product 303, Organization 312, and Domain 304. This metadata is then searchable through the Stream Management Module 240 to filter and identify specific Data Streams 406. This functionality, along with others, empowers the UI Storefront 2710, detailed in FIG. 27.

Another unique element of the Platform 130 and Data Stream Ecosystem 150 is that Data Streams 406 can be interfaced with the Data Model Registry 131 through the Data Model Registry Interface Module 260 to both (i) ensure data flowing within the Data Stream 406 is appropriately structured and (ii) provide a registry of data types available within the Data Stream Ecosystem 150 overall and how this data interacts and relates to other data, a concept visualized in FIG. 20 with inset 2004.

FIG. 21 also clarifies that an Agent 110/801 of the system is authorized to access the Stream Management Module 240 and Data Streams 406. As with any other module or Product 303 of the Platform 130, Accounts 311 operated by Persons 110 and Technical Components 306 representing Machines 801, managed through UE Auth 140, are the mechanism by which authentication and authorization are enabled and secured. The Data Stream Ecosystem 150 has a dedicated interface to UE Auth 140 called the UE Auth Interface Module 262 which allows access to the modules that allow a Person 110 or Machine 801 to authenticate and retrieve authorization (i.e., access as defined by Permissions 308 and other associations to object entities such as Organization 312, Domains 304, etc., communicated as described in FIGS. 13, 13A, 16, and 16A) to access the Data Stream Ecosystem 150 and all functionality within. FIG. 21 further illustrates the mechanics of how the UE Auth Interface Module 262 exposes appropriate functionality by depicting the Authentication & Authorization Module 203 of FIG. 2 working with one of the necessary access modules of either the Account Access Submodule 1303 or the Technical Component Access Submodule 1603, together depicted as "Appropriate Access Module" 1303/1603, to provide the relevant access to the calling Agent 110/801 (Person 110 of FIG. 1 or Machine 801 of FIG. 8). The Stream Management Module 240 then utilizes the UE Auth Interface Module 262 again to access the Product Module 221 (FIG. 2) working in concert with the Technical Component Module 233 (FIG. 2) to verify access as communicated by the Authentication & Authorization Module 203 (FIG. 2).

Figure 22:
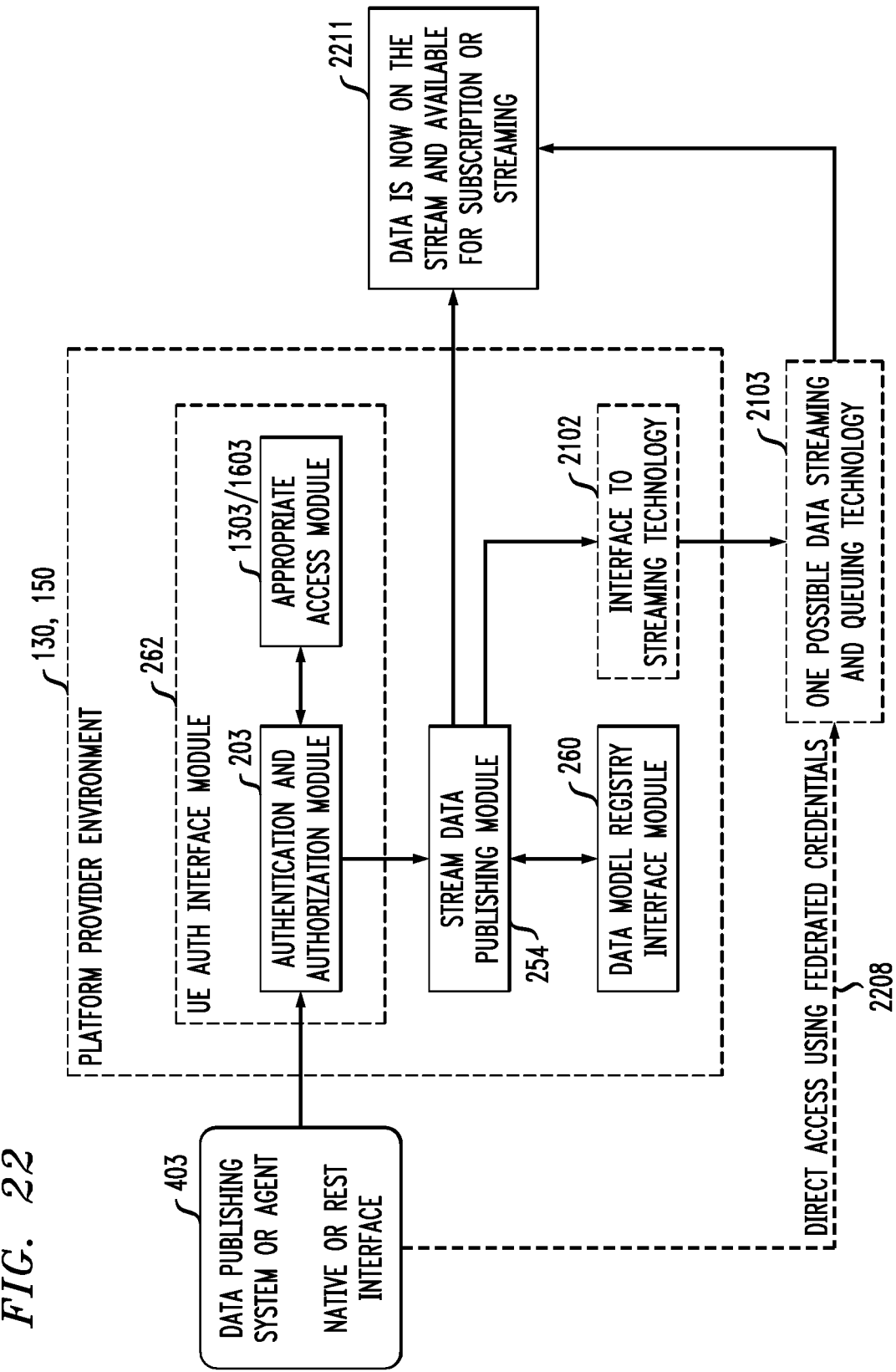
FIGS. 22-22A are a block diagram and related flow diagram, respectively, depicting how the Platform of FIGS. 1-2 allows systems that integrate with the Platform to publish data that may be validated by the Data Model Registry Module of FIGS. 1-2 into a Data Stream through either a REST API or Native Connection.
Figure 22A:
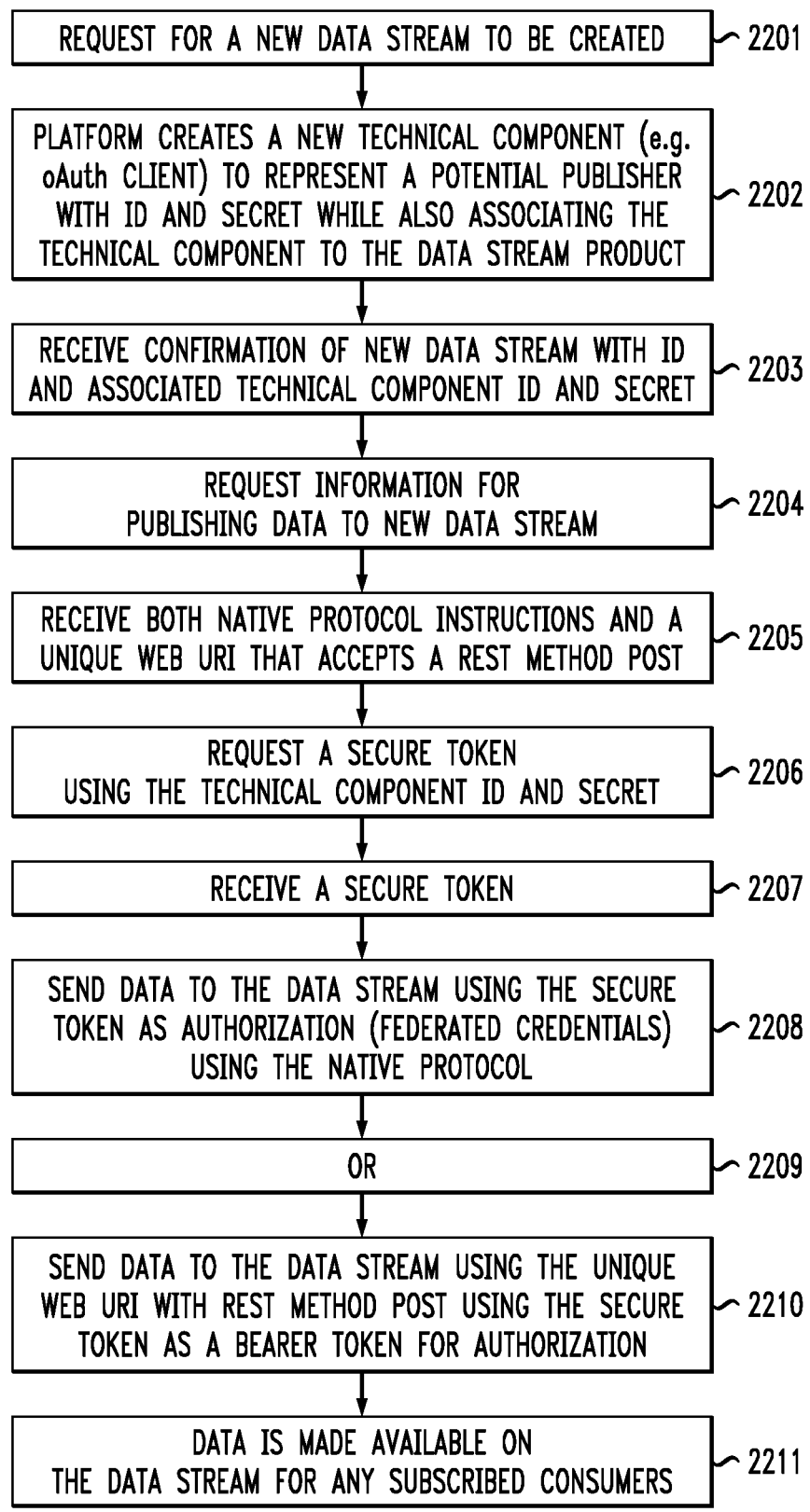

FIGS. 22-22A illustrate examples of how a Publisher 403 can transmit data to a Data Stream 406 using the Data Stream Ecosystem 150. Specifically, the Publisher 403 can use a native client implementation of the underlying Streaming and Queuing Technology 2103 which has been exposed through the Stream Data Publishing Module 254 and secured through UE Auth 140 via the UE Auth Interface Module 262, a native client implementation of the underlying Streaming and Queuing Technology 2103 that has been secured through Federated Credentials 2208, or the Publisher 403 can utilize an http REST request across the Network 3201 (FIG. 32) to the Stream Data Publishing Module 254, also secured through UE Auth 140. The Stream Data Publishing Module 254 abstracts the data transmission to Data Stream 406 functionality of the underlying Streaming and Queuing Technology 2103 and its Interface 2102. This abstraction allows the Data Stream Ecosystem 150 to expand the various kinds of input mechanism supported or data to Data Streams 406 in the future, of which the native and REST approaches are only two examples. The abstraction also allows the Stream Data Publishing Module 254 to ensure that all data going to the Data Stream 406 is valid through the Validation Submodule 2002 of the Data Model Registry 131 via the Data Model Registry Interface Module 260, a process described in FIG. 20. Where the native connection is direct and federated as is the case with the Federated Credentials 2208 connection, all authorization and access are assumed to have been defined and issued prior to the connection and validation becoming the responsibility of the publishing Agent (not depicted). In all cases, the result is that the data is now published to the Data Stream 406 (FIG. 4) and available to other systems as shown in block 2211. Throughout this process, the UE Auth Interface Module 262 is shown to be in use, illustrating how the underlying Authentication and Authorization Module 203 of FIG. 2 and Appropriate Access Modules 1303/1603 of (FIGS. 13 and 16, respectively) are exposed and made accessible to the Data Stream Ecosystem 150.

FIG. 22A illustrates in steps 2201-2211 an example flow of how an Agent 110/801 can request that a Data Stream 406 be created, become a Publisher 403 to that Data Stream 406, and request data to be transmitted to Data Stream 406 through either a native or REST interface to be received by multiple Subscribers 402 concurrently.

Figure 23:
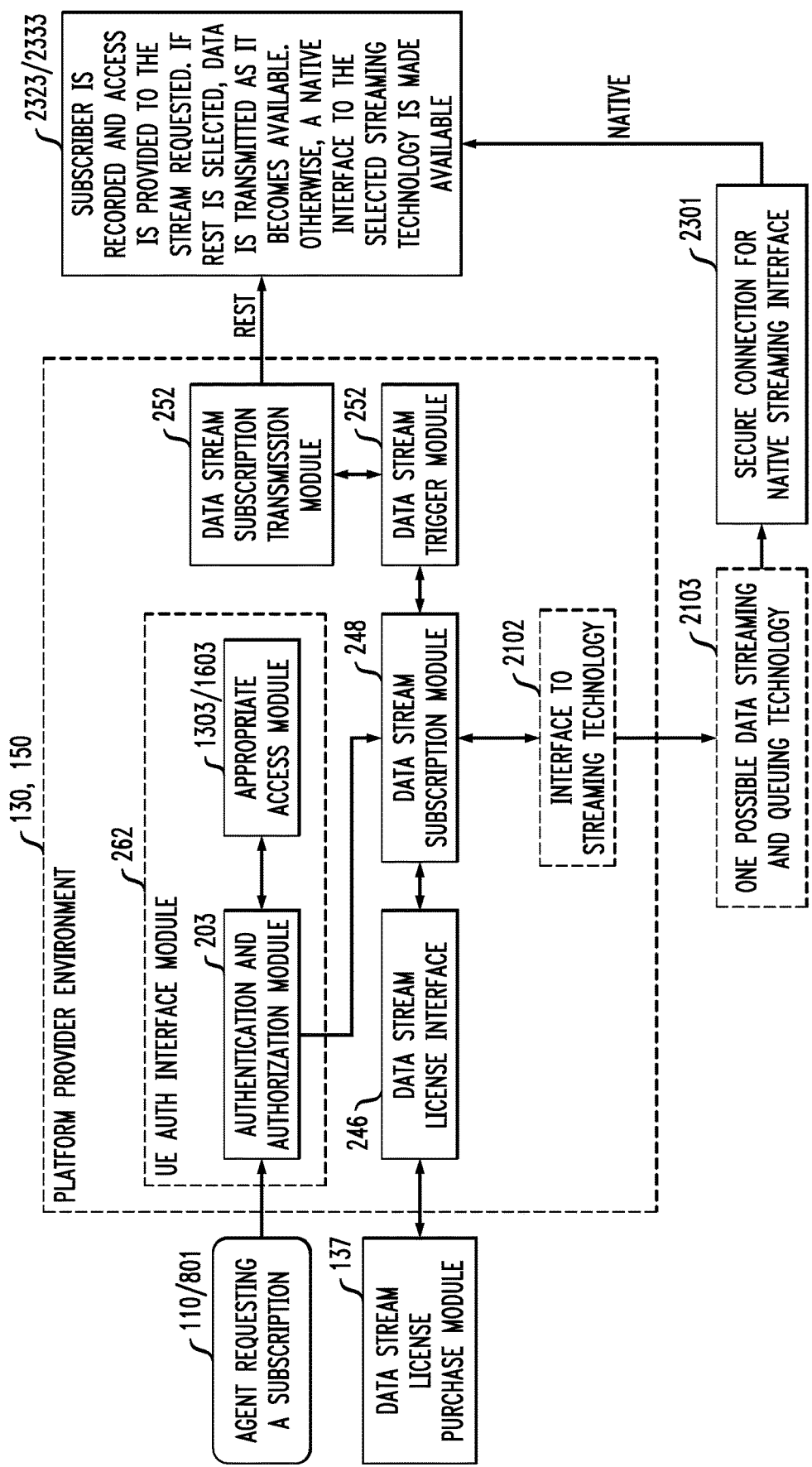
FIGS. 23-23A are a block diagram and related flow diagram, respectively, showing an example of how the Platform modules of FIGS. 1-2 work together to allow Users or Systems to subscribe to Data Streams through a License and receive information from that Data Stream either directly through a Native Connection or via a configured REST API transmission.
Figure 23A:
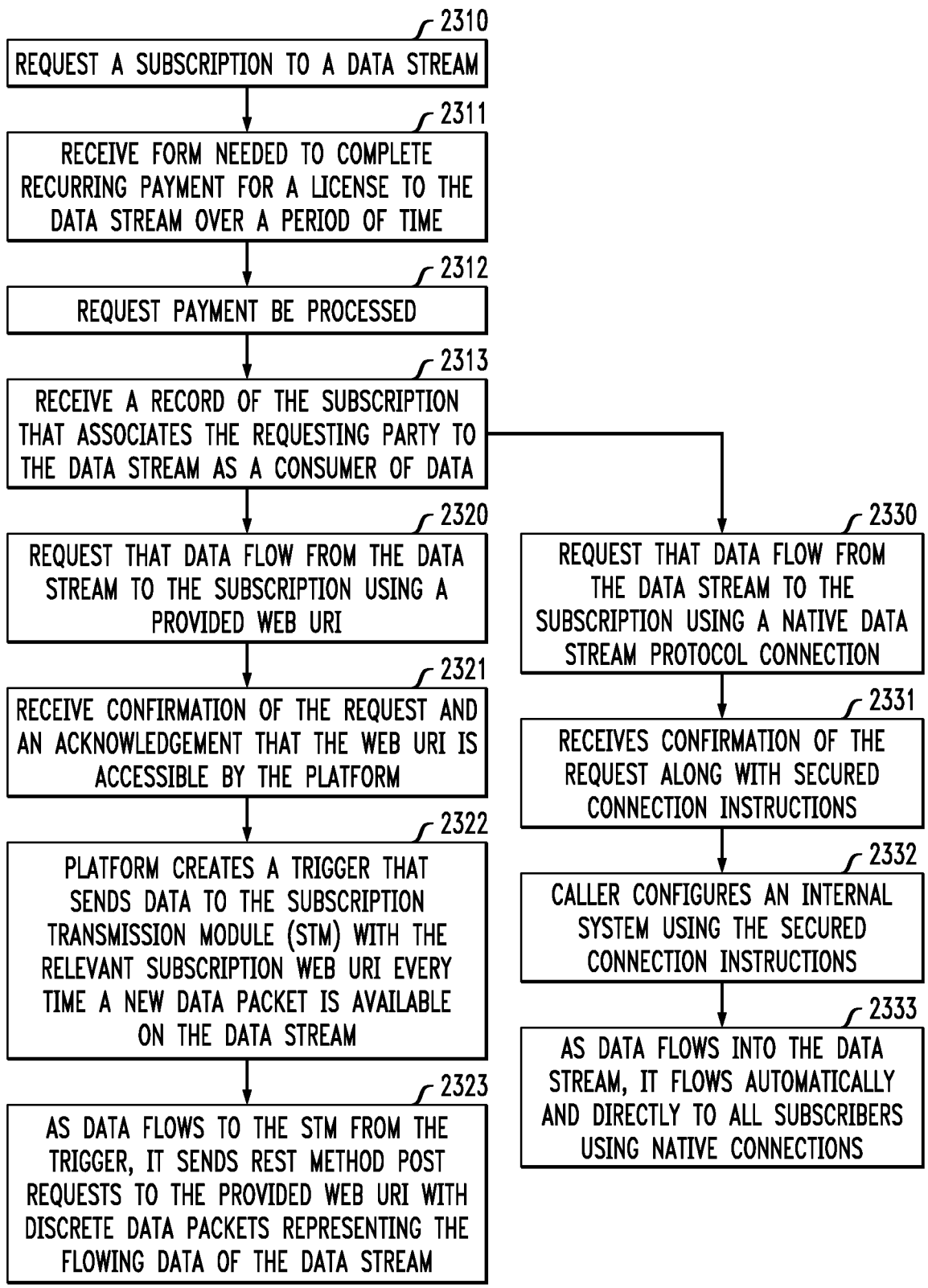

FIGS. 23-23A illustrate an example of how the Data Stream Ecosystem 150 allows a Subscriber 402 to access data flowing through a Data Stream 406 in multiple ways. As always, all access is secured through UE Auth 140 via the UE Auth Interface Module 262 within the Data Stream Ecosystem 150, where the Authentication & Authorization Module 203 (FIG. 2) and the appropriate access module, either the Account Access Submodule 1303 of FIG. 13 or the Technical Component Access Submodule 1603 of FIG. 16, are exposed through the UE Auth Interface Module 262.

The Platform 130 allows the Data Stream Ecosystem 150 to expose Data Streams 406 either directly as public or through a License 401 managed by the Data Stream License Purchase Module 137 accessed through the Data Stream License Interface 246. Data Stream Licenses 401 operate much the same way as Product Licenses 302 and allow an Implementor 501 of the Platform 130 to monetize access to Data Streams 406 by Organization 312. This is designed to be an optional component and the act of Licensing does not actually require a financial transaction.

Once a data stream is exposed, Persons 110 represented by Accounts 311 both within and independent of Organizations 312 depending on licensing, may create Subscribers 402, which embody the configurations of a subscription to the data and how that data should be transmitted. The Data Stream Subscription Module 248 manages all operations of Subscribers 402 where necessary, using the Interface to Streaming Technology 2102 to access functionality within the underlying Streaming and Queuing Technology 2103. Typically, a Subscriber 402 represents some form of automated system that is receiving the data, in other words, a Machine 801, and as such it is likely but not required that the Subscriber 402 would have a corresponding Technical Component 306 automatically generated to facilitate direct access without the intervention of the managing Account 311 operated by a Person 110. Once created and configured, a Subscriber 402 can now listen to the Data Stream 406 and transmit data as it becomes available in real time to the intended Machine 801 or other recipient.

The transmission of data from the Data Stream 406 can happen in several ways but two approaches described are (i) through a native client interface supported by the underlying Data Streaming and Queuing Technology 2103 which has been exposed and secured for Native Streaming Interface 2301 or (ii) through a REST-based http callback request system managed by the Platform 130 within the Data Stream Subscription Transmission Module 250. These options are managed through configuration of the Subscriber 402. When configuring a Subscriber 402, the minimum configurations will explain whether transmission is native, whether transmission involves an acknowledgement, and whether the transmission should be via REST POST method to a provided URI. Other configurations are possible which would affect frequency of transmission, specific data to filter, and so on.

When the configuration is for a native transmission, the data of a Data Stream 406 is sent to an intended recipient, typically a Machine 801, through the Native Streaming Interface 2301, which the receiving Machine 801 connects to and establishes an open connection with appropriate protocol as supported by the underlying Streaming and Queuing Technology 2103. The data then streams, is fetched, or otherwise becomes available, being acknowledged between each data packet or not depending on the configuration of the Subscriber 402. A Subscriber 402 may be configured this way because native transmission is fast and, depending on the underlying Streaming and Queuing Technology 2103, one or more third-party client interface technologies may exist beyond the scope of the Platform 130 to enable this connection with minimal effort. Despite the benefits, a Machine 801 component connecting to a Data Stream 406 in this way may need to be refactored to utilize such technologies, and that might not be a feasible option.

In situations where refactor to a native connection is not possible, the Subscriber 402 can be configured to transmit data via REST POST method to the Machine 801. In this configuration, a listener is instantiated within the Data Stream Trigger Module 252 that utilizes the consumer functionality of the underlying Streaming and Queuing Technology 2103 to receive data in real time from the Data Stream 406 and act on each new data packet received by sending the data through a REST http POST method to the URI that was provided as part of the configuration. This listener is a Trigger 404 specifically utilized for this purpose. There are other kinds of Triggers 404 described in FIG. 26.

To make this REST http POST method request to the URI provided, the Trigger 404 utilizes the Data Stream Subscription Transmission Module 248, which can make external requests across a Network 3201 and also provide any filtering, batching, and data masking for the Subscription 402 configuration as the data is being accumulated through the Trigger 404. This approach may be easier for Machine 801 components because, if they operate as part of a networked system, then it is highly likely that they are already able to receive http requests, and the update to receive these requests will be minimal.

FIG. 23A illustrates an example of a Person 110 operating through an Account 311 accessing a Data Stream 406 through a License 401 and defining a Subscriber 402 that can retrieve information through either the Native Streaming Interface 2301 or by REST http request through the Stream Subscription Transmission Module 250 in steps 2310-2333.

Figure 24:
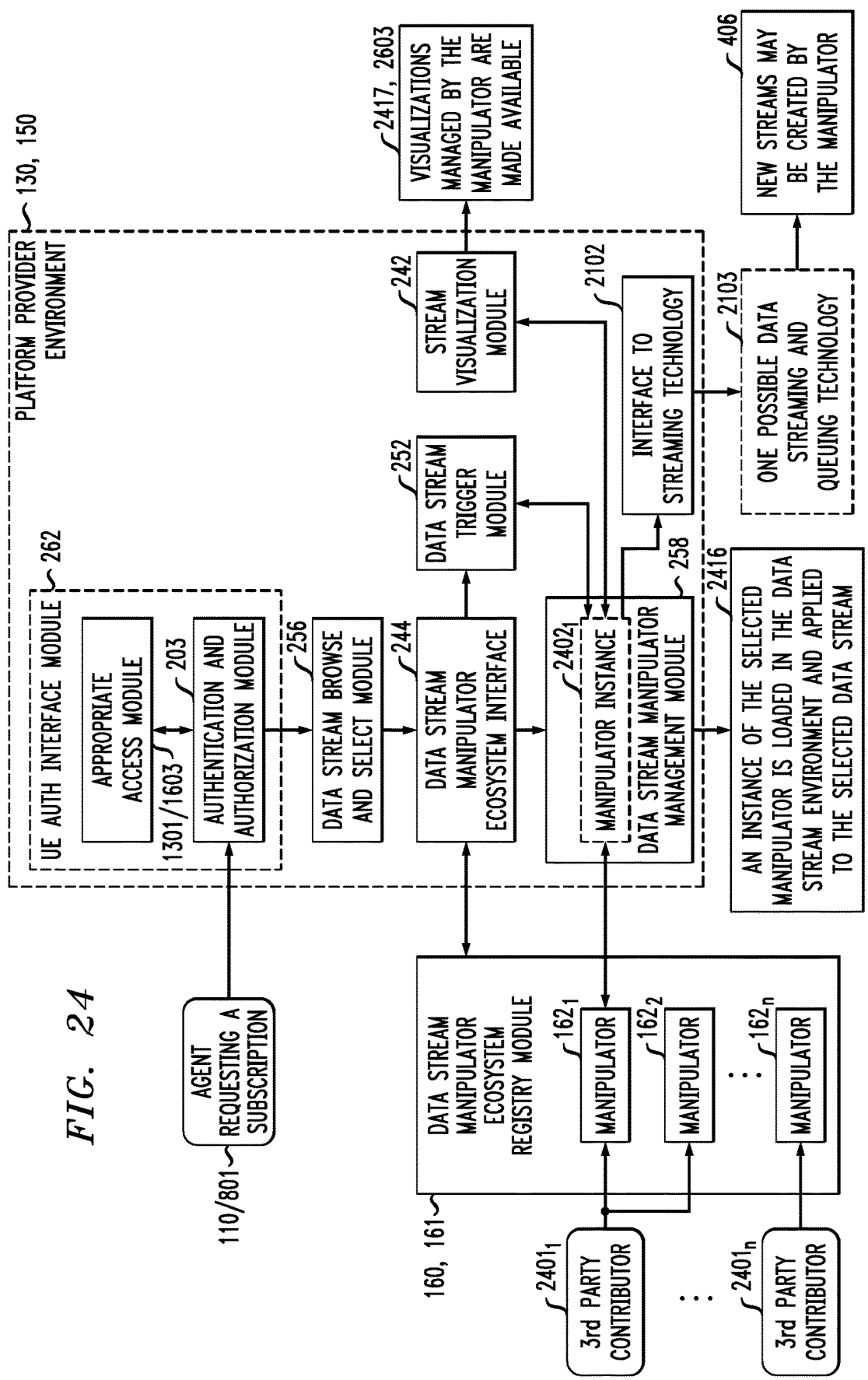
FIGS. 24-24A are a block diagram and related flow diagram, respectively, showing an example of how the Platform of FIGS. 1-2 allows Data Streams to be manipulated in various ways through third-party Data Stream Manipulators, made available to Platform users through an interface to the Data Stream Manipulator Registry Environment Module of FIGS. 1-2 and independent licensing.
Figure 24A:
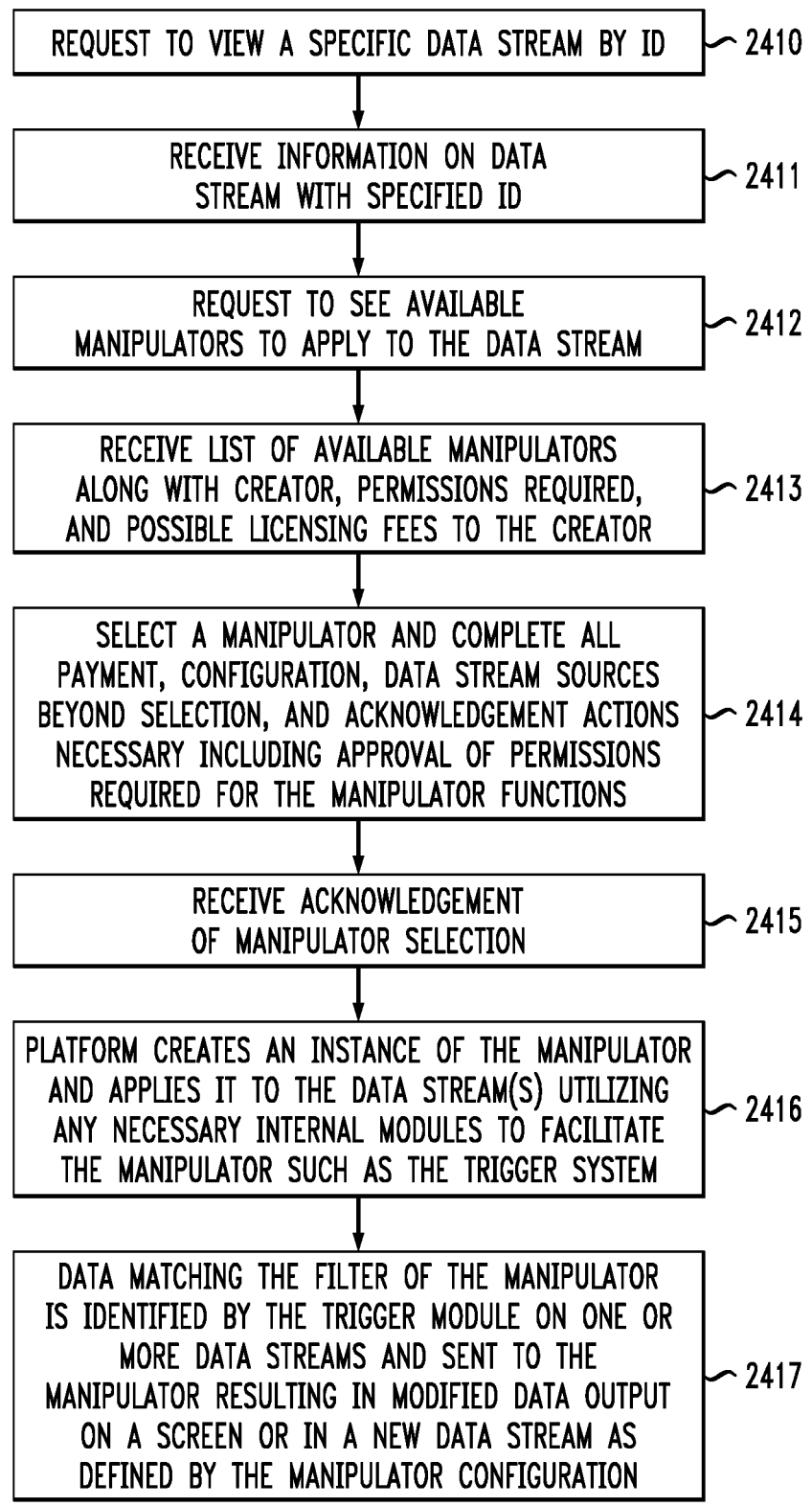

FIGS. 24-24A depict an example implementation of Data Stream Manipulators 162 and how they can exist as part of the Data Stream Manipulator Environment 160, managed by the Data Stream Manipulator Registry Module 161, independent of the Data Stream Ecosystem 150, and yet still be instantiated in the Data Stream Ecosystem 150 to manipulate the data flowing through Data Streams 406.

As with all Data Stream Ecosystem 150 examples, the UE Auth Interface Module 262 is depicted and exposes the Authentication & Authorization Module 203 along with the Appropriate Access Module 1303/1603 to enable secured access by an Agent 110/801 to the depicted components.

The Data Stream Manipulator Environment 160 is part of the overall Service Provider Environment 100 but not directly instantiated to each Implementor 501 with any specific Auth Group 301 within a Platform 130 instance. It exists as a separate system, with an example implementation defined here and in FIG. 1. The Manipulator Environment 160 exists in order to allow Third-Party Contributors 2401 who wish to implement agnostic Manipulators 162 to submit them to an accessible software registry that categorizes them and makes them available to Persons 110 or Machines 801 using or interfacing with instances of the Platform 130 for usage against Data Streams 406 in the Data Stream Ecosystem 150. Third-Party Contributors 2401 may provide their Manipulators 162 with or without limitations such as licensing requirements.

Agents 110/801 of the Platform 130 accessing the Data Stream Ecosystem 150 would typically be interacting with Manipulators 162 within the context of a Data Stream 406. As such, they will need to browse and choose a Data Stream 406 through the Data Stream Browse and Select Module 256.

A Manipulator 162 is a function encoded in any number of technical languages such as C, C#, Java, JavaScript, Python, etc., which takes as input the data of one or more Data Streams 406, makes alterations, filters, or merges the data of those streams, and (i) provides the resulting data as output to one or more Data Streams 406, which could be new or the same as the input streams, or (ii) alternatively transmits the data to an external system through one of many possible protocols such as HTTP. Manipulators 162 would access Data Streams 406 through the Interface to Streaming Technology 2102 which in turn exposes the underlying Streaming and Queuing Technology 2103. Manipulators 162 are limited only by the intention of the Third-Party Contributor 2401 encoding and making available the Manipulator 162. One example of a Manipulator 162 would be to take, as input, data from Data Stream A $406_a$ and perform an operation where only data that contains the word "Crypto"

is then output and published to a new Data Stream B 4066. Another possible example of a Manipulator 162 would be to take, as input, data from Data Stream A 406$_a$ and Data Stream B 406$_b$, then identify only data in both streams that occurred between a data range, and finally return as output this data as published to a new single Data Stream C 406$_c$. Another possible example of a Manipulator 162 would be to take, as input, data from Data Stream A 406$_a$ and output to Data Stream B 406$_b$ only data packets larger than 10 MB.

Manipulators 162 can be encoded by the Third-Party Contributor 2401 as agnostic of any specific Data Stream 406$_x$ or specific to a known Data Stream 406$_y$, both in terms of input and output. When agnostic, a Manipulator 162 can be configured by the Person 110 or Machine 801 instantiating the Manipulator 162 in the Data Stream Ecosystem 150. The specific mechanism of instantiation is described in FIG. 25. When an instance of a Manipulator 162 is instantiated in the Data Stream Ecosystem 150, it is referred to as a Manipulator Instance or Container 2402. Manipulators 162 which have not been instantiated may exist in many forms, one of which is an Image. Containers and Images as one possible implementation technology for Manipulators 162 are discussed further in FIG. 25.

The Data Stream Manipulator Ecosystem Interface 244 within the Data Stream Ecosystem 150 manages all the integrations that allow users of the Data Stream Ecosystem 150 to browse, potentially license, and select Manipulators 162 from the Manipulator Ecosystem 160 to instantiate as Manipulator Instances 2402 within the Platform 130 and specifically against intended Data Streams 406.

Manipulator Instances 2402 are managed within the Data Stream Ecosystem 150 by the Data Stream Manipulator Management Module 258. Management of Manipulator Instances 2402 implies that the provided Manipulator 162 code be executed in a secure runtime environment on some cadence. The Data Stream Trigger Module 252 is utilized to manage the cadence of execution.

The Service Provider Environment 100 may include an execution environment for Manipulators 162 and Manipulator Instances 2402 against Data Streams 406 in real time, as orchestrated by the Data Stream Manipulation Management Module 258. The Service Provider Environment 100 may further include an execution environment or a Compute Instance 3202 (FIG. 32) that includes an application software stack for Manipulators 162 (functional programs or applications) together with one or more infrastructure services for executing Manipulator 162 or a Manipulator Instance 2402 on a compute service. A User 110 may use a Manipulator 162 having scripts, rules, engines, or other components functional to perform manipulation of one or more Data Streams 406 and republished the manipulated data to the Data Stream Ecosystem 150 in the Platform 130 in the Service Provider Environment 100.

In addition to an output to other Data Streams 406, the output of a Manipulator Instance 2402 can be configured to be sent directly to the Stream Visualization Module 242 where it will be parsed and made searchable to a graphical user interface that seeks to display the information for human readability. Such functionality is further detailed in FIG. 26.

In FIG. 24A, one example flow of licensing a Manipulator 162 and instantiating it as a Manipulator Instance 2402 is described in steps 2410-2417.

Figure 25:
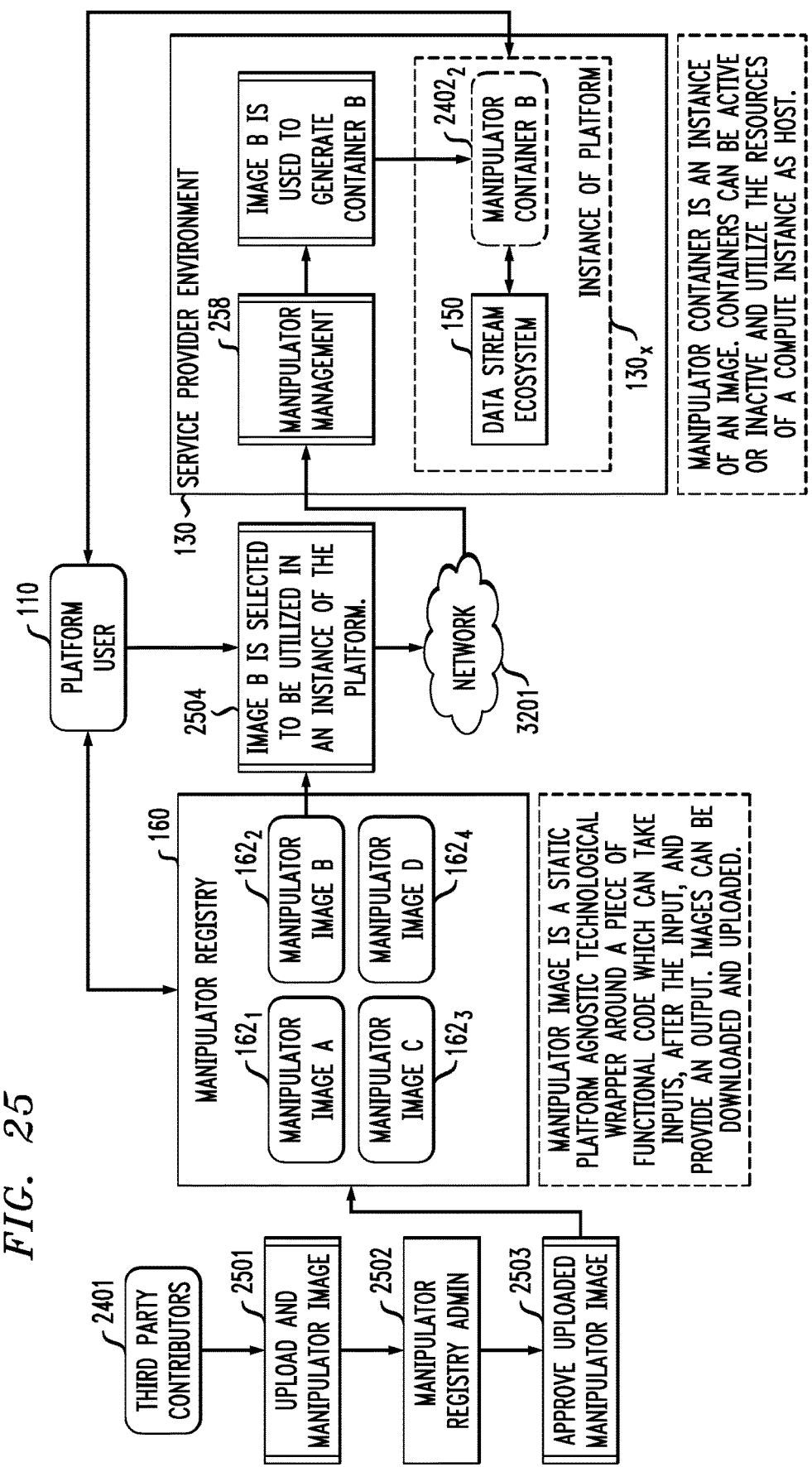
FIG. 25 is a block diagram that shows an example of how Container technology can be used to allow Data Stream Manipulators to exist in the Data Stream Manipulator Registry Environment Module of FIGS. 1-2 but be instantiated and utilized in the Service Provider Environment Data Stream Ecosystem.

FIG. 25 further illustrates an example implementation of Manipulators 162 being instantiated to Manipulator Instances or Containers 2402, and how that process might work. One technology that can support this instantiation functionality is that of containers, notable technical implementations of which include Docker, RKT, LXT, etc. Typically, when working with a container, one defines an "Image" which wraps an intended grouping of code and dependencies, and when one instantiates the "Image" in order to execute, this instantiation is called a "container". To further elaborate, a Manipulator 162 image is a static platform-agnostic technological wrapper around a piece of functional code with all dependencies included. Images are, by their nature, mobile and can easily be downloaded or uploaded from and to a system. A Manipulator Instance or Container 2402 is an instance of an image virtualized to execute in a host environment. Each image execution is identical to the previous and ephemeral in terms of locally stored data, where "local" means the host environment memory or data store. Containers can be active or inactive and utilize the resources of a Compute Instance Device 3110 as host.

In the example implementation of the Manipulator Registry 160 of FIG. 25, Third-Party Contributors 2401, who are persons that create Manipulators 162, represent their Manipulator 162 contributions as images and upload them to the Manipulator Registry 160. The upload process 2501 includes a check where a Manipulator Registry Admin (one or more humans or machines) 2502 reviews and validates the upload to ensure quality 2503 before allowing it to be listed in the Registry 160 as shown with Manipulators 162$_{1\text{-}4}$. Manipulator 162 images are then selected by a Person 110, in this context, a user of Platform 130, as represented in step 2504, and downloaded to the Platform 130 through a Network 3201, where they can be instantiated into a Manipulator Container 2402 and managed through the Manipulator Management Module 258.

Figure 26:
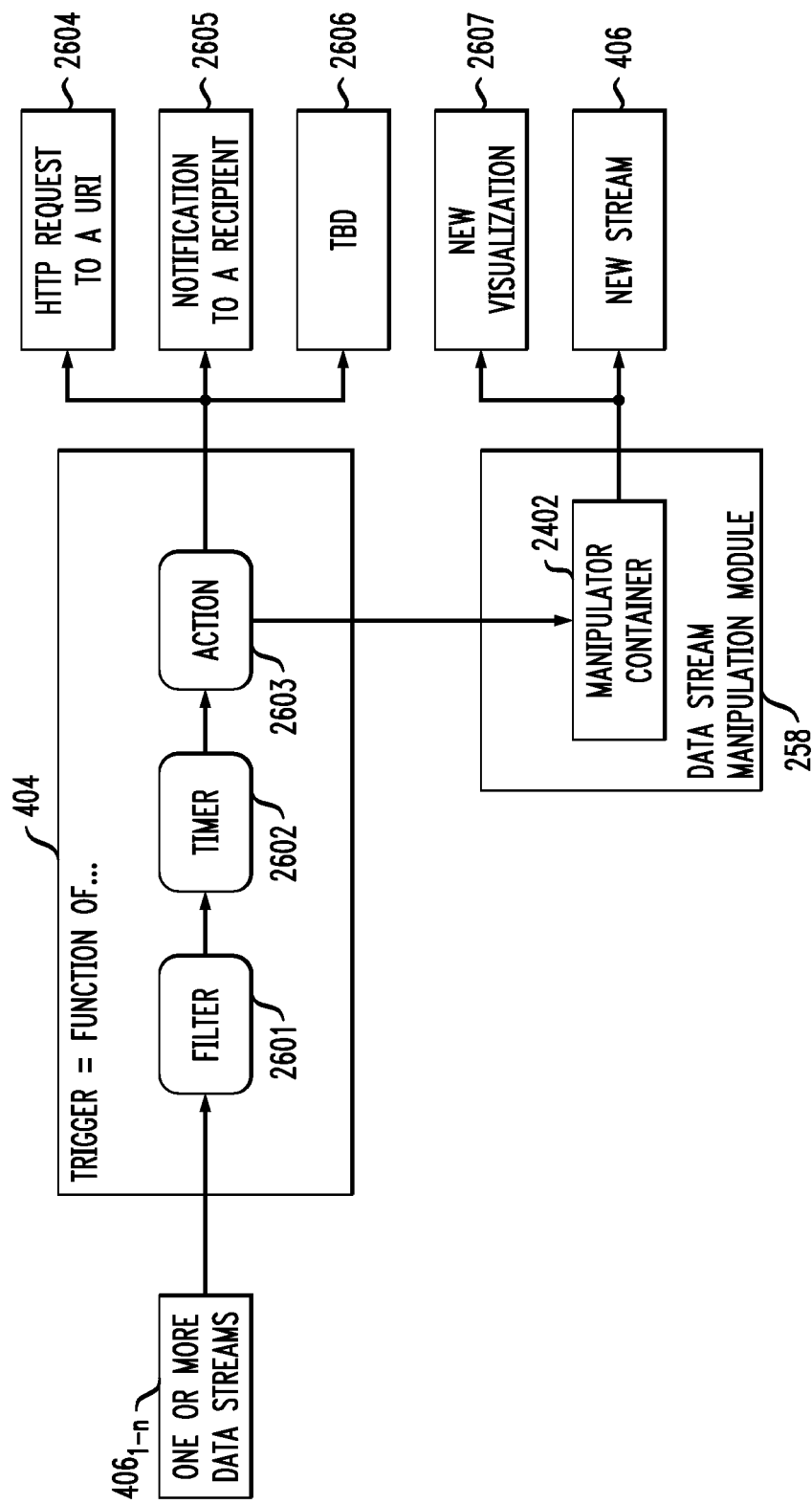
FIG. 26 is a block diagram that explains the inner workings of a Stream Trigger, how it can potentially create new streams or visualizations, and how it is related to Data Manipulators.

FIG. 26 elaborates on an example of a Stream Trigger 404. A Trigger 404 continuously monitors one or more Data Streams 406 in order to execute an Action 2603 when the condition of a Filter 2601 or Timer 2602 are true. A Trigger 404 can have both Filter 2601 and Timer 2602, or only one of either, but it has at least one Filter 2601 or Timer 2602.

A Filter 2601 is a predefined conditional that returns true to execute the Action 2603 when the condition is met. This conditional can be specific to anything within one or more Data Streams 406. For example, a Filter 2601 could be set to return "true" whenever there is data in a Data Stream 406 that includes the word "Crypto". Another example is that a Filter 2601 could be set to return "true" whenever there is data in a Data Stream 406 between a specific time range.

A Timer 2602 is a chronological definition to execute the Action 2603 at specific intervals. For example, a Timer 2602 could be set to trigger the Action 2603 every five minutes.

An Action 2603 is a predefined sequence that alters data or state within a Data Stream 406, the Platform 130, or some other targeted system through a Network 3201 (FIG. 32). An Action 2603 can also transmit data (Data Packets 2731 of FIG. 27) from a Data Stream 406 in one or more protocols such as http REST or web sockets. One example of an Action 2603 executed to accomplish a data change, state change, or visualization, is to use a Manipulator Instance or Container 2402 as managed by the Data Stream Manipulation Module 258 to act on Data Streams 406 or potentially create a New Visualization 2607 that can be viewed. In general, all Manipulator Instances 2402 use a Trigger 404 to execute; however, not all Triggers 404 use Manipulator Instances 2402 as the mechanism of Action 2603. Another example of an Action 2603 that does not rely on a Manipulator Instance 2402 is to send an http request to a predefined web URI 2604 whenever either the Filter 2601 or Timer 2602 return "true". Another example of an Action 2603 is to notify a recipient 2605 of a specific kind of data within a Data Stream 406 whenever either the Filter 2601 or Timer 2602 return "true". In instances where the Action 404 is not defined by a Manipulator Container 2402, the list of predefined options can be expanded over time by the Platform SaaS Provider 120, as indicated by the FIG. 26 inset labeled "TBD" (to be determined) 2606.

Figure 27:
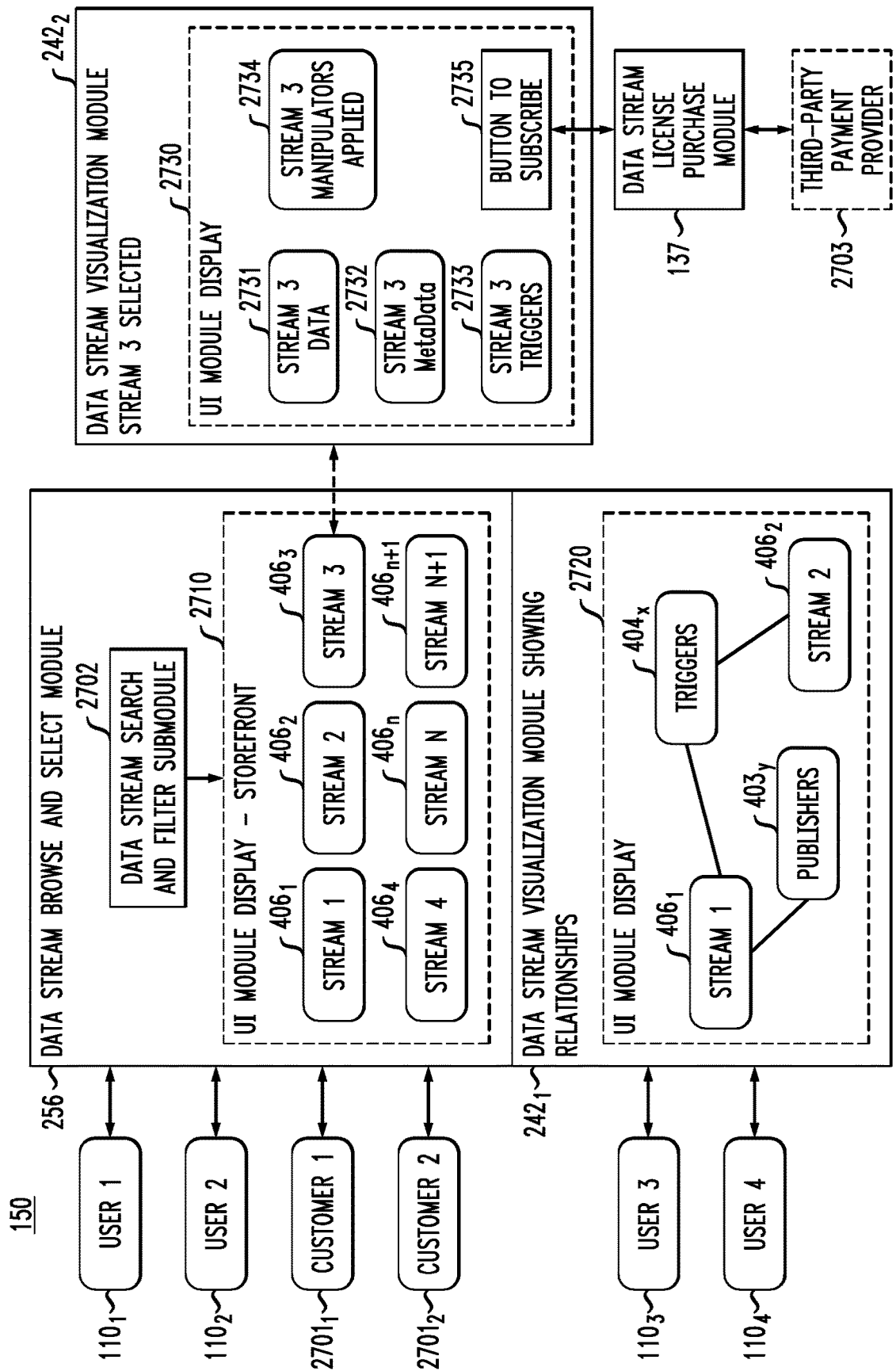
FIGS. 27-27A are a diagram and related flow diagram, respectively, that shows Users and/or Customers accessing a Platform experience of FIGS. 1-2 called the Data Stream Ecosystem where they can browse different Data Streams, see relationships of Data Streams to each other, select an individual Data Stream to view its data/metadata, and/or subscribe via licensing.
Figure 27A:
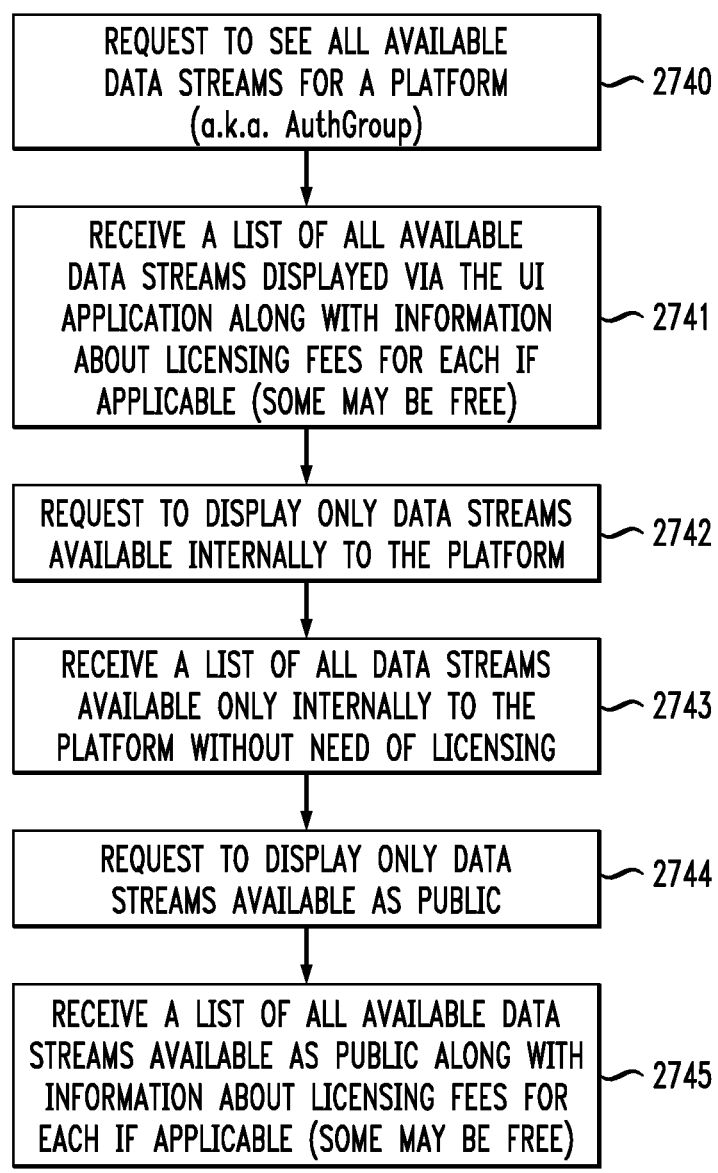

FIGS. 27-27A illustrate an example of Users (Persons) 110, some of whom may be Customers 2701, accessing the Data Stream Ecosystem 150 to browse for and select different Data Streams 406. The primary distinction of a Customer 2701 is that they have no management privileges over Data Streams 406 and typically provide payment to gain access to Data Streams 406 through a Data Stream License 401. FIG. 27 shows UI screens that would typically be rendered on the UI Application 2101 of FIG. 21; however, the data that is used by the UI Application 2101 is generated by decoupled modules depicted, specifically the Data Stream Browse and Select Module 256 and Data Stream Visualization Module 242. The Users 110 and Customers 2701 are therefore shown interacting with those modules directly to simplify the interaction for the sake of explanation. A more technically accurate representation is defined in FIG. 28.

FIG. 27 shows that Users 110 and Customers 2701 can access a Storefront 2710 view of the available Data Streams 406, as rendered in UI Module Display within a UI Application 2101. In this Storefront 2701, the User 110 or Customer 2710 can filter and search for specific Data Streams 406 using the Data Stream Browse and Select Module 256, which in turn uses the Data Stream Search and Filter Submodule 2702 to provide detailed search and filter options. The Data Stream Search and Filter Submodule 2702 is one possible implementation of this functionality. Another implementation example would be to wrap this functionality into the Data Stream Browse and Select Module 256. An example of the search process is illustrated in the flow diagram of FIG. 27A in steps 2740-2745. FIG. 27 also shows only Users 110 (not Customers 2701) accessing a UI Display 2720 that shows relationships between Data Streams 406, Triggers 404, and Publishers 403, to better understand the overall landscape of Data Streams 406 that are represented in the Storefront 2710.

Within the Storefront 2710, either User 110 or Customer 2701 can select a Data Stream 406, an example of which is depicted with Data Stream 3 $406_3$. This results in a new UI Module Display 2730 of a single Data Stream 4063. Within this UI Display 2730, the User 110 or Customer 2701 can see the Data Packets 2731 flowing within the Data Stream 406, any Metadata 2732 associated to the Data Stream 406, any Triggers 2733 associated to the Data Stream 406, any Manipulators 2734 associated to the Data Stream 406, and a Subscription Button 2735 to subscribe to the Data Stream 406. In some systems and environments that manage asynchronous data transmission, Data Packets 2731 may also be referred to as "events" or "messages".

These rendered elements of the UI Display 2730 (2731-2735) are not an exhaustive list of possible features, but rather serve as an example of what may be presented to allow detailed interaction with a Data Stream 406. Within this example, should a User 110 or Customer 2701 wish to subscribe with the Subscription Button 2735, this would initiate a flow where a transaction to license the stream is managed by the Data Stream License Purchase Module 137, potentially through a Third-Party Payment Provider 2703. Once this transaction is completed, the data of the Data Stream $406_3$ is accessible to the User 110 or Customer 2701, which is now a Subscriber 402. The mechanism of becoming a Subscriber 402 is defined in FIG. 23.

Figure 28:
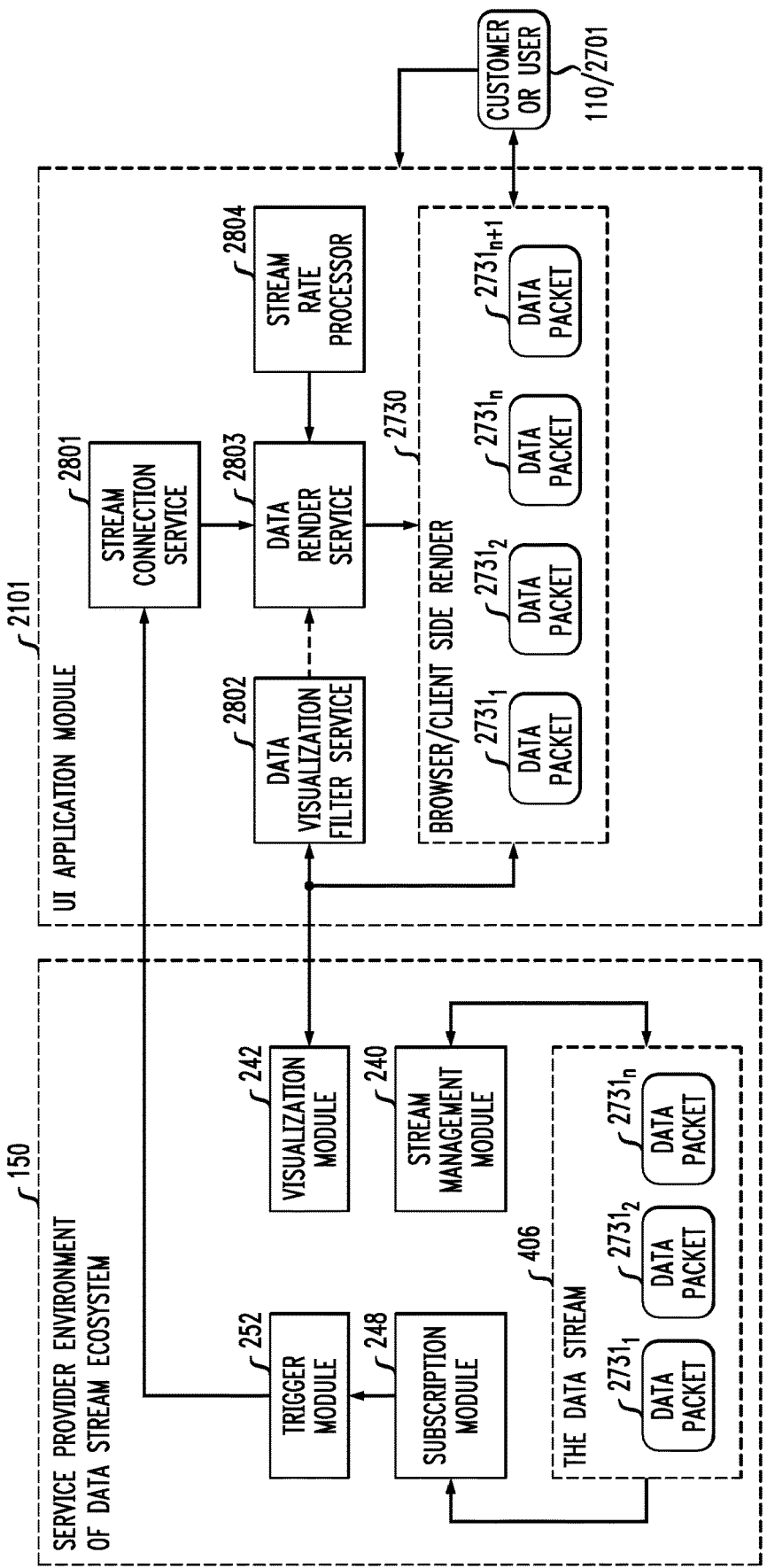
FIG. 28 is a block diagram and FIGS. 28A-28B are related flow diagrams showing an example of how the UI Application Module of FIG. 21 represents and renders individual Data Streams as packets of information for viewing and filtering by a Customer or User.
Figure 28A:
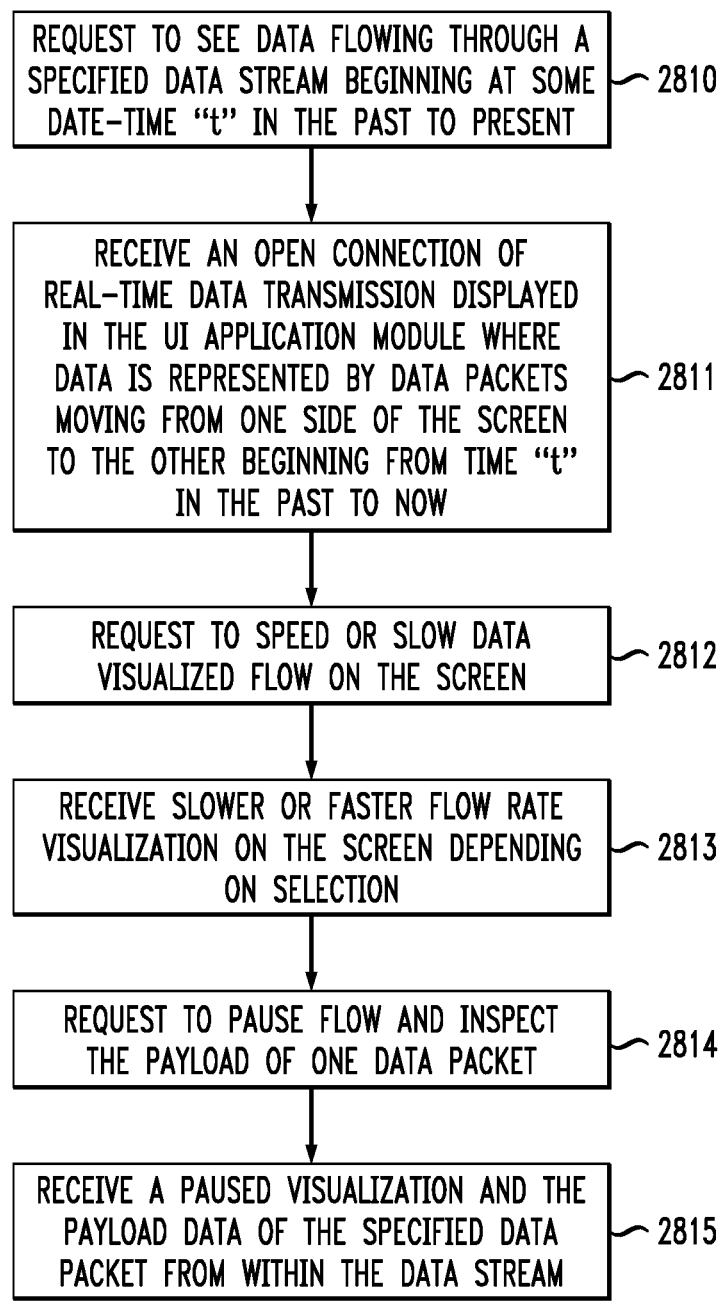
Figure 28B:
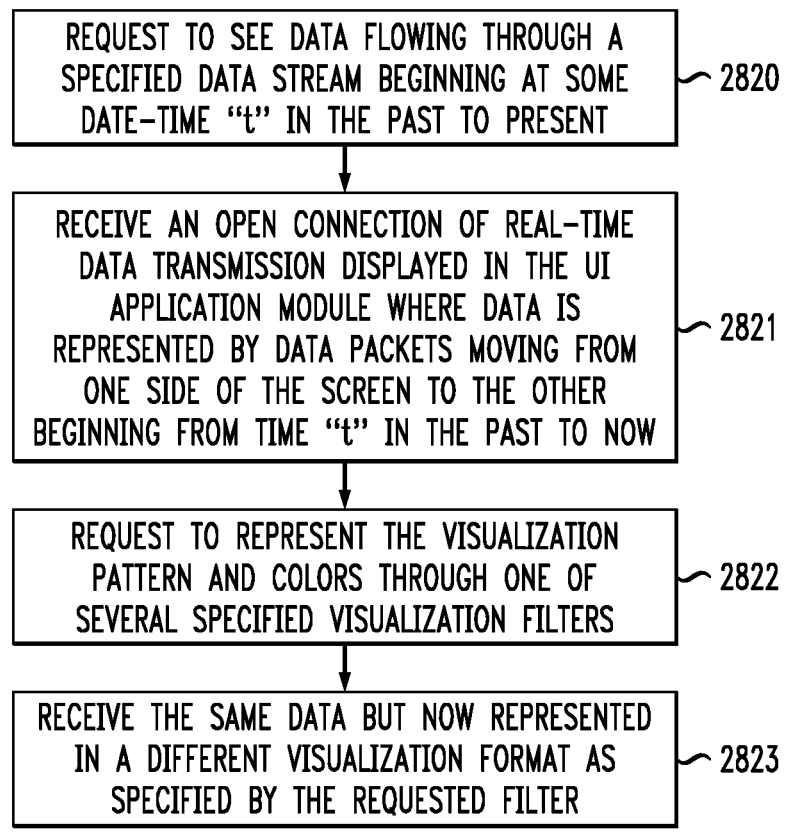

FIGS. 28-28B illustrate an example of how the UI Application 2101 represents and renders individual Data Streams 406 and their underlying Data Packets 2731. The UI Application 2101 is typically a decoupled executable runtime operating on a Compute Device 3110 (FIG. 31) other than any that are operating the other modules of the Platform 130; however, the UI Application 2101 could be transmitted from a module in the Platform 130 to then execute and operate in a client device that could be located anywhere. Examples of client devices include a web browser, a mobile application, a personal computer, or other Compute Devices 3110 within or external to the overall SaaS Environment 100. The UI Application 2101 is intended to allow a Person 110 to authenticate with the Platform 130 using UE Auth 140 and begin interacting with and possibly altering data of the Platform 130 using their Account 311 and any subsequent access and authorization permitted to that Account 311. A Customer 2701 is just one kind of Person 110 and will also interact with the Platform 130 using an Account 311.

FIG. 28 shows that the ability of UI Application 2101 to show Data Packets 2731 streaming on the UI Display 2730 is powered by a temporary Subscription 402, managed by the Subscription Module 248, which allows a Trigger 404, managed by the Data Stream Trigger Module 252, to continuously observe and filter an appropriate volume of Data Packets 2731 from a given Data Stream 406 and provide them to the Stream Connection Service 2801 in the UI Application 2101 to then be rendered. FIG. 28 also shows that Data Streams 406 are themselves managed by the Stream Management Module 240, though the Stream Management Module 240 might not itself be necessary for the visualization functionality, except to initialize the process by identifying a Data Stream 406 to visualize (not depicted). A typical protocol for streaming data like this on a client application is to use Web Sockets. Other examples of protocols to achieve the same result include batch polling via http REST requests, where the Stream Connection Service queries for batches of Data Packets 2731. These protocols and the subsequent streaming of data cross the Network 3201 are made possible through the Action 2603 component of the Trigger 404, which, as stated in example functionality TBD 2606 of FIG. 26, can be expanded over time to take one or more different actions to alter data or transmit data. In the example, the Stream Connection Service 2801, regardless of which protocol was used to gain access to Data Packets 2731 from a Data Stream 406, uses the Data Render Service 2803 to sequence those Data Packets 2731 in chronological order (meaning order in which they were pushed to the Data Stream 406) within the UI Display Module 2730.

While viewing the Data Packets $2731_n$, a Customer 2701 or Person (User) 110 can interact with the rendering, altering its form, shape, and animated flow rate to draw attention to various elements of the Data Stream 406 or specific Data Packets 2731. Two depicted examples are the ability to change the speed at which the Data Packets 2731 move across the screen to represent data "flowing" through a Data Stream 406 and an ability to completely alter the shape and color of the rendering to emphasize different elements of the Data Stream 406 itself. In the first example, changing the speed of data flow, the Stream Rate Processor 2804 manages this capability, and handles what is displayed on the screen, how long it is displayed, and all memory management that ensures the client device can handle the volume of data being displayed. FIG. 28A depicts an example of such a request to alter the speed of Data Packet 2731 moving across the UI in steps 2810-2815.

In the second example, the ability to completely alter the shape and color of the rendering, the Data Visualization Filter Service 2802 uses predefined visualization preferences managed by the Visualization Module 242, to instruct the Data Render Service 2803 how to alter the shapes, colors, lines, and other visual elements of the data being visualized on the UI Display 2730. FIG. 28B depicts an example of choosing different visualizations in steps 2820-2823.

Figure 29:
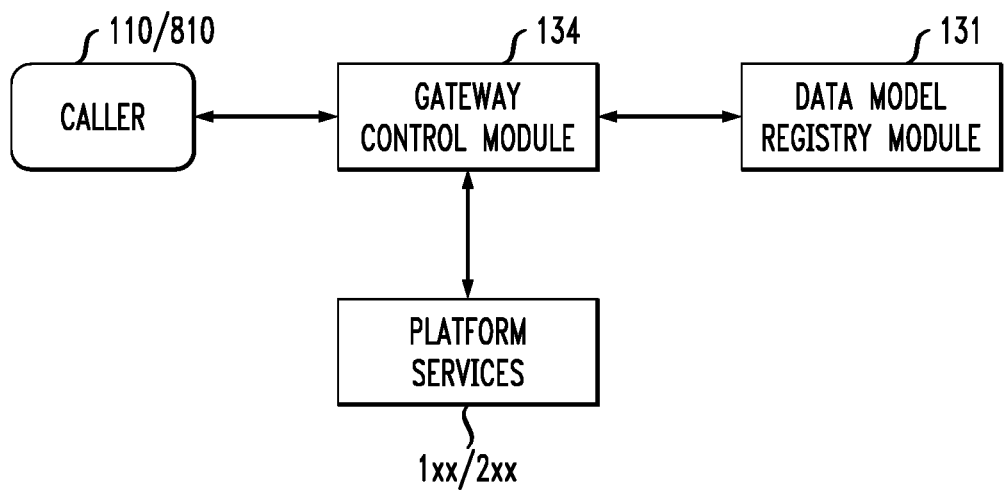
FIG. 29 is a block diagram that shows an example of how the Gateway Control Module works with the Data Model Registry Module to manage and protect incoming requests to the Platform of FIGS. 1-2.

FIG. 29 illustrates the use of a Gateway Control Module 134 to manage access to all Platform Services 1xx/2xx. The purpose of the Gateway Control Module 134 is to ensure that the volume, origin, and concurrency of requests to the Platform Services 1xx/2xx are all acceptable and within tolerances, where those tolerances are variable and may change over time. Additionally, the Gateway Control Module 134 uses the Data Model Registry Module 131 to ensure that the structure of requests to the Platform Services 1xx/2xx are compatible with expectations and correct, where those expectations are also variable and may change over time. This kind of interaction with the Data Model Registry Module 131 was also detailed in FIG. 20.

Figure 30:
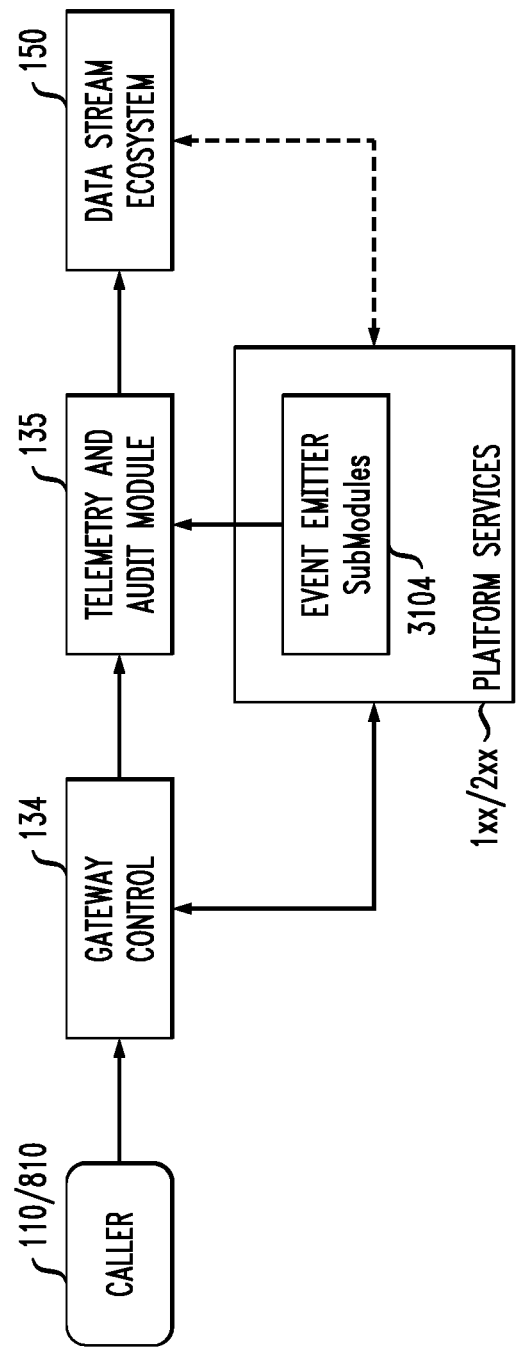
FIG. 30 is a block diagram that illustrates how all transaction requests moving through the Gateway Control Module of FIGS. 1-2 are captured and correlated by the Telemetry & Audit Module of FIGS. 1-2 and eventually made available as Data Streams in the Data Stream Ecosystem.

FIG. 30 illustrates how the Platform 130 and all services 1xx/2xx within provide a detailed audit log of all requests and data changes within each module, by providing audit data as Data Packets 2731 that populate one or more Data Streams 406 within the Data Stream Ecosystem 150. By providing audit data as Data Streams 406, the data is accessible by multiple modules and can easily be accessed or cross referenced for reporting.

Most modules within the Platform 130 will also have an Event Emitter Submodule 3104 which allows the module to asynchronously send any data designated as "auditable" to the Telemetry & Audit Module 135 or directly to a Data Stream 406 (not depicted) if appropriate. The Telemetry & Audit Module 135 manages this distribution of data to the Data Stream Ecosystem 150 while also providing the ability to query and cross-reference data from across all Platform 130 modules. Another source of auditable data is the Gateway Control Module 134 which automatically and asynchronously sends a record of all transactions (requests and responses) moving through it to the Telemetry & Audit Module 135 or distribution as a Data Stream 406.

An Implementor 501 of the Platform 130 will want to access auditable data for the same reasons they will want to access all other data within their environment through Data Streams 406: the ability to correlate information and generate insights that guide better business decisions, or to cause reactions in other systems to compensate for short-lived events represented by data change. As an example of the former, a real-time Data Stream $406_1$ (not depicted) that shows high volume of transactions could be correlated with error messages captured from several other Data Streams $406_{1+n}$ (not depicted) to precisely understand and compensate for performance issues across a distributed Network 3201 (FIG. 32) much faster than manually investigating each distributed system on its own. As an example of the latter, a Trigger 404 could be created to (i) monitor a Data Stream $406_{gw}$ (not depicted) that holds data in the form of Gateway Control Module 134 transactions, where transactions are requests and responses handled by the gateway, and (ii) automatically send a notification to all users if an unusually high volume of errors or any other Network 3201 instability is detected.

Figure 31:
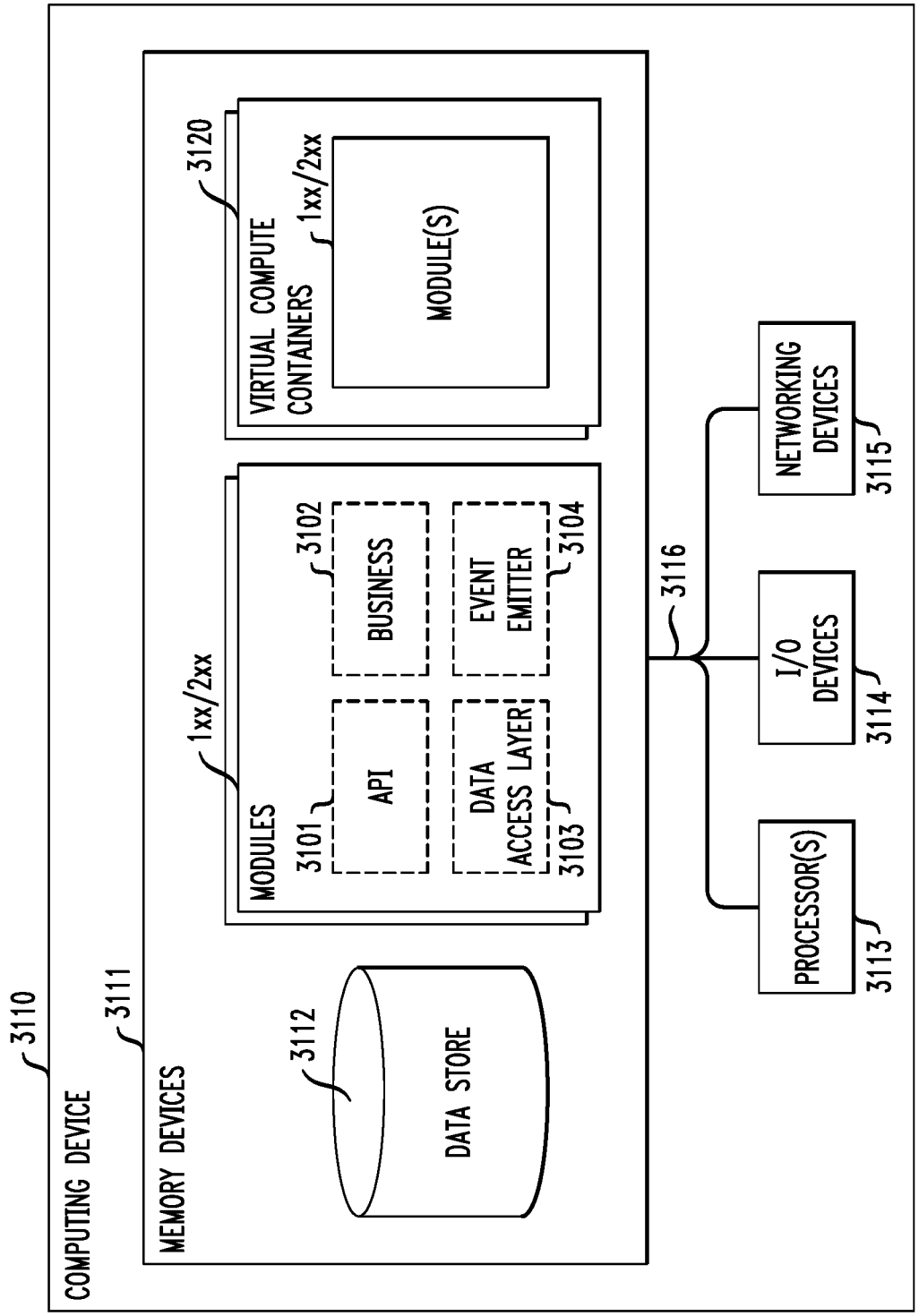
FIG. 31 is a schematic overview of a computing resource provider, virtual, emulated, or otherwise, in accordance with an example of present technology.

FIG. 31 illustrates a Computing Device 3110 on which services or modules of this technology may execute either directly or through a Virtual Compute Container 3120. A Computing Device 3110 is illustrated on which a high-level example of the technology may be executed. The Computing Device 3110 may include one or more Processors 3113 that are in communication with Memory Devices 3111. The Computing Device 3110 may include a Local Communication Interface (LCI) 3116 for the components in the Computing Device 3110. The LCI 3116 could be a local data bus and/or any related address or control busses as may be desired.

The Memory Device 3111 may contain modules of the Platform 130 that are executable by the processor(s) and data for the modules as stored in the Data Store 3112. The Data Store 3112 may be located in the Memory Device 3111 for storing data related to the modules and other applications along with an operating system that is executable by the Processor(s) 3113. The Memory Device 311 may also include Virtualized Compute Containers 3120 that virtualize or emulate other Computing Devices 3110 and allow modules to execute within those Virtual Compute Containers 3120.

Server(s) or Computing Device(s) 3110 in the Service Provider Environment 100 may be a Compute Instance 3202 (FIG. 32). The Virtual Computing Instance 3120 may also be implemented in a Service Provider Environment 100, which may include a virtual distributed computing system with a virtualization layer executing on a hardware substrate layer. The hardware layer may include a plurality of physical computers, servers, or processing nodes. The virtualization layer (e.g., hypervisor or docker) may provide a platform on which the virtual computing instances may be created. The virtual computing instances may execute on the hardware layer by using the platform provided by the virtualization layer.

Examples of modules of the technology corresponding to the Service Provider Environment 100 have been presented in various forms and itemized in FIGS. 1 and 2. Each module will have several submodules to allow basic operation, including but not limited to, an API 3101 to allow access, Business Logic 3102 to interpret data changes and requests, Data Access Layer 3103 able to connect to a Data Store 3112 within the host Computing Device 3110 or external to the host Computing Device 3110, and an Event Emitter 3104 as described in FIG. 29.

The Computing Device 3110 may further include or be in communication with a Client Device 3220 (FIG. 32), which may include a display device. The Client Device 3220 may be available for an administrator to use in interfacing with the Computing Device 3110, such as to review operation of a virtual computing instance, make improvements to data configurations, and so forth. Examples of Client Devices 3220 are provided in FIG. 32.

Various applications may be stored in the Memory Device 3111 and may be executable by the Processor(s) 3113. Components or modules discussed in this description may be implemented in the form of software using high programming-level languages that are compiled, interpreted, or executed using a hybrid of methods.

The Computing Device 3110 may also have access to I/O (input/output) Devices 3114 that are usable by the Computing Device 3110. An example of an I/O Device 3114 is a display screen that is available to display output from the Computing Device 3110. Other known I/O Devices 3110 may be used with the Computing Device 3110 as desired. Networking Devices 3115 may be wired or wireless networking devices that connect to the internet, a LAN, WAN, or other Network 3201 (FIG. 32).

The components or modules that are shown as being stored in the Memory Device 3111 may be executed by the Processor 3113. The term "executable" may mean a program file that is in a form that may be executed by a Processor 3113. For example, a program in a higher-level language may be compiled into machine code in a format that may be loaded into a random-access portion of the Memory Device 3111 and executed by the Processor 3113, or source code may be loaded by another executable program and interpreted to generate instructions in a random-access portion of the Memory Device 3111 to be executed by a Processor 3113. The executable program may be stored in any portion or component of the Memory Device 3111. For example, the non-transitory machine-readable Memory Device 3111 may be random access memory (RAM), read only memory (ROM), flash memory, a solid-state drive, memory card, a hard drive, optical disk, floppy disk, magnetic tape, or any other suitable memory components.

The Processor 3113 may represent multiple processors, and the Memory Device 3111 may represent multiple memory units that operate in parallel to the processing circuits. This may provide parallel processing channels for the processes and data in the system. The LCI 3116 may be used as a network to facilitate communication between any of the multiple processors and multiple memories. The local interface may use additional systems designed for coordinating communication such as load balancing, bulk data transfer, and similar systems.

Figure 33:
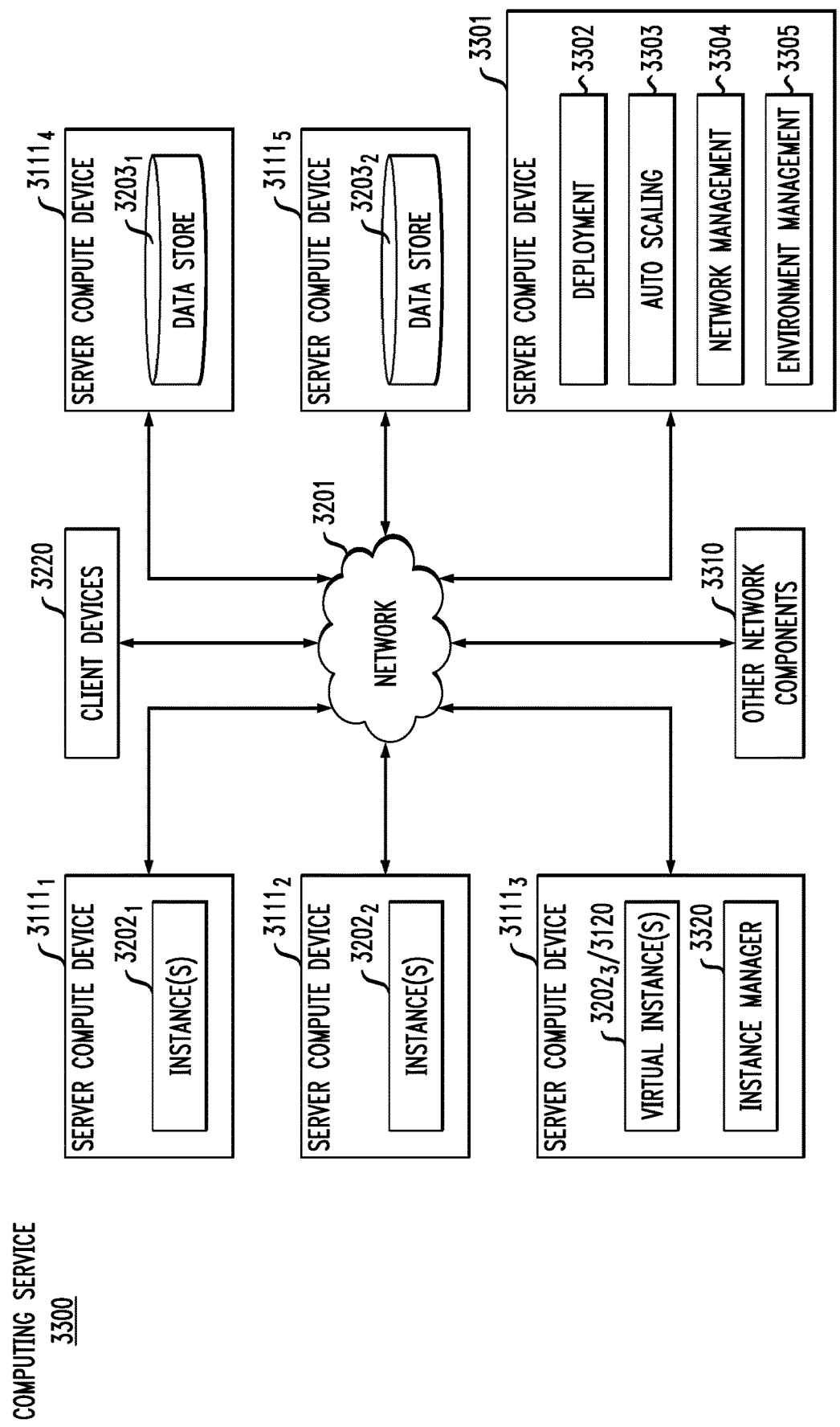
FIG. 33 is a block diagram of a computing system for providing the Enterprise Operating System for Development Platform in accordance with an example of present technology.

FIG. 32 illustrates a system for implementing the Platform 130 in a Service Provider Environment 100 in accordance with an example of the present technology. The Service Provider Environment 100 may be a multi-tenant service provider environment, such as, for example, a "cloud" environment (FIG. 33). FIG. 32 also further illustrates one possible architecture pattern where a module of the Platform 130 maintains data within the Module Data Store 3203 which is physically separate from the Compute Instances 3202.

The system may include one or more Data Stores 3203. The Data Stores 3203 may include or be configured to store any of a variety of useful types and formats of data. For example, the Data Store 3203 may include Data Stream Manipulator Images 162, Account 311 data, Organization 312 data, Data Stream 406 Data Packets 2731, Subscriber 402 data, Publisher 403 data, and so on.

The term "data store" used herein may refer to any device or combination of devices capable of storing, accessing, organizing, and/or retrieving data, which may include any combination and number of data servers, relational databases, object-oriented databases, blockchains, simple web storage systems, cloud storage systems, data storage devices, data warehouses, data lakes, flat files, and data storage configuration in any centralized, distributed, or clustered environment. The storage system components of the data store may include storage systems such as SAN (Storage Area Network) cloud storage network, volatile or non-volatile RAM, optical media, or hard-drive type media.

Services provided through the Service Provider Environment may represent one or more processes executing on a server or other computer hardware. Such services may be centrally hosted functionality or a service application that may receive requests and provide output to other services or devices. For example, services may be considered on-demand computing that is hosted in a server, virtualized environment, grid, or cluster computing system. A service may include one or more modules of the Platform 130.

Computing services offered by a Service Provider Environment 100 may include a Computing Device 3110 that executes as one or more servers or Compute Instances 3202. A user may create, launch, and terminate servers as desired. The creator of SaaS Provider Environment 120 may have some control over the geographical location of servers or clusters of servers to optimize latency and provide high levels of redundancy.

The user may access and manage the one or more servers over a Network 3201 connection, such as a connection through the Internet, for example. The user may perform various operations on the servers such as adding, updating, modifying, deleting, or otherwise maintaining software on the servers. These operations may be performed by the user from a Client Device 3220. Compute Instances 3202 may also be configured to access Third-Party Providers 1704 through the Network 3201. Examples of Third-Party Providers 1704 would be any functionality made available through an interface across a Network 3201 for a fee such as payment providers, image storage, or communication systems.

A Network 3201 may be utilized to interconnect the servers, Compute Instances 3202, Third-Party Providers 1704, and Client Devices 3220. The network 3201 may be a local area network (LAN) and may be connected to a Wide Area Network (WAN) so that end users may access the Platform 130. An example of a Network 3201 topology is illustrated in FIG. 33.

Client Devices 3220 can be any system, physical or virtual, that is designed to facilitate access to one or more components and/or modules of the Service Provider Environment 100 regardless of physical architecture regarding Computing Device 3110 or other hardware configurations. Three examples of Client Devices 3220 depicted are a Browser 3221, UI Modules 3222, and a Mobile Device 3223. The UI Application 2101 is a grouping of UI Modules 3222 which can operate on a Browser 3221 or Mobile Device 3223.

FIG. 33 illustrates how components of a data center may function as a Computing Service 3300 in a Service Provider Environment 100. A Computing Service 3300 (e.g., a cloud provider or service provider) may be capable of delivery of computing and storage capacity as a service to a community of end recipients. In an example implementation, the Computing Service may be established by the Implementor 501 of the SaaS Provider Environment 120, by or on behalf of that Implementor 501. That is, the Computing Service 3300 may offer a "private cloud environment". In another implementation, the Computing Service 3300 may support a multi-tenant environment, wherein a plurality of Implementors 501 instantiate the Platform 130 and Auth Groups 301 while operating independently (e.g., a public cloud environment). Generally speaking, the Computing Service 3300 can provide the following models: Infrastructure as a Service ("IaaS"), Platform as a Service ("PaaS"), Integrated Platform as a Service ("iPaaS"), and/or Software as a Service ("SaaS"). Other models may also be provided. In some implementations, end users access the Computing Service 3300 using networked Client Devices 3220, such as desktop computers, laptops, tablets, smartphones, etc., running web browsers or other lightweight client applications. Those skilled in the art will recognize that the Computing Service 3300 can be described as a "cloud" environment.

The illustrated Computing Service 3300 may include multiple Server Compute Devices $3111_1$-$3111_5$ While five separate server computers are shown, any number may be used, and a large center may include thousands of Server Compute Devices 3111. Server Compute Devices 3111 provide resources for executing software Compute Instances 3202, of which some may be Data Stores 3203. In one implementation, some of these Compute Instances 3202 may be Virtual Compute Containers or Machines 3120. A virtual Server Compute Device $3111_3$ may be configured to execute an Instance Manager 3320 capable of executing the instances. The Instance Manager 3320 may be a hypervisor, docker orchestrator, or another type of program configured to enable the execution of multiple instances on a single server. Additionally, each of the Instances 3120 of FIG. 31 may be configured to execute one or more modules or applications.

One or more Server Computers 3301 may be reserved for executing software components for managing the operation of the Server Computers 3111 and the Compute Instances 3202. For example, the Server Computer 3301 may execute an Environment Management 3305 component. A user may access the Environment Management 3305 component to configure various aspects of the operation of Compute Instances 3202. Similarly, the Network Management 3304 component can be used to configure various aspects of networking between the Server Compute Devices 3111. An Auto Scaling component 3303 may scale the Compute Instances 3202 based on rules defined by the user. In one implementation, the Auto Scaling components 3303 allow a user to specify scale-up policies for use in determining when new instances should be instantiated and scaled down policies for use in determining when instances should be terminated. The Auto Scaling component 3303 may include several subcomponents executing on different Server Compute Devices 3111 or other devices. The Auto Scaling component 3303 may monitor available computing resources over an internal management network and modify resources available based on predictions of need as well as based on actual needs. In another example, the Auto Scaling component 3303 may have access to a Data Stream 406 that provides the monitoring to perform its function.

A Deployment component 3302 may be used to assist users in the deployment of new Compute Instances 3202 of computing resources or modules. The Deployment component 3302 may receive configuration from a user that includes data describing how new Servers 3111 and Compute Instances 3202 should be configured.

As described previously, a Network 3201 may be utilized to interconnect the Servers 3111, Compute Instances 3202, Data Stores 3203, Client Devices 3220, Management Resources 3301, and any other distributed components 3310. It should be appreciated that the network topology illustrated in FIG. 33 has been simplified and that one or more networks and networking devices may be utilized to interconnect various computing systems disclosed herein.

Feature Summary

Implementations of the Service Provider Environment 100 of FIGS. 1-2 may provide to a user of the Service Provider Environment 100 one or more of the following:

1. Ability to manage identity (e.g., Accounts 311), Permissions 308, enterprise product access (e.g., Organizations 312, Domains 304, and Roles 307/309), Product Licensing 302, Data Models 2005, Data Streams 406, Data Stream Licensing 401 monetization, data stream visual analysis, and other related objects entities, tasks, and interactions utilized by software development companies, in a single fully integrated platform offering —FIGS. 1, 2
2. Ability to define multiple distinct and unique instances of the Platform 130 tied one-to-one to Auth Groups 301—FIGS. 3, 4, 6
3. Ability to define multiple groupings of Accounts (Users) 311 called Auth Groups 301 where each Account is unique within the grouping and each group of Accounts is distinct from one another—FIGS. 3, 4, 5, 5A
4. Ability to enable a Person, User, or other human agent 110 to self-register with the Platform 130 to obtain an Account 311—FIGS. 7, 7A, 7C
5. Ability to enable a Person 110 to manage the data and credentials associated with an Account 311 they control—FIG. 7A, 11
6. Ability to enable a Person, User, or other human agent 110 to control one or more Accounts 311 in the Platform 130—FIGS. 7, 7C
7. Ability to create an Account 311 on behalf of a Person 110—FIG. 7B
8. Ability to search for and identify an Account 311 within the Auth Group 301
9. Ability to define one Root Auth Group 301 tied to one distinct instance of the Platform 130 referred to as the SaaS Provider 120 which governs all other instances of Platforms 130 and Auth Groups 301—FIGS. 6, 6A, 19
10. Ability to define Products 303 within the context of a single Platform 130 instance and Auth Group 301—FIGS. 8, 9A, 9B
11. Ability to define Technical Components 306 that represent Machine 801 elements of one or more Products 303—FIGS. 3, 8, 8A, 8C
12. Ability to associate Roles 307 or 309 to a Technical Component 306, thereby assigning access privileges to a Machine 801 acting in an automated fashion—FIGS. 8, 8A, 8B, 8C
13. Ability to enable a Technical Component 306 to request authorization using a unique ID and password or secret—FIGS. 8, 8C
14. Ability to enable different Products 303 to access each other's Machine 801 elements through Technical Components 306 that can authenticate and receive authorized access in the form of a token, thereby achieving an integration of capabilities between distinct Products—FIGS. 8, 8C
15. Ability to create Organizations 312 of different kinds to represent business entities, departments, customers, or any other organized grouping—FIGS. 9, 9A, 9B
16. Ability to safely delete an Organization 312 (or any other object entity FIGS. 3 & 4) without orphaning Accounts 311—FIG. 9D
17. Ability to deactivate an Organization 312—FIG. 9E
18. Ability to tie an Account 311 to one or more Organizations 312, allowing the Account 311 to potentially inherit access to that Organization's Domains 304 and licensed Products 303—FIGS. 7, 7B, 7C, 7D
19. Ability to define specific email domains (e.g., example.com) that are allowed to be associated to a particular Organization 312 and denying access to Accounts 311 that do not have such an email address as their primary email—FIG. 7B
20. Ability to define terms of access for an Organization 312 that Accounts 311 must agree to prior to being associated to the resources of that Organization 312 (e.g. Domains 304, Products 303, etc.)—FIGS. 7B, 7C
21. Ability to create one or more Domains 304 within the context of an Organization 312—FIGS. 3, 7, 7C, 7D, 9A, 9C 22. Ability to associate and provide access of a Product 303 with a Product License 302 to an Organization 312 to enable access to associated Accounts 311 at the discretion of the Organization 312 administrator—FIGS. 3, 7C, 7D
23. Ability to license a Product 303 to more than one Organization 312—FIGS. 7C, 9B
24. Ability to charge a fee for a Product License 302 and then upon confirmation of the transaction, provide access of a Product 303 to an Organization 312—FIGS. 10, 10A
25. Ability to manage product licensing automatically as a self-service feature, internally to the Platform 130 without any external license or customer management interactions—FIGS. 10, 10A
26. Ability to manage product licensing manually by inputting the licenses directly to represent transactions that occur outside of the Platform 130 in a different license or customer management system—FIGS. 10, 10B
27. Ability to manage product licensing automatically by configuring an external license or customer management system to synchronize transactions with the Platform 130—FIGS. 10, 10C
28. Ability to disassociate a Product 303 from an Organization 312, effectively terminating a Product License 302—FIGS. 10, 10D
29. Ability to create Custom Roles 309 for a Product 303 within the context of an Organization 312 that has licensed the Product, which is only accessible by Accounts 311 associated to that Organization—FIGS. 3, 7C, 15, 15A
30. Ability to Create Global Roles 307 for a Product 303 accessible to Accounts 311 across all Organizations 312 that have licensed the Product—FIGS. 3, 7C, 7D, 15
31. Ability to associate licensed Products 303 of an Organization 312 to one or more Domains 304 within the parent Organization 312—FIGS. 3, 7C, 7D
32. Ability to associate an Account 311 to one or more Domains 304, Global Roles 307, or Custom Roles 309 within the context of an Organization 312, thereby providing access to the licensed Products 303 that were associated to those corresponding Domains 304 with specific access privileges corresponding to the Roles 307/309—FIGS. 7C, 7D
33. Ability to configure the Platform 130 to represent its own features represented in this list and beyond recursively as Products 303, Organizations 312, Domains 304, Roles 307/309, and Permissions 308 in order to govern access to those features to Accounts 311 and Technical Components 306—FIG. 9
34. Ability to define an Organization Administrator Role 307 and Product 303 representing the Platform 130 itself for individual Organizations 312 and assign that Role and Product 303, via appropriate child Domain 304, to one or more Accounts 311 that are either identified or created within the Auth Group 301 of the Platform 130—FIG. 9B
35. Ability to define a fully Platform integrated, highly encrypted Secured Profile 310, persisted in either the Service Provider Environment 100 or a personal device such as a cell phone, that stores personal information of a Person 110, is associated to exactly one Account 311, and is not accessible to any agent of the system (Person or Machine) without an explicit and auditable permission grant of the Account 311 holder, a.k.a. Person 110—FIGS. 11, 11A
36. Ability to deny access to a Secured Profile 310 of an Account 311—FIGS. 11, 11A, 11B
37. Ability to create an Organization Account Profile 305 to represent information about an Account 311 within the context of an Organization 312, regardless of what information the Account holder, a Person 110, has shared—FIG. 12
38. Ability to request that a Person 110 with Account 311 and Secured Profile 310 allow the data of that Secured Profile to be used to populate an Organization Account Profile 305—FIGS. 12, 12A
39. Ability to be notified whenever an Organization Account Profile 305 is created, updated, or deleted which references your Account 311—FIGS. 12, 12A, 12B
40. Ability to see a list of all Organizations 312 that have an Organization Account Profile 305 referencing your Account 311—FIGS. 12, 12A, 12B
41. Ability to request an Organization 312 delete an Organization Account Profile 305 referencing your Account 311—FIGS. 12, 12B
42. Ability to request an authorized Token 1307 from the Platform 130 via UE Auth 140, regardless of the authentication and authorization protocol used, which includes information about the validity of the Token 1307, Account 311 or Technical Component 306, Auth Group 301, Organizations 312, Domains 304, Products 303, Roles 307/309, and Permissions 308 attributed to the Account or Technical Component, encoded for both machine automation and human readability—FIGS. 13A, 16, 16A, 16B
43. Ability to configure the Platform 130 to authenticate Accounts 311 or Technical Components 306 using multiple different authorization protocols and specifications such as OpenID Connect, SAML, and so on, either one at a time or concurrently—FIGS. 13, 13A
44. Ability to define one or more Permissions 308 allowing any kind of Action 1402 desired against any Target 1401 within any part of a system, Product 303, or other software solution represented by the Platform 130—FIGS. 14, 14A, 14B
45. Ability to organize Permissions 308 into Global Roles 307 or Custom Roles 309—FIGS. 15, 15A
46. Ability to define Roles 307/309 without Permissions 308—FIG. 15
47. Ability to define various Conditions 1403 where an Action 1402 of a Permission 308 is allowed against a Target 1401 only when the condition is true—FIGS. 14, 14A, 14B
48. Ability to use the encoding of the constituent parts (Target 1401, Action 1402, and Conditional 1403) of a Permission 308 to automate access to system resources within the Platform 130 when provided with a Token 1307 that contains the encoded Permissions 308—FIGS. 16A, 16B
49. Ability to add new functionality (e.g., features not summarized or conceived of at this time) potentially managed external to the Service Provider Environment 100, or within, to the Platform 130 by integrating them into the Plugin Module 211 through an interface module 1701 and proxy service 1702—FIG. 17
50. Ability to send notifications such as emails, text messages, or other communications standards to individual Persons 110 by utilizing their Account 311 to identify them—FIG. 18
51. Ability to manage internal feature and capabilities of the Service Provider Environment 100 within the SaaS Provider 120 described as Products 303 and install them to instances of the Platform 130 upon request or through a financial transaction—FIGS. 19, 19A
52. Ability to document, categorize, and visualize all data models of an Implementor 501 ecosystem instantiating the Platform 130 and their relationships to each other in a single searchable registry with the Data Model Registry 131—FIG. 20
53. Ability to visualize relationships and metadata of data models of an Implementor 501 ecosystem instantiating the Platform 130 as charts, lists, vector graphics, and other graphical solutions with the Data Model Registry 131—FIG. 20
54. Ability to validate API requests and responses of any protocol type (e.g., REST, GraphQL, etc.) on behalf of machine services and/or modules within an Implementor 501 ecosystem instantiating the Platform 130 using stored data models of the Data Model Registry 131—FIGS. 20, 29
55. Ability to validate shape and structure of Data Packets 2731 entering a Data Stream 406 using the Data Model Registry 131—FIGS. 20, 21, 22
56. Ability to create, update, manage, edit, search, filter, and otherwise interact with various kinds of Data Streams 406 through an interface that treats the underlying Streaming or Queuing Technology 2103 as agnostic—FIGS. 21, 27, 27A, 28
57. Ability to issue secure access to publish (e.g., transmit data) to a Data Stream 406 as a Publisher 403 using a native interface of the underlying Streaming and Queuing Technology 2103—FIGS. 22, 22A
58. Ability to configure machine, service, application, or other system to securely receive the data to which a Subscriber 402 is configured to receive, without human intervention, using a native interface of the underlying Streaming and Queuing Technology 2103—FIGS. 23, 23A
59. Ability to define a Trigger 404 which executes a predefined sequence of programmed Actions 2603 against a Data Stream 406 or other integrated or companion service when the conditions of a defined Filter 2601 are met—FIG. 26
60. Ability to define a Trigger 404 which executes a predefined sequence of programmed Actions 2603 against a Data Stream 406 or other integrated or companion service on a chronological cadence or specific point in time through a Timer 2602—FIG. 26
61. Ability to manually define a Trigger 404 that executes a Manipulator Instance 2402 using the conditions of a Filter 2601 or Timer 2602—FIG. 26
62. Ability to publish (e.g., transmit data) to a Data Stream 406 as a Publisher 403 using a REST interface to the Platform 130 which utilizes the interface to the agnostic Streaming or Queuing Technology 2013—FIG. 22
63. Ability to configure a machine, service, application, or other system to receive the data to which a Subscriber 402 is configured to receive, without human intervention, a provided REST callback URI which the Platform 130 will send Data Packets 2731 as they become available—FIGS. 23, 23A
64. Ability to select a Data Stream 406 from a visualized Storefront view 2710 or directly by ID through a programmatic interface and choose to become a Subscriber 402 that will receive all Data Packets 2731 within the stream as they become available—FIGS. 23, 27, 27A
65. Ability to create through code Data Stream Manipulators 162 which will take as input the data of one or more Data Streams 406, apply a manipulation that changes, filters, merges, or otherwise transmutes the data, and outputs the resulting data to a visual display or new Data Stream 406—FIGS. 24, 25
66. Ability to upload Data Stream Manipulators 162 to the Data Stream Manipulator Registry 160 where they can be searched and selected to be used by other Persons 110 across any Platform 130 instance—FIGS. 24, 25
67. Ability to review submitted Data Stream Manipulators 162 to ensure quality before allowing them to be listed in the Data Stream Manipulator Registry 160—FIG. 25
68. Ability to charge a license fee for use of a Data Stream Manipulator 162—FIGS. 24, 24A
69. Ability to search the Data Stream Manipulator Registry 160 from within the Data Stream Ecosystem 150 and choose a Manipulator 162 to instantiate against a selected Data Stream 406, configuring its output to either display on a Client Device 3220 visualization or publish to a new Data Stream 406—FIGS. 24, 24A, 25, 26
70. Ability to access the Data Stream Ecosystem 150 as both a general User, which is a Person 110 who has access to manage and interact and potentially administrate through an appropriately permissioned Account 311, or a Customer 2701, which is a Person 110 who has access to browse, access, or purchase Data Stream 406 subscriptions—FIGS. 27, 27A
71. Ability to view a visualization of relationships between Data Streams 406, Triggers 404, Publishers 403, and Subscribers 402 on a vector, list, or other static or animated user experience display 2720 within the UI Application 2101—FIG. 27
72. Ability to view all metadata, Triggers 404, and Manipulators 162 associated to an individual Data Stream 406, along with the real-time streaming Data Packets 2731 of that Data Stream 406 on a UI Display 2730 within the UI Application 2101—FIGS. 27, 27A, 28
73. Ability to inspect individual Data Packet 2731 payloads of a Data Stream 406 on the UI Application 2101—FIGS. 28, 28A
74. Ability to visualize data flowing through a Data Stream 406 and control the rate at which data is depicted as flowing, effectively moving through chronological order of Data Packets 2731 at variable speed—FIGS. 28, 28A, 28B
75. Ability to select the style and form (e.g. shapes, colors, animation, etc.) of a Data Stream 406 visualization on the UI Application 2101 through a Visual Filter 405 by selecting one of several provided by the Platform 130—FIGS. 28, 28B
76. Ability to define new style and form (e.g., shapes, colors, animations, etc.) of a Data Stream 406 visualization by defining new Visual Filters 405—FIG. 28
77. Ability to operate the Service Provider Environment 100 as a single application, a distributed application, or hybrid; across a single Computing Service 3300 ("cloud"), multiple Computing Services 3300, private Computing Service 3300, or hybrid; utilizing physical, virtual, or hybrid Compute Devices 3110—FIGS. 31, 32, 33
78. Ability to manage external http-based API access, volume of requests, number of concurrent requests allowed, and other metrics of network-based interaction to the Service Provider Environment 100 and Platform 130 through a Gateway Control Module 134—FIG. 29

79. Ability to aggregate, correlate, and audit all requests and responses to the Platform 130—FIG. 30
80. Ability to aggregate, correlate, and audit all log data or any other important data state changes or transactions of note within the Platform 130—FIG. 30
81. Ability to scale operations of the Computing Service 3300 up or down to meet demands of business, customers, performance, or any other factor—FIG. 33
82. Ability to manage and deploy components of the Computing Service 3300 as necessary while coordinating and integrating across a Network 3201—FIG. 33
83. Ability to integrate with any external system/component 3310 or third-party service provider 1704 using an established interface across a Network 3201—FIGS. 32, 33

A Platform is a large system that connects and makes available some or all of the features described in the Feature Summary section. The following summarizes some of the elements of some implementations of the system:

A. The mechanisms and modules described throughout this disclosure by which UE Auth 140 organizes an Implementor 501 ecosystem of Organizations 312 (e.g., customers, departments, vendors, etc.), Domains 304 within those Organizations 312, Products 303, Permissions 308, Global Roles 307, Custom Roles 309 attributed to Organizations 312, Accounts 311, Technical Components 306, Product Licensing 302, Secured Profiles 310, and Organization Profiles 305, all within the context of an Auth Group 301; and then, orchestrates these relationships as assignments of privileged access for Accounts 311 or Technical Components 306, where those assignments can be communicated through direct query or as part of an integration into an establish authorization system token 1307.

B. The mechanism by which the Platform 130 recursively allows its own features, such as, but not limited to, the Data Stream Ecosystem 150, to be represented as Products 303 managed by UE Auth 140 with access and privileges defined through the object entities of UE Auth (FIGS. 3, 4) including Accounts 311.

C. The definition and implementation of a Permission 308 as including a Target 1401, Action 1402, and Conditional 1403, where these constituent parts allow for ease of automation and access restriction implementation in all integrated systems and Products 303.

D. The mechanism by which an Organization 312 maintains information about a Person 110, with or without consent, but safely and without violating privacy, through the use of an Organization Account Profile 305, optionally and with the person's permission synced to a Secure Profile 310.

E. The mechanism by which the Data Stream Ecosystem 150 allows Data Streams 406 to be represented as a Storefront 2710 to be browsed and filtered, relationships displayed (FIG. 27, inset 2720), and individual Data Streams 406 selected for interaction through Accounts 311 managed by UE Auth 140.

F. The mechanism by which the Data Stream Ecosystem 150 allows Data Streams 406 to be licensed for access through a Data Stream License 401 and for that licensing to be communicated as part of an integrated authorization system such as UE Auth 140.

G. The mechanisms by which a Data Stream 406 and the Data Packets 2731 within can be inspected, interacted with, and displayed in various forms on the UI Application 2101 UI Display 2730, including all metadata and interacting secondary systems such as Manipulators 162.

H. The Data Stream Manipulator Registry Environment 160, Data Stream Manipulators 162, and the ability for Persons 110 to create, upload, and potentially sell coded functions as Data Stream Manipulators 162 to users (Accounts 311) of any instance of the Platform 130 and Data Stream Ecosystem 150.

I. The mechanism by which the Data Stream Ecosystem 150 allows a Person 110 with an Account 311 to search the Data Stream Manipulator Registry Environment 160 for a Manipulator 162 to then instantiate as a Manipulator Instance 2402 targeting one or more Data Streams 406 with results sent to the UI Application 2101 visualizations or a new Data Streams 406.

J. The entirety of the Service Provider Environment 100 as a complete integrated solution that can be delivered to an Implementor 501, all together, as a single fully integrated platform offering, with all features included, operated from any number or combination of Computing Services 3300.

In certain embodiments, the present disclosure is an integrated system that enables an implementor to integrate functionality into the implementor's (e.g., 501) one or more software systems to enable user identity and access management across the implementor's customers and/or products. The system comprises a management platform (e.g., 140), a multi-factor authentication (MFA) module (e.g., 132), and a product license purchase module (e.g., 133). The management platform is configured to (i) enable a unique pool of accounts (e.g., 311) and/or technical components (e.g., 306) which represent users (e.g., 110) and/or machines (e.g., 801) to be authenticated against various systems and/or products (e.g., 303, FIGS. 7, 8), (ii) enable authenticated accounts and/or technical components to be authorized to perform particular functions within various systems and/or products (e.g., FIGS. 7, 8), (iii) enable a representation of external software systems as products to be mapped to identities, accesses, organizations (e.g., 312), and permissions (e.g., 308, FIG. 7C), and (iv) enable a representation of groups of accounts organized by a common aspect where the groups are able to request access to products licensed by the groups (e.g., FIGS. 7C, 8A, 9A). The MFA module is configured to enable various third-party MFA technologies to lend MFA functionality to the management platform and subsequently to the users (e.g., FIG. 13). The product license purchase module (e.g., 133) configured to enable an entity external to the implementor and represented by an organization to request and gain access to a product in a formalized manner (e.g., 302, FIG. 10).

In at least some of the above embodiments, the management platform is configured to (i) enable further division of accounts within an organization and (ii) map to a product that has been licensed to an organization enabling accounts within a domain (e.g., 304) to inherit access to the product (e.g., FIG. 7C).

In at least some of the above embodiments, the management platform is configured to (i) enable representation of personal information of a user that is inaccessible to any other user and/or system without express permission of the user (e.g., 310, FIG. 11) and (ii) enable representation of identifying data that an organization uses to manage users without sacrificing security of a user's personal information unless allowed by the user (e.g., 305, FIG. 12).

In at least some of the above embodiments, the management platform is configured to (i) enable representation of an action (e.g., 1402) that can be taken against a target (e.g., 1401) of a product as a permission, (ii) limit the scope of the permission through a conditional (e.g., 1403) that is applied to the action and target combination, (iii) map the representation to an account and/or technical component to guide authorization (e.g., FIG. 14), (iv) enable creation of groupings of permissions that can be applied together to an account as roles (e.g., 307, FIG. 15), and (v) enable associated data to be communicated to any external system for automated or manual enforcement of authentication and authorization configuration in the external system (e.g., FIGS. 13A, 16).

In at least some of the above embodiments, the system further comprises a data model registry module (e.g., 131, FIG. 20) configured to enable the implementor to maintain an inventory of possible data types within the implementor's environment along with associated metadata for robust searching, filtering, and visualization of relationships between data types.

In at least some of the above embodiments, the system further comprises a gateway control system (e.g., 134) configured to enable validation that all incoming requests map to a specific data type as stored in the data model registry module before allowing the request to proceed to any intended target (e.g., FIG. 29).

In at least some of the above embodiments, the system further comprises a data stream ecosystem (e.g., 150, FIG. 21) configured to enable the implementor to define data streams (e.g., 406) and connect systems to the data streams to move data packets between the systems (e.g., FIG. 22).

In at least some of the above embodiments, a gateway control system (e.g., 134), the management platform, and the data stream ecosystem are enabled to work in concert to (i) map all authorized requests to the management platform and/or any integrated product, back to the user making the request, and (ii) send audit data through a data stream for consumption by other systems, users, and/or machines (e.g., FIG. 30).

In at least some of the above embodiments, the system further comprises the data model registry module (e.g., 131, FIG. 20) configured to enable the implementor to maintain an inventory of possible data types within the implementor's environment along with associated metadata for robust searching, filtering, and visualization of relationships between data types, wherein a machine connected to the data stream ecosystem is empowered to validate that a data packet maps to a specific data type as stored in the data model registry module before allowing the data to enter a data stream (e.g., 2002, FIG. 20).

In at least some of the above embodiments, the data stream ecosystem is configured to enable the implementor to track metadata about data streams, to inspect data streams, to manipulate data streams, to visualize data within a data stream (e.g., FIG. 28), to visualize the inventory of streams (e.g., FIG. 27), and to visualize relationships between data streams (e.g., FIG. 27).

In at least some of the above embodiments, the system further comprises a data stream manipulator registry environment (e.g., 160, FIG. 24) configured to enable persons not directly affiliated with the implementor to create, upload, and/or make available business agnostic functions represented as blocks of code (e.g., 162), wherein the implementor is enabled to then browse, select, license (e.g., 163), and/or attribute to data streams or other elements of the management platform (e.g., FIG. 25) to automate desired data and/or state changes, both one time and/or in an on-going manner (e.g., FIG. 26).

In at least some of the above embodiments, the system further comprises a data stream license purchase module (e.g., 137, FIG. 23) configured to enable the implementor to request and gain access to one or more data streams in a formalized manner (e.g., 401).

In at least some of the above embodiments, access to a data stream through the data stream license purchase module can be monetized through a payment system (e.g., 2703, FIG. 27).

In at least some of the above embodiments, the common aspect corresponds to accounts belonging to a common entity external to the implementor's entity.

In at least some of the above embodiments, the common aspect corresponds to accounts belonging to a common group within the implementor's entity.

In at least some of the above embodiments, access to a product through the product license purchase module can be monetized through a payment system (e.g., 1020, FIG. 10).

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. An integrated computer system that enables an implementor to integrate functionality into external systems and/or external products of the implementor to enable user identity and access management across the external systems and/or external products of the implementor, the integrated computer system comprising one or more processors and one or more computer-readable memory devices storing a management platform software module, a multi-factor authentication (MFA) software module, a product license purchase software module, a data model registry software module, a gateway control system software module, a data stream ecosystem software module, a data stream manipulator registry environment software module, and a data stream license purchase software module, wherein the one or more processors are configured to execute:
   the management platform software module to:
      enable a unique pool of accounts and/or technical components which correspond to users and/or computing devices to be authenticated against the external systems and/or the external products;
      enable the authenticated accounts and/or the authenticated technical components to be authorized to perform particular functions within the external systems and/or the external products;
      enable a representation of the external systems and/or the external products to be mapped to identities, accesses, organizations, and permissions; and
      enable a representation of groups of the accounts organized by a common aspect, where the groups are able to request access to the external systems and/or the external products licensed by the groups;
   the MFA software module to enable various third-party MFA technologies to implement MFA functionality on the management platform software module, thereby enabling the accounts to use the MFA functionality;
   the product license purchase software module to enable an entity external to the implementor and represented by one of the organizations to request and gain access to at least one of the external systems and/or at least one of the external products in a formalized manner;
   the management platform software module to (i) enable further division of the accounts within the one organization into domains and (ii) map to the at least one external system and/or the at least one external product that has been licensed to the one organization enabling the accounts within the domains to inherit access to the at least one external system and/or the at least one external product;
   the management platform software module to:
      enable representation of personal information of one of the users that is inaccessible to any of the other users and/or any of the computing devices not associated with the one user without express permission of the one user;
      enable representation of identifying data that the one organization uses to manage users of the one organization without sacrificing security of the personal information of the one user unless allowed by the one user;
enable representation of an action that can be taken against a target of any of the one or more external systems and/or any of the one or more external products as a permission, and map the representation of the action to one of the accounts and/or one of the technical components to guide authorization;
enable creation of groupings of permissions that can be applied together to the one account and/or the one technical component as roles; and
enable associated data to be communicated to any of the external systems and/or any of the external products for automated or manual enforcement of authentication and authorization configuration in the external systems and/or the external products;
the data model registry software module to enable the implementor to maintain an inventory of possible data types originating from the external systems and/or external products of the implementor along with associated metadata for robust searching, filtering, and visualization of relationships between the data types;
the gateway control system software module to enable validation that an incoming request from one of the users, the external systems, and/or the external products maps to a specific one of the data types as stored in the one or more data model registry processors before allowing the incoming request to proceed to any intended destination;
the data stream ecosystem software module to:
enable the implementor to define data streams and connect the external systems and/or the external products to the data streams to move data packets between the external systems and/or the external products; and
enable the implementor to track metadata about the data streams, to inspect the data streams, to manipulate the data streams, to visualize the data packets within the data streams, to visualize inventory of the data streams, and to visualize relationships between the data streams;
the gateway control system software module, the management platform software module, and the data stream ecosystem software module to work in concert to (i) map the incoming request to the one or more management platform processors and/or any of the external systems and/or any of the external products, back to the user making the incoming request, and (ii) send audit data through one of the data streams for consumption by any of the one or more external systems and/or any of the one or more external products, wherein one of the computing devices connected to the one or more processors is empowered to validate that one of the data packets maps to a specific one of the data types as stored in a computer-readable memory device of the one or more computer-readable memory devices associated with the data model registry software module before allowing the one data packet to enter one of the data streams;
the data stream manipulator registry environment software module to enable persons not directly affiliated with the implementor to create, upload, and/or make available business agnostic functions represented as blocks of code, wherein the implementor is enabled to then browse, select, license, and/or attribute to one or more of the data streams or other elements of the management platform software module to automate desired data changes and/or desired state changes, both one time and/or in an on-going manner; and
the data stream license purchase software module to enable the implementor to request and gain access to at least one of the data streams in a formalized manner, wherein:
the access to the data stream through the data stream license purchase software module can be monetized through a payment system;
the common aspect corresponds to one of the accounts belonging to (i) a common entity external to an entity associated with the implementor and/or (ii) a common group within the entity associated with the implementor; and
access to at least one of the external systems and/or at least one of the external products through the product license purchase software module can be monetized through the payment system.

2. A computer-implemented method for an integrated computer system to enable an implementor to integrate functionality into external systems and/or external products of the implementor to enable user identity and access management across the external systems and/or external products of the implementor, the integrated computer system comprising one or more processors and one or more computer-readable memory devices storing a management platform software module, a multi-factor authentication (MFA) software module, a product license purchase software module, a data model registry software module, a gateway control system software module, a data stream ecosystem software module, a data stream manipulator registry environment software module, and a data stream license purchase software module, the method comprising the one or more processors executing:
the management platform software module to:
enable a unique pool of accounts and/or technical components which correspond to users and/or computing devices to be authenticated against the external systems and/or the external products;
enable the authenticated accounts and/or the authenticated technical components to be authorized to perform particular functions within the external systems and/or the external products;
enable a representation of the external systems and/or the external products to be mapped to identities, accesses, organizations, and permissions; and
enable a representation of groups of the accounts organized by a common aspect, where the groups are able to request access to the external systems and/or the external products licensed by the groups;
the MFA software module to enable various third-party MFA technologies to implement MFA functionality on the management platform software module, thereby enabling the accounts to use the MFA functionality;
the product license purchase software module to enable an entity external to the implementor and represented by one of the organizations to request and gain access to at least one of the external systems and/or at least one of the external products in a formalized manner;
the management platform software module to:
enable further division of the accounts within the one organization into domains;
map to the at least one external system and/or the at least one external product that has been licensed to the one organization enabling the accounts within the domains to inherit access to the at least one external system and/or the at least one external product;

enable representation of personal information of one of the users that is inaccessible to any of the other users and/or any of the computing devices not associated with the one user without express permission of the one user;

enable representation of identifying data that the one organization uses to manage users of the one organization without sacrificing security of the personal information of the one user unless allowed by the one user;

enable representation of an action that can be taken against a target of any of the one or more external systems and/or any of the one or more external products as a permission, and map the representation of the action to one of the accounts and/or one of the technical components to guide authorization;

enable creation of groupings of permissions that can be applied together to the one account and/or the one technical component as roles; and enable associated data to be communicated to any of the external systems and/or any of the external products for automated or manual enforcement of authentication and authorization configuration in the external systems and/or the external products;

the data model registry software module to enable the implementor to maintain an inventory of possible data types originating from the external systems and/or external products of the implementor along with associated metadata for robust searching, filtering, and visualization of relationships between the data types;

the gateway control system software module to enable validation that an incoming request from one of the users, the external systems, and/or the external products maps to a specific one of the data types as stored in the one or more data model registry processors before allowing the incoming request to proceed to any intended destination;

the data stream ecosystem software module to enable the implementor to define data streams and connect the external systems and/or the external products to the data streams to move data packets between the external systems and/or the external products;

the data stream ecosystem software module to enable the implementor to track metadata about the data streams, to inspect the data streams, to manipulate the data streams, to visualize the data packets within the data streams, to visualize inventory of the data streams, and to visualize relationships between the data streams;

the gateway control system software module, the management platform software module, and the data stream ecosystem software module to work in concert to (i) map the incoming request to the one or more management platform processors and/or any of the external systems and/or any of the external products, back to the user making the incoming request, and (ii) send audit data through one of the data streams for consumption by any of the one or more external systems and/or any of the one or more external products, wherein one of the computing devices connected to the one or more data-processors is empowered to validate that one of the data packets maps to a specific one of the data types as stored in a computer-readable memory device of the one or more computer-readable memory devices associated with the data model registry software module before allowing the one data packet to enter one of the data streams;

the data stream manipulator registry environment software module to enable persons not directly affiliated with the implementor to create, upload, and/or make available business agnostic functions represented as blocks of code, wherein the implementor is enabled to then browse, select, license, and/or attribute to one or more of the data streams or other elements of the one or more management platform processors to automate desired data changes and/or desired state changes, both one time and/or in an on-going manner; and the data stream license purchase software module to enable the implementor to request and gain access to at least one of the data streams in a formalized manner, wherein:

the access to the data stream through the data stream license purchase software module can be monetized through a payment system;

the common aspect corresponds to one of the accounts belonging to (i) a common entity external to an entity associated with the implementor and/or (ii) a common group within the entity associated with the implementor; and access to at least one of the external systems and/or at least one of the external products through the product license purchase software module is monetized through the payment system.

3. A non-transitory computer-readable storage medium, having encoded thereon program code comprising a management platform software module, a multi-factor authentication (MFA) software module, a product license purchase software module, a data model registry software module, a gateway control system software module, a data stream ecosystem software module, a data stream manipulator registry environment software module, and a data stream license purchase software module, wherein, when the program code is executed by one or more processors of an integrated computer system, the integrated computer system implements a method for the integrated computer system to enable an implementor to integrate functionality into external systems and/or external products of the implementor to enable user identity and access management across the external systems and/or external products of the implementor, the method comprising the one or more processors executing:

the management platform software module to:
enable a unique pool of accounts and/or technical components which correspond to users and/or computing devices to be authenticated against the external systems and/or the external products;

enable the authenticated accounts and/or the authenticated technical components to be authorized to perform particular functions within the external systems and/or the external products;

enable a representation of the external systems and/or the external products to be mapped to identities, accesses, organizations, and permissions; and enable a representation of groups of the accounts organized by a common aspect, where the groups are able to request access to the external systems and/or the external products licensed by the groups;

the MFA software module to enable various third-party MFA technologies to implement MFA functionality on the management platform software module, thereby enabling the accounts to use the MFA functionality;

the product license purchase software module to enable an entity external to the implementor and represented by one of the organizations to request and gain access to at least one of the external systems and/or at least one of the external products in a formalized manner;

the management platform software module to:
  enable further division of the accounts within the one organization into domains;
  map to the at least one external system and/or the at least one external product that has been licensed to the one organization enabling the accounts within the domains to inherit access to the at least one external system and/or the at least one external product;
  enable representation of personal information of one of the users that is inaccessible to any of the other users and/or any of the computing devices not associated with the one user without express permission of the one user;
  enable representation of identifying data that the one organization uses to manage users of the one organization without sacrificing security of the personal information of the one user unless allowed by the one user;
  enable representation of an action that can be taken against a target of any of the one or more external systems and/or any of the one or more external products as a permission, and map the representation of the action to one of the accounts and/or one of the technical components to guide authorization;
  enable creation of groupings of permissions that can be applied together to the one account and/or the one technical component as roles; and
  enable associated data to be communicated to any of the external systems and/or any of the external products for automated or manual enforcement of authentication and authorization configuration in the external systems and/or the external products;

the data model registry software module to enable the implementor to maintain an inventory of possible data types originating from the external systems and/or external products of the implementor along with associated metadata for robust searching, filtering, and visualization of relationships between the data types;

the gateway control system software module to enable validation that an incoming request from one of the users, the external systems, and/or the external products maps to a specific one of the data types as stored in the one or more data model registry processors before allowing the incoming request to proceed to any intended destination;

the data stream ecosystem software module to enable the implementor to define data streams and connect the external systems and/or the external products to the data streams to move data packets between the external systems and/or the external products;

the data stream ecosystem software module to enable the implementor to track metadata about the data streams, to inspect the data streams, to manipulate the data streams, to visualize the data packets within the data streams, to visualize inventory of the data streams, and to visualize relationships between the data streams;

the gateway control system software module, the management platform software module, and the data stream ecosystem software module to work in concert to (i) map the incoming request to the one or more management platform processors and/or any of the external systems and/or any of the external products, back to the user making the incoming request, and (ii) send audit data through one of the data streams for consumption by any of the one or more external systems and/or any of the one or more external products, wherein one of the computing devices connected to the one or more data processors is empowered to validate that one of the data packets maps to a specific one of the data types as stored in a computer-readable memory device of the one or more computer-readable memory devices associated with the data model registry software module before allowing the one data packet to enter one of the data streams;

the data stream manipulator registry environment software module to enable persons not directly affiliated with the implementor to create, upload, and/or make available business agnostic functions represented as blocks of code, wherein the implementor is enabled to then browse, select, license, and/or attribute to one or more of the data streams or other elements of the one or more management platform processors to automate desired data changes and/or desired state changes, both one time and/or in an on-going manner; and the data stream license purchase software module to enable the implementor to request and gain access to at least one of the data streams in a formalized manner, wherein:
  the access to the data stream through the data stream license purchase software module can be monetized through a payment system;
  the common aspect corresponds to one of the accounts belonging to (i) a common entity external to an entity associated with the implementor and/or (ii) a common group within the entity associated with the implementor; and
  access to at least one of the external systems and/or at least one of the external products through the product license purchase software module is monetized through the payment system.

* * * * *